United States Patent
Hebenstreit et al.

(10) Patent No.: US 11,609,544 B2
(45) Date of Patent: Mar. 21, 2023

(54) SYSTEMS, METHODS AND APPARATUS FOR GUIDED TOOLS WITH MULTIPLE POSITIONING SYSTEMS

(71) Applicant: Shaper Tools, Inc., San Francisco, CA (US)

(72) Inventors: Joseph J. Hebenstreit, San Francisco, CA (US); Ilan Ellison Moyer, Belmont, MA (US); Jeremy Evan Blum, San Francisco, CA (US); Alec Rothmyer Rivers, Oakland, CA (US)

(73) Assignee: Shaper Tools, Inc., San Francisco, CA (US)

( * ) Notice: Subject to any disclaimer, the term of this patent is extended or adjusted under 35 U.S.C. 154(b) by 0 days.

(21) Appl. No.: 16/964,546

(22) PCT Filed: Jan. 29, 2019

(86) PCT No.: PCT/US2019/015624
§ 371 (c)(1),
(2) Date: Jul. 23, 2020

(87) PCT Pub. No.: WO2019/148178
PCT Pub. Date: Aug. 1, 2019

(65) Prior Publication Data
US 2021/0034032 A1 Feb. 4, 2021

Related U.S. Application Data

(60) Provisional application No. 62/623,504, filed on Jan. 29, 2018.

(51) Int. Cl.
*G05B 19/402* (2006.01)

(52) U.S. Cl.
CPC .. *G05B 19/402* (2013.01); *G05B 2219/35188* (2013.01)

(58) Field of Classification Search
CPC .. B23Q 17/2233; B23Q 17/2428; B23Q 9/00; B25H 1/0092; G05B 19/402;
(Continued)

(56) References Cited

U.S. PATENT DOCUMENTS 5,910,894 A * 6/1999 Pryor ............... G05B 19/41875
700/95
9,026,242 B2 5/2015 Rivers et al.
(Continued)

FOREIGN PATENT DOCUMENTS

CN 204052981 12/2014
CN 105094045 11/2015
(Continued)

OTHER PUBLICATIONS

European search report for EP Application No. 19744134.8 dated Sep. 16, 2021 (10 pages).
(Continued)

*Primary Examiner* — Kidest Bahta
(74) *Attorney, Agent, or Firm* — Almanac IP Advisors LLP

(57) ABSTRACT

The present disclosure is directed to performing work on a working surface based on a desired path using a working member. The disclosed system advances the working member with respect to the desired path using a first positioning system and a second positioning system. The first positioning system comprises a frame and actuators operable to advance the working member with respect to a portion of the desired path within an adjustment region. The second positioning system comprises actuators operable to move the frame. By moving the frame using the second positioning system, the first positioning system advances the working member with respect to a portion of the desired path that was outside the adjustment region before the frame was moved.

19 Claims, 56 Drawing Sheets

(58) Field of Classification Search
CPC .......... G05B 2219/32001; G05B 2219/35188;
G05B 2219/45229
See application file for complete search history.

(56) References Cited

U.S. PATENT DOCUMENTS

| | | | |
|---|---|---|---|
| 10,067,495 B2 | 9/2018 | Rivers et al. | |
| 10,078,320 B2 | 9/2018 | Rivers et al. | |
| 10,456,883 B2 | 10/2019 | Rivers et al. | |
| 10,556,356 B2 | 2/2020 | Rivers et al. | |
| 10,788,804 B2 | 9/2020 | Rivers et al. | |
| 10,795,333 B2 | 10/2020 | Rivers et al. | |
| 2007/0261522 A1 | 11/2007 | Bono et al. | |
| 2008/0170917 A1* | 7/2008 | Hilker | B27G 13/005 407/54 |
| 2011/0303427 A1 | 12/2011 | Tang | |
| 2012/0296463 A1 | 11/2012 | Rivers et al. | |
| 2015/0094836 A1 | 4/2015 | Rivers et al. | |
| 2016/0291567 A1* | 10/2016 | Rivers | B23Q 9/0042 |
| 2017/0028520 A1 | 2/2017 | Plu et al. | |
| 2017/0210011 A1 | 7/2017 | Hull | |
| 2019/0196438 A1 | 6/2019 | Rivers et al. | |
| 2020/0061767 A1 | 2/2020 | Rivers et al. | |
| 2020/0230840 A1 | 7/2020 | Rivers et al. | |
| 2021/0026317 A1 | 1/2021 | Rivers et al. | |

FOREIGN PATENT DOCUMENTS

| | | |
|---|---|---|
| CN | 106526646 | 3/2017 |
| DE | 10027526 | 4/2007 |
| WO | 2012159123 | 11/2012 |
| WO | 2013163588 | 10/2013 |
| WO | 2016183390 | 11/2016 |
| WO | 2018035499 | 2/2018 |

OTHER PUBLICATIONS

Communication pursuant to Rules 161(2) and 162 EPC for EP 19744134.8 dated Sep. 11, 2020 (3 pages).
Response to communication pursuant to Rules 161(2) and 162 EPC for EP 19744134.8 dated Feb. 10, 2021 (14 pages).
Notification of the First Office Action for CN 201980014616.5 dated Jul. 16, 2021 (43 pages).
International Search Report for PCT/US2019/015624 dated May 3, 2019. (2 pages).
Written Opinion for for PCT/US2019/015624 dated May 3, 2019. (18 pages).
Notification of the Second Office Action for CN 201980014616.5 dated Apr. 6, 2022 (46 pages).
Rejection Decision for CN 201980014616.5 dated Aug. 24, 2022 (26 pages).

* cited by examiner

100

View perpendicular to working surface [working surface stand (3085) not shown]

Side view

SYSTEMS, METHODS AND APPARATUS FOR GUIDED TOOLS WITH MULTIPLE POSITIONING SYSTEMS

CROSS-REFERENCE TO RELATED APPLICATIONS

This application is the National Stage of International Application No. PCT/US2019/015624, filed on Jan. 29, 2019, which claims the benefit of priority to U.S. Provisional Patent Application No. 62/623,504 filed on Jan. 29, 2018, both of which are hereby incorporated by reference herein in their entirety for all purposes.

BACKGROUND

Working on tasks, such as cutting, that involve manually positioning a rig over many different spots or manually moving the rig over a large area may be very taxing and time consuming for the user of the rig. Improvements have been made to automate the fine positioning of the working member, such as cutting bit, after the user positions the rig near where the work needs to be done, see US2012/0296463 published Nov. 22, 2012, and US2015/0094836 published Apr. 2, 2015. Improvements are needed to automate the coarse positioning of the rig.

SUMMARY

Apparatuses, systems and methods of the present disclosure facilitate the automated positioning of a frame over a large area to complete a task, such as cutting. In some embodiments, a system includes a first positioning system (including a frame) that enables fine positioning of a working member (e.g., cutting bit) on a surface over a small region. The system also includes a second positioning system that can position the frame and the working member over a large region, in some cases, with less accurate positioning capability. In some embodiments, the system controls the second positioning system to move the first positioning system so that a target work point moves in to the small region accessible to the first positioning system. The system may include sensors for determining the position of the frame or the working member relative to the surface of a workpiece. In some embodiments, the system uses the position data to advance a working member with respect to a desired path relative to the surface.

In some embodiments, the first positioning system may know its location relative to the location where a task is to be performed. Based on its location data, the first positioning system may instruct the second positioning system to move the first positioning system to the location where the task is to be performed. In some embodiments, a user operating the first positioning system may manually move the first positioning system to the location where the task is to be performed. In some embodiments, the first positioning system may be decoupled from the second positioning system.

In some embodiments, the disclosed system advances a working member with respect to a desired path relative to the surface by controlling the first positioning system to position the working member with respect to the desired path while also controlling the second positioning system to move the frame to ensure that the desired path remains in an adjustment region of the first positioning system. In some embodiments, the first positioning system and the second positioning system have spatially overlapping adjustment regions (e.g., working member adjustment region for the first positioning system overlaps with frame adjustment region for the second positioning system). In some embodiments, the system may provide information to the second positioning system to move the frame in a first direction. In some embodiments, the system may provide information to the second positioning system to move the frame at a first speed or to move the frame a first distance. In some embodiments, the system may iterate a control loop (for controlling the first and second positioning system) to advance a working member with respect to a desired path. In some embodiments, the system may include one or more stages to position the frame in a rectangular region.

Apparatuses, systems and methods of the present disclosure facilitate guiding a tool. In some embodiments, the system includes a rig or frame with a stage that may be positioned on the surface of a piece of material such as wood. The tool can be electrically or mechanically coupled to the frame, and the frame together with the tool can be passed over the material. The system can include sensors, cameras or positioning logic to determine the tool's position on the material and accurately move (or provide instructions for a user to move) the frame, stage, or tool to a desired coordinate on the material.

Manufacturing or making operations can include working on or with a piece of material with at least one flat facet, such as cutting a shape out of a piece of plywood. However, it may be challenging for a tool to determine the location of the edge of the flat facet, which may be a rectangle, as in a sheet of plywood, or a smooth contour, such as with the edge of a 2D template. Systems, methods, and apparatus of the present solution relate to a system for detecting the shape and/or position of the edge.

The tool can be configured with one or more techniques to facilitate guiding a working member or bit of the tool. For example, the tool can include a probe and be configured with a lateral probing technique that measures a surface of a material or a workpiece, or establishes a reference point on or relative to the workpiece. The tool can probe one or more points of an outline of the workpiece to digitize a template. The tool can probe one or more points of the outline to scan the edge of a working material before and after flipping to align plans for two-sided machining. The tool can probe one or more points of the outline to generate a grid overlay.

In some embodiments, the system can include a handheld tool coupled with a digital processor. The handheld tool can include a physical element, such as a probe, of a known or approximately known geometry. The probe may be a part of the tool used in some other capacity than for probing in addition to functioning as a probe, such as a drill bit. Using one or more sensors, the system can determine the 3D position or location of the probe in an arbitrary coordinate frame, and store the position. The system can determine the position by detecting the position of the tool frame and using the offset from the tool frame to the probe, or the system can directly detect the position.

In some embodiments, the system can detect the edge of the material by moving the handheld tool to a position where the probe geometry is in contact with the edge. The system can receive indication that the probe geometry is in contact with the edge of the material. The indication can be via an interface of the tool, such as a button, or the system can automatically detect that the probe is in contact with the edge. The system can store the point of contact in memory. The system or tool can sample one or more contact points or edges of the material. The handheld tool may also be moved along a 3D path during which it is in contact with the edge at some ranges of times and not at others.

In some embodiments, the surface of the material can be marked with location markers that facilitate detecting a location of the tool relative to the surface of the material. The marker can be designed or configured to facilitate easy, fast, and reliable detection by a sensor of the tool. In some embodiments, the marker may include a binary image or be constructed in a manner that can be easily converted to a binary image. For example, the marker may include a fiducial marker that can be detected with minimal computation power, such as a black-and-white image that may represent dominoes.

In some embodiments, the present disclosure is directed to a system, method or apparatus of directing or extracting dust that may be generated while performing a task on a surface of a material. For example, while a cutting tool is cutting a material such as wood, saw dust may be produced which may make it difficult for the tool to detect markers that may be placed on the surface of the material. The tool of the present disclosure includes a cavity in which the dust generated by cutting the material can be directed. For example, the cavity may include a void in tool frame, and a fan of the tool may direct the dust towards the cavity. Further, a vacuum may be coupled to the tool such that the dust can be extracted via the channel.

In some embodiments, the present disclosure is directed to a system, method or apparatus for determining the position of a tool relative to a work surface. The system, method or apparatus can determine changes in the force exerted by the tip of the tool (e.g., a cutting bit) in order to determine when the tip of the cutting tool is touching or pressing against the surface of the material. For example, the tip of the tool may be in a first position that is not touching the work surface. The tip may gradually move to a second position that touches the surface of the material. When the tip of the tool moves to the second position, the system, method or apparatus can determine a change in the force, which may indicate that the tool tip is touching the surface of the material. For example, the force exerted on a base of the tool may be less because the tip of the tool is offloading some of the force from the base.

At least one aspect of the present disclosure is directed to a system to calibrate position detection for a tool. The system can include base coupled to the tool. The base can be in contact with a working surface. The system can include a computing device having one or more processors. The system can include a sensor communicatively coupled to the computing device. The system can include a motor controlled by the computing device. The computing device can identify, via the sensor, a first value of a parameter indicative of an amount of force exerted by a portion of the base on the working surface. The computing device can instruct the motor to extend the working member towards a working surface. The computing device can identify, via the sensor upon the working member contacting the working surface, a second value of the parameter. The computing device can compare the first value of the parameter with the second value of the parameter to generate a difference between the first value and the second value. The computing device can determine a z-axis position of the working member relative to the working surface responsive to the difference between the first value and the second value greater than a threshold.

At least one aspect of the present disclosure is directed to a method of evaluating a position of a working member of a tool. The method can include a sensor communicatively coupled to a computing device comprising one or more processors detecting a first value of a parameter indicative of an amount of force exerted by a portion of a base of the tool on the working surface. The method can include a motor controlled by the one or more processors of the tool extending the working member towards the working surface. The base can be at least partially in contact with the working surface. The method can include the sensor detecting a second value of the parameter when the working member contacts the working surface. The second value of the parameter can be less than the first value of the parameter. The method can include the computing device determining a z-axis position of the working member relative to the working surface responsive to a difference between the first value and the second value greater than a threshold.

At least one aspect is directed to a system to position a working member of a tool. The system can include a base coupled to the tool. The system can include a computing device comprising one or more processors. The system can include a sensor communicatively coupled to the computing device. The system can include a motor controlled by the computing device. The system can include the computing device configured to identify, via the sensor, a first value of a parameter indicative of an amount of force exerted by a portion of the base towards a working surface. The computing device can instruct the motor to extend the working member towards the working surface. The computing device can identify, via the sensor with the working member in contact with the working surface, a second value of the parameter. The computing device can compare the first value of the parameter with the second value of the parameter to identify a difference between the first value and the second value. The computing device can determine a z-axis position of the working member relative to the working surface based on the difference between the first value and the second value greater than a threshold.

At least one aspect is directed to a method of positioning of a working member of a tool. The method can include detecting, by a sensor communicatively coupled to a computing device comprising one or more processors, a first value of a parameter for a first vertical position of a base of the tool. The method can include extending, by a motor controlled by the computing device, the working member towards the working surface. The method can include detecting, by the sensor with the working member in contact with the working surface, a second value of the parameter indicating a second vertical position of the base of the tool. The method can include comparing, by the computing device, the first value of the parameter with the second value of the parameter to determine a change in vertical position of the base of the tool. The method can include determining, by the computing device, a z-axis position of the working member relative to the working surface based on the change in the vertical position of the base of the tool.

At least one aspect is directed to a system to position a working member of a tool. The system can include a base coupled to the tool. The system can include a computing device comprising one or more processors. The system can include one or more sensors communicatively coupled to the computing device. The system can include one or more motors controlled by the computing device. The computing device can determine, via the one or more sensors, a z-axis position of the working member. The computing device can provide, based at least in part on the z-axis position of the working member, motor control information to control the one or more motors to move the working member from a first location to a second location, the tool advanced in a direction that is within a range adjacent to a predetermined path for the working member of the tool.

At least one aspect is directed to a system to position a working member of a tool. The system can include a base coupled to the tool. The system can include a computing device comprising one or more processors. The system can include one or more sensors communicatively coupled to the computing device. The system can include one or more motors controlled by the computing device. The system can include a cavity of the tool to move particles of material removed from the working surface by the working member. The computing device can determine, based on first information received via the one or more sensors, a first location of the working member. The computing device can compare the first location of the working member with a predetermined path to determine a second location for the working member of the tool corresponding to the path. The computing device can provide, based on the second location, motor control information to control the one or more motors to move the working member from the first location to the second location, the tool advanced in a direction that is within a range adjacent to a predetermined path for the working member of the tool, the cavity configured to move the particles of the material in a direction opposite to the direction in which the tool advances.

Embodiments of the present disclosure include facilitating the use of a rig having one or more actuators to move an adapter holding a working member. Systems, methods, and computer readable media are described herein that: determine a position of the adapter holding the working member, determine a desired path for the adapter based on a design plan, provide actuator control information to move the adapter responsive to a user moving the rig, and provide actuator control information to move the rig responsive to the user not moving the rig.

DETAILED DESCRIPTION

Figure 1:
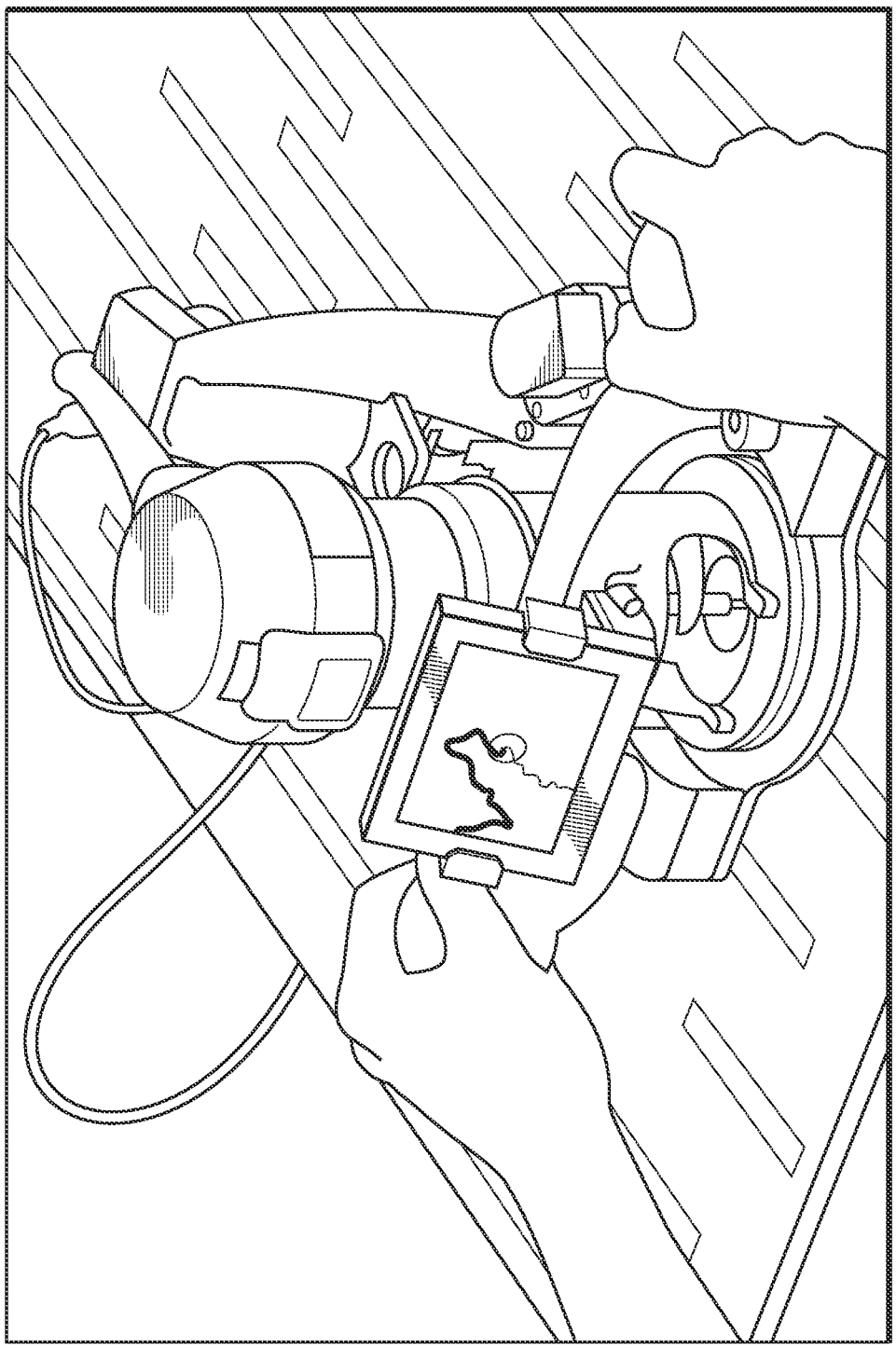
FIG. 1 is an illustrative example of an embodiment of an apparatus for automatically guiding tools.

The present disclosure relates generally to systems and methods for working on a surface such as woodworking or printing. In some embodiments, the present disclosure relates to determining the location of a tool in reference to the surface of a material and using the location to guide, adjust or auto-correct the tool along a predetermined path or design plan such as, e.g., a cutting or drawing path. In some embodiments, the reference location may correspond to a design or plan obtained via an online design store.

Manufacturing or making operations can include working on or with a piece of material with at least one flat facet, such as cutting a shape out of a piece of plywood. However, it may be challenging for a tool to determine the location of the edge of the flat facet, which may be a rectangle, as in a sheet of plywood, or a smooth contour, such as with the edge of a 2D template. Systems, methods, and apparatus of the present solution relate to a system for detecting the shape and/or position of the edge.

The tool can be configured with one or more techniques to facilitate guiding a working member or bit of the tool. For example, the tool can include a probe and be configured with a lateral probing technique that measures a surface of a material or a workpiece, or establishes a reference point on or relative to the workpiece. The tool can probe one or more points of an outline of the workpiece to digitize a template. The tool can probe one or more points of the outline to scan the edge of a working material before and after flipping to align plans for two-sided machining. The tool can probe one or more points of the outline to generate a grid overlay.

In some embodiments, the system can include a handheld tool coupled with a digital processor. The handheld tool can include a physical element, such as a probe, of a known or approximately known geometry. The probe may be a part of the tool used in some other capacity than for probing in addition to functioning as a probe, such as a drill bit. Using one or more sensors, the system can determine the 3D position or location of the probe in an arbitrary coordinate frame, and store the position. The system can determine the position by detecting the position of the tool frame and using the offset from the tool frame to the probe, or the system can directly detect the position.

In some cases, the present disclosure can facilitate evaluating a position of a working member of a tool. Evaluating the position of the working member can include, for example, determining the geometry of the cutting tool or determining the geometry of a workpiece (e.g., including the geometry of a working surface of the workpiece).

Determining the geometry of the tool can include or refer to determining the position of the tool tip (e.g., working member) relative to a reference frame of the tool. Determining the geometry of the tool can include or refer to determining the diameter of the cutting tool. The tool geometry information can be used to automatically determine a length of a cutting flute of the working member and an angle of the cutter (e.g. a V carving bit or helix angle).

Determining the geometry of a workpiece can include or refer to determining or measuring the thickness of the material to be cut, or creating a topological map of a surface by repeatedly probing it with a tool tip. The tool can determine the location of features of interest such as holes on a workpiece.

The present disclosure can use one or more techniques to determine the position of the working member or tool tip relative to the reference frame of the tool (e.g., tool height). For example, the tool can include a tool tip or working member and a base. The base of the tool can rest on and be in contact with a working surface. A technique to determine the position of the tool tip can include extending or dropping the tool tip onto the work surface (or a convenient flat surface such as a table) while measuring the weight on the base of the tool. When the tool tip makes contact with the work surface, weight can be transferred onto the tool tip and off of the base of the device as additional downward motion of the cutting tool occurs. The tool can detect this reduction in weight on the base by weight sensors in the base. This technique can provide improved accuracy in determining the position of the tool tip because the tool tip position can be determined within a fraction of the tool travel necessary to lift the base of the device off of the work surface. In some cases, where the tool tip can be quite sharp, the tool tip can sink or enter into the work surface (e.g., wood) a distance before generating sufficient force to cause the device to lift. However, since the weight sensors can be configured to detect even a small force reduction (e.g., 1%, 2%, 3%, 5%, 0.5%, 0.1%, or 10% of the force exerted by the tool or base on the material prior to the tool tip contacting the working surface), the tool can detect the change in force as the tool tip contacts the working surface even if the tool tip is to at least partially enter the working surface.

Furthermore, the tool can determine the position of the tool tip with this technique without performing an absolute calibration of the weight sensors because the tool can determine the position based on detecting a change in the force. Therefore, it can be possible to determine the position of the tool tip using inexpensive and uncalibrated force sensors. Examples of force sensors can include force-sensitive resistors, capacitive force sensors, high-pass sensors or piezo-resistive sensors.

The tool can detect when the tool tip or working member contacts or comes into contact with the work surface by detecting, noticing, determining, or otherwise identifying a lift of the base. The lift of the base may be a relatively small lift (e.g., a reduction in force on the force sensor of 0.1%, 0.5%, 1%, 2%, 5%, 10%, 15%, 20% or some other percentage based on the resolution or granularity of the force sensor). In some cases, the tool can detect the lift based on a tilt of the base (e.g., 1 degree angle, 2 degree, 5 degrees, 10 degrees, 15 degrees, 25 degrees or some other tilt that is detectable). The tool can detect the tilt using a camera, visual information, gyroscope, or 3-axis accelerometer. For example, the camera can determine shift in the captured image corresponding to a tilt resulting from the base lifting. The camera can take a first picture or image before the tool brings the tool tip into contact with the working surface, and then take a second image when the tool tip contacts the working surface. The camera can compare the first image with the second image to identify a tilt or variation between the two images. The accelerometer can indicate the tilt responsive to a motion or sudden motion caused by the base lifting. In some embodiments, the tool can include a force sensor in the tool mount to directly measure the force on the cutting tool tip.

The tool can determine or detect additional information about the tool including tip or working member position, diameter, or tool geometry. For example, the tool can include a break-beam sensor (e.g. laser break beam sensor, infrared break beam sensor, photoelectric sensor, or optical sensor). The working member can be dropped into the line of action of the sensor and the tool can detect the position of the working member when the working member breaks the beam. In some cases, the axis of the beam can be pre-calibrated relative to the coordinate frame of the tool. However, it may be challenging to accurately detect the tip position with this technique based on the tip geometry (e.g., if the tip shape is not flat across).

The tool can determine the proximity of the tool tip to the working surface using a capacitive sensor or an electromagnetic sensor. For example, the electromagnetic sensor can sense or detect a change in inductance of a sensing coil in the proximity to the tool tip or working member that includes metal by sensing eddy currents induced in the metal.

Another approach is to use a vision camera aimed at the tool to determine the position of the working member or tool tip. The vision camera can be pre-calibrated to the tool coordinate frame to detect the tool tip. In some cases, the vision camera can include a linear charge coupled device (CCD) sensor or other image sensor. A linear CCD sensor may use less processing than a vision camera to detect the tool tip.

The tool can measure the tool diameter using one or of these techniques. The tool can shift the tool tip around while measuring or determining the position of the tool tip. By shifting the tool tip, the tool can use a single break-beam sensor to detect tool diameter by passing the tool left-to-right through the sensor. The lateral motion of the tool can cause a first break and then unobstruct the beam to provide a measure of the tool diameter. Since router bits can have helical flutes, the tool can perform multiple measurements along the length of the tool to determine the diameter. The tool can determine the diameter using eddy currents or capacitive sensing with a one-dimensional sensor to gather multi-dimensional information about the tool geometry by correlating the sensor data to the tool position. The tool can determine additional information about the tool tip such as tip angle in the case of a v-cutting bit. Furthermore, the tool can include a vision camera to detect geometric properties of the tool.

The tool can measure the geometry of the work surface by correlating the tool tip position with device position on the plane of the work surface. To do so, the tool (e.g., a cylindrical tool with a conical or spherical tip) can first be related to the reference frame of the tool by detecting the position of the tool tip. Once the position of the tool tip is known relative to the tool's reference frame, the tool can be positioned laterally over a surface of interest (e.g., working surface) to determine the vertical position of the working surface. The vertical position of the working surface can refer to a recess, cavity, indent, or concave portion in a piece of wood whose depth is of interest. The tool tip can then be inserted, extended, lowered, plunged otherwise moved until the tool tip contacts the bottom of the recess. The additional displacement of the tool tip beyond the top portion of the surface where the tool tip first contacted the work surface indicates the depth of the recess. If the surface profile of the recess was of interest, the tool might be moved around the recess to multiple points. The tool can determine, at each of the multiple points, the depth. The tool can record both the depth and lateral position of the tool (e.g., x, y, and z coordinates, where x and y coordinates can refer to the lateral position and the z coordinate can refer to the depth). The lateral motion could be accomplished automatically using a built-in positioning stage, or performed manually by the user, or a combination of both.

Another potential application could be to find the center position of holes on a work surface. A tool with a conical tip can be fitted into the device. The tool can then be positioned approximately (e.g., within 5%, 10%, 15%, 20%, 25%, 30%, 50%, 75%, or 90% of the diameter of the hole) over the center of the hole, and plunged until the tip contacts the circle of the hole. Because the tool tip can be conical, the tool tip can cause the tool to center over the hole. The tool can then determine the lateral position (e.g., x and y coordinates) using, for example, a vision system to ascertain the position of the hole.

The tool can determine a thickness of a working surface or other piece of material. Using the determined thickness of the working surface, the tool can automatically set cutting depths or update cutting paths that may be dependent on the material thickness (e.g., a box joint where the length of the fingers are to correspond to the thickness of the mating material). The tool can determine or measure the thickness of the material hang or place the tool or portion thereof over an edge of the working surface or material, and then extend the tool tip until it contacts the surface supporting the material. The depth the tool tip extends beyond the top of the work surface in order to contact the surface supporting the working surface can indicate the thickness of the working surface.

The tool can determine a location of the tool or tool tip relative to a surface of a working material using location markers that may include contour trees, binary images, fiducial markers, or dominoes. The present disclosure facilitates directing and extracting dust away from a portion of the tool by generating airflow that directs the dust via one or more channels in a portion of the tool. The present disclosure facilitates determining a height of the tip of the tool using force sensors that detect a reduction in force when the tip of the tool touches the material.

With the determined information, the tool can be configured to guide a working member of the tool to perform a task on a target material (e.g., working surface). In some embodiments, a system may automatically guide a tool to perform the task. For example, in some embodiments, the present disclosure provides a handheld system that can identify the location of a tool, or a rig that contains a tool, relative to the material being worked. In some embodiments, the device may be non-handheld; e.g., the device may be on a movable platform such as a remote control platform, robotic platform, or another type of movable platform that may or may not be controllable. The system may adjust the location of the tool (or provide instructions for the adjustment of the location of the tool) based on or responsive to the current location of the tool and a desired location corresponding to a design plan. In some embodiments, the system includes a handheld device with a working instrument capable of being operated by hand which can make precision adjustments of the working instrument location based on spatial location to provide an accurate path which the working instrument travels.

In some embodiments, systems and methods disclosed herein can include a location detection system or perform one or more location detection techniques that can detect the current location or position of a tool on a target material accurately, robustly, or with low latency. For example, a video or sill image camera coupled to the tool and accompanying control circuitry may be used to scan the surface of the material and process the scanned data or scanned image data to generate a digital map of the surface of the material in advance of performing a task on the material. When the tool is brought near the surface of the material during performance of a task on the material, the camera may take a second image and compare the second image with the digital map to detect a location of the tool relative to the material.

In some embodiments, various location detection techniques may be used including, e.g., integrating wireless position sensing technologies, such as RF, near field communication, Bluetooth, laser tracking and sensing, or other suitable methods for determining the position of the tool and facilitating guiding or adjusting the position of the tool to perform a task. In some embodiments, the system may include a hybrid location detection system that employs two or more location detection techniques to determine the location of the tool. For example, each location detection technique may include orthogonal strengths and weaknesses, but when combined, can detect a location with high accuracy and low latency. For example, a first location detection technique may be high accuracy but low frequency (e.g., a sensor configured to obtain data once per second that accurately determines the position but has high latency). The first location detection technique may be combined with a second location technique that includes a sensor that provides location information with high frequency and high accuracy but provides limited information (e.g., an optical mouse sensor that is high frequency and high accuracy but only provides dead reckoning including direction and speed of movement rather than the location of the tool in a global context). In an illustrative example, the hybrid location system may use a camera to obtain an image to determine a position of the tool on the surface of the material accurately, and then use an optical mouse sensor to track the change of the position until the next frame of the image comes in. In this example, the second location technique using the optical mouse sensor may not provide all location tracking because integrating velocity to determine a position may accumulate error over time, or the device would not be able to determine a location if the device was picked up and put it down at a different position.

In some embodiments, to generate the map in advance of the cutting or drawing operation, a user may sweep the surface of a material with a camera until the camera has obtained images of all, substantially all, or a portion of the surface of the material or desired portion thereof. The system may obtain these images and stitch the images together to produce a cohesive map. Generating the digital map image and detecting the location may include one or more image processing techniques, pattern recognition techniques, localization techniques, computer vision techniques, for example. For example, the system may identify that points A and B in a first image correspond to point C and D in a second image and accordingly stitch the two images. For example, on a wood surface, the system may identify variations, bright spots, color variations, marks, fiducial markers, binarized images, or wood grains in the image and compare them with the digital map to determine a location. In another example, the system may further use corners, sides, lighting patterns, or other signal capable of identifying a location.

The material can be marked to facilitate mapping of the surface of the material or detection of a position of the tool on or proximate to the material. For example, the surface of a material, such as metal or plastic, may not contain sufficient identifying marks to accurately detect location. Distinguishing marks or markers can be added to the material to facilitate location detection techniques such as pattern recognition or image processing. The markers can include any type of material, ink, tape, light, laser, carving, engraving, temperature gradient, invisible ink (e.g., ink only visible under ultraviolet or other wavelengths of light) capable of facilitating a location detection technique. In some embodiments, the marker includes a tape that can be applied to at least a portion of the surface of the target material. The tape may include symbols such as a unique barcode, design, pattern, colors, engravings, raised bumps or depressions, for example. In some embodiments, the marker may include a user randomly marking on the target material with a pen, pencil, ink, invisible ink, paint, crayons, or any other marking or writing instrument.

In addition to generating a digital image of the surface of the material, in some embodiments, the system may identify a cutting or drawing design plan on the surface of the material. A design plan may include any cutting or drawing a user of the system desires. For example, the design plan may include a freehand design, tracing, picture, image, design generated using computer-aided design ("CAD") software, purchased design, or a purchased electronic design. The design plan can be a design of an object that the tool can create by performing an operation on the material, such as a design for a table that can be cut from at least one piece of wood.

The system can incorporate the design plan with the map image or otherwise relate the design plan with a map of the surface of the material or overlay the design plan on the map image. In some embodiments, the design plan may be drawn on the surface of the material before or after generating the initial map of the material (e.g., using a special pen whose ink can be detected by the system using ultraviolet or other wavelengths). If, for example, the surface of the material includes a design (e.g., a cutting design or drawing design) during the initial mapping phase, the system may process the image to identify the design plan and include it in the digital map of the surface of the material. If the design is drawn or otherwise marked on the surface of the material after generating the initial map, the system may obtain images of the material with the design by using the camera to rescan or take new images of the material. If the design is drawn or otherwise marked on the surface of the material before generating the initial map, the system may identify the design as a cutting or drawing design plan or a user may indicate to the system that the identified design is a cutting or drawing design plan.

In some embodiments, a digital design may be added to digital map of the surface of the material without physically adding the design to the surface of the material or otherwise marking the actual material with a design. For example, the digital design may be generated on a computer and may include a CAD drawing or any other type of drawing (e.g., JPEG, BMP, or GIF). Using CAD software, for example, a user may modify the map image by adding the design plan.

Any other suitable software may be used to incorporate a design plan onto the map image or otherwise relate a design plan with a map of the surface of the material (e.g., data that indicates a location of the design plan used to facilitate the performance of a task on a material). After registering the design on the digital map or digital map image, the system may provide the corresponding digital map data or digital image data with the design plan to the tool. In some embodiments, the system may display the map image with the design on a display device of the tool to facilitate a user performing a task on the material. In some embodiments, the tool may perform the task in accordance with the design plan without displaying the design plan (e.g., the tool may automatically perform an aspect of the task or the tool may not include a display device).

During the cutting or drawing operation, a user may place the tool on or near the surface of the material. Upon placing the tool on the surface, the camera may re-scan or take an image of a portion of the surface of the material. The image may correspond to a portion of the material that is at a location different from the cutting or drawing tool. The system may determine the location of the tool relative to the surface of the material or the design plan by comparing identifying marks in the new image with identifying marks in the map image generated in advance of the performance of the task on the material. The camera may be mounted or otherwise coupled to the tool such that image capturing aspect of the camera (e.g., lens) is directed on the surface of the material at a fixed and known vector from the cutting tool (e.g., drill bit). By focusing the camera away from the cutting tool, the system may obtain images that are relatively clear of debris caused by cutting that may obfuscate the markers used for detecting a location.

The system may compare the new images with the digital map of the surface of the material to determine a precise location of the tool. For example, the portion of the digital map corresponding to the top right corner may include a set of identifying marks. Upon obtaining the new image, the system may identify those same identifying marks and determine that those marks correspond to the top right corner of the map image. The system may then determine, based on the camera vector offset, the precise position of the cutting or drawing tool.

In some embodiments, the system may display, in real time, the precise position of the cutting or drawing tool on a display device (e.g., a display device of a tool or a remote display device communicatively coupled to the system or tool). The system may indicate the position on the display via an "X", circle, dot, icon, or using any other indication to signal a current position of the tool. In some embodiments, the tool may overlay the indication of the current position on the design plan or cutting path (e.g., a predetermined path). In some embodiments, the tool may overlay the indication of the current position on the map image. In some embodiments, the tool may overlay the indication of the current position on the map image that includes an overlay of the design plan.

In some embodiments, the system may include a positioning system that adjusts or moves the tool based on a detected location of the tool and a design plan. In some embodiments, the system can use various location detection techniques to detect the location of the tool, and use various positioning techniques to move or adjust the location of the tool. For example, the system can include a hybrid positioning system that includes two or more positioning systems to position a tool. Upon determining the location of the tool and a desired location for the tool, the second positioning system may be configured to move, adjust, or position the tool over a relatively large range (e.g., move the tool to anywhere on the work area or surface of the material), but with relatively low accuracy. The first positioning system may be configured to move, adjust, or position the tool over a relatively short range (e.g., within a radius of 5 inches of the current location of the tool), but with high accuracy. In some embodiments, the first (e.g., coarse or rough) positioning system may include a human positioning a tool on the surface of a material, and the second (e.g., fine or precise) positioning system may include positioning the tool using servo motors, stepper motors, actuation mechanisms, or eccentrics, for example. The second positioning system can include non-human positioning systems such as, e.g., robotic systems, remote control systems, or Global Positioning System ("GPS") enabled devices.

For example, the second positioning system may include a long-range, low-accuracy positioning mechanism that is configured to move, adjust or correct the position of the tool based on the design plan. The first positioning system may include a short-range, high-accuracy positioning mechanism that can move, adjust or correct the position of the tool, within a maximum range, more precisely than the first positioning mechanism based on the design. In an illustrative and non-limiting example, the second positioning system may include, e.g., a maximum range that includes the range of the entire work area (e.g., the area comprising the surface of the material on which the task is to be performed), and include an accuracy of +/−0.25". The first positioning system may include, e.g., a maximum range of 0.5", with an accuracy of +/−0.01". The maximum ranges and accuracy of the first and second positioning systems may include other range and accuracy values that facilitate systems and methods of hybrid positioning. In various embodiments, range and accuracy may refer to one-dimensional accuracy (e.g., along an X-axis), two-dimensional accuracy (e.g., X-Y axes) or three-dimensional accuracy (e.g., X-Y-Z axes).

The second positioning system may be less accurate and include a positioning system where the maximum range is substantially greater than the maximum range of the second. For example, the second positioning system can move the tool from anywhere on the surface of the material to within +/−0.25 inches of a desired location, while the first positioning system can be configured to move the tool up to 5 inches from a current position, but with an accuracy of 0.01 inches. In some embodiments, the hybrid positioning system may include a plurality of positioning systems that are each configured to accurately determine a location and then position the tool to within a certain distance range such that, when the positioning systems are used together, the system can precisely determine a location and position or adjust the tool accordingly. In some embodiments, the maximum range of each subsequent positioning system may be equal to or greater than the accuracy of the previous positioning system. In an illustrative example, a second positioning system may be able to position the tool on the surface of the material with, e.g., a maximum range corresponding to the size of the surface of the material, and with an accuracy of +/−1 inch. A first positioning system may be able to position the tool on the surface of the material within a maximum of range of 2 inches with an accuracy of +/−0.1 inch. A third positioning system may be able to position the tool anywhere within a maximum range of 0.2 inches with an accuracy of +/−0.01 inch. Therefore, in this example, by using all three positioning systems together, the hybrid positioning system can precisely position the tool within a maximum range that includes the entire surface of the material or work area with an accuracy of +/−0.01 inch.

In some embodiments, the system may include automatic adjustment, guiding or error correction to facilitate performing a task in accordance with a design plan. The system may use various types of adjustment, guiding or correction mechanisms, including, e.g., eccentrics, servomechanisms, stepper motors, control loops, feedback loops, actuators, nut and bolt-type mechanisms. For example, the system may include eccentrics or servomotors coupled to a frame and the cutting tool configured to adjust the position of the cutting tool relative to the frame. Upon determining the current position of the cutting tool, the system may compare the current position with the desired position. The system may then guide the tool in accordance with the design plan. In some embodiments, when the system determines there is a discrepancy between the current position and the desired position, or the current position or trajectory deviates from the design plan, the system may adjust the cutting tool in accordance with the design plan. For example, the system may identify a cutting path or vector of the tool and the design plan and adjust the cutting tool such that the next cut is in accordance with the design plan.

The system may utilize various automatic correction mechanisms. In some embodiments, the system may include eccentrics configured to adjust the position of the cutting tool. For example, using two eccentrics, the system may adjust the position of the cutting tool in two dimensions. Eccentrics may include any circular widget rotating asymmetrically about an axis. For example, an eccentric may include a circle rotating about non-central axis. The eccentrics may be coupled to the cutting tool and the frame and be configured to adjust the position of the cutting tool relative to the frame, which may adjust the position of the cutting tool relative to the surface of the material. In some embodiments, the system may utilize a screw with a nut to change rotational motion to linear displacement to correct or adjust tool positioning.

In some embodiments, the system may include orientation control based on the type of cutting tool. For example, if the cutting tool is a saber saw that cannot be adjusted perpendicularly, the system may adjust the orientation or angle of the saber saw in accordance with a design plan. They system may include actuators configured to adjust the tilt or angle of the saw.

The system can control the z-axis of the cutting or drawing tool. The system can determine the position of the tip of the cutting tool relative to the work surface. By controlling the z-axis (e.g., an axis that is substantially orthogonal to a surface of the material; an axis that is vertical; an axis that is parallel to an axis along which the working member is lowered or raised to or from the surface of the working member or cutting tool) of the cutting or drawing tool, the system may start and stop cutting or drawing in accordance with a design plan. For example, if the cutting tool is beyond a correctable distance away from the design plan (e.g., outside the radius of automatic compensation), the system may stop the cutting by adjusting the z-axis position of the cutting tool (e.g., lifting the cutting bit or router bit off the wood). When the user brings the cutting tool back to within the radius of automatic adjustment, the system may automatically adjust the z-axis position of the cutting tool such that cutting commences again (e.g., lowers the drill bit into the wood). The radius or range of compensation may correspond to a positioning system of the localization system. For example, if the localization system includes a hybrid positioning system that includes a long-range and short-range positioning system, the radius of compensation may correspond to the short-range positioning system. In some embodiments, controlling the z-axis position of the tool may facilitate making 2.5 dimension designs. For example, a design plan may indicate z-axis information corresponding to the surface of the material. Thus, the system can use a determined z-axis position of the working member or cutting tool or tip thereof to control a motor to move the working member to a second location or position (e.g., x, y, or z axis position).

In some embodiments, the system may indicate to the user that the cutting tool is on the design path (e.g., a predetermined path) or within the adjustment region such that the system may correct the position of the cutting tool. In some embodiments, the system may indicate to the user that the cutting is not on the design path or not within the adjustment region. The system may further indicate to the user to correct the position of the cutting tool or a direction in which to move the cutting tool to bring it on the design path or within the adjustment region. The system may provide one or more indication visually via the display device, using light emitting diodes or other light sources, audio signal, beeps, chirps, or vibrations. In some embodiments, an indication that the tool is deviating from the design path beyond an acceptable range may include automatically shutting off the cutting machine or adjusting the z-axis of the cutting or drawing tool such that it stops performing a task on the material. In some embodiments, the system may indicate the design path on the material of the surface itself by, e.g., shining a beam of light indicating to the user where the design path is and where to proceed. For example, upon determining the error, the system may shine a beam indicating to the user how much to adjust to the tool in order to bring the position of the tool to within the adjustment region or on the design path.

In some embodiments, a plurality of cutting or drawing tools may be used with the system including, e.g., saber saw, jig saw, router, or drill. The system may be configured such that users may use various aspects of the present disclosure with various cutting or drawing tools without making any adjustments to the tool or minor/temporary adjustments. For example, the system may include a frame, camera, display device, and computing device. The frame may be configured such that a cutting tool may be placed in the frame. The camera may be coupled to the frame or may be attached to the cutting tool. Upon placing the camera, the system may automatically or manually be calibrated such that the system obtains the vector offset between the camera and the cutting or drawing tool (e.g., the cutting bit or router bit).

In some embodiments, the system may include a freestanding device configured to perform mapping and localization functions and indicate to a user the current position of the device. In some embodiments, the freestanding device may be attached to a cutting tool or drawing tool. In some embodiments, the freestanding device may not provide automatic correction functionality. In some embodiments, the freestanding device may include a display or a camera. In some embodiments, the freestanding device may determine a design path and detect when the tool is off the design path. The freestanding device may indicate the error by, for example, the display, shining a light on the surface of the material, audio signals, or voice narration.

Referring to FIG. 1, an illustrative example of an embodiment of an apparatus for guiding tools to perform a task is shown. In some embodiments, the device includes a frame and a tool (e.g., a router in the example of FIG. 1) mounted within the frame. The frame may be positioned manually by the user. The device can adjust the position of the tool within the frame to guide or adjust the tool in accordance with a design plan or to correct for error in the user's coarse positioning. The device may also include a display and be configured to map the target material and display it on the display. In some embodiments, markers on the target material (e.g., stickers) may facilitate generating a map of the target material by providing differentiating features. The device may obtain a design or plan by downloading it from an online store. The device may display a map of the target material with the design that indicates the desired cutting pattern.

Figure 2:
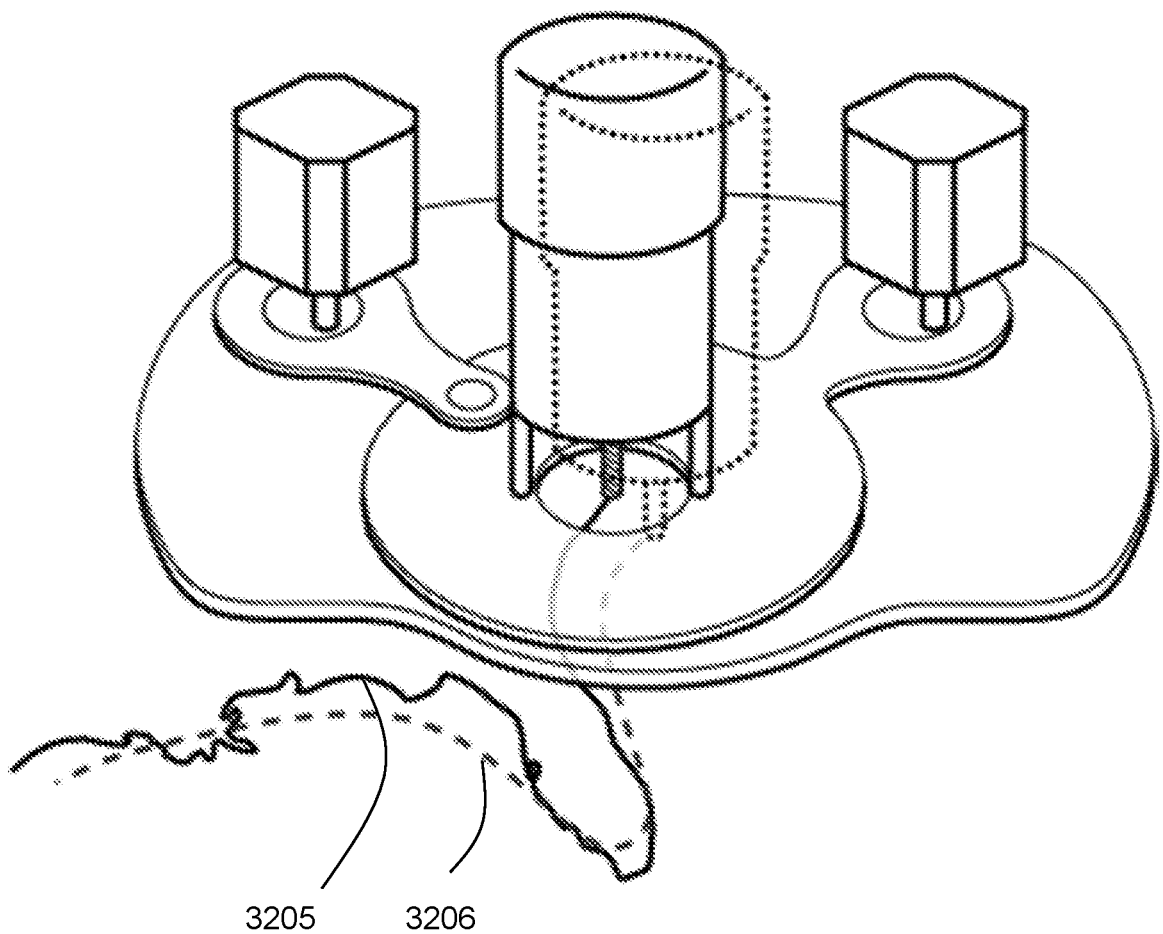
FIG. 2 is an illustrative example of an embodiment of an apparatus for automatically guiding tools following a target path area and performing a task according to a planned design.

Referring to FIG. 2, an illustrative example of an apparatus for automatically guiding tools following a target path area and performing a task according to a planned design is shown. In some embodiments, to follow a complex path, the user of the device may need to only move the frame in a rough approximation of the path. In this example, the dotted line shows the path that the tool would take if its position were not adjusted; the solid line is its actual path, e.g., an outline of the southeastern United States. In this example, the user can grip the frame and guide the tool generally along the dashed line, and the tool can self-adjust to cut along the solid line. In some embodiments, the device automatically adjusts the drill bit or other cutting tool based on the position of the cutting tool (e.g., one or more of an x-axis position, y-axis position, or z-axis position) and the desired position of the cutting tool. In some embodiments, the user of the device may move the device along the dashed line 3206 in FIG. 2, while the device automatically adjusts the cutting tool (e.g., an x, y or z position) in accordance with the desired design plan, such as the design plan 3205 (solid line) of FIG. 2. For example, the device may identify or detect the current position of the cutting tool relative to the target surface with the design. The device may then compare the current position with the desired position of a design or map and adjust the cutting tool. For example, if the working member or cutting tool tip is determined to be 1 inch above the surface of the material, the system can determine to lower the cutting member tip to contact the surface of the material. In another example, if the design indicates to drill a hole 0.5 inches deep into the material, then the system can determine the z-axis position of the tip and insert the tip 0.5 inches into the material based on the determined z-axis position. For example, the system can instruct a motor to extend the working member or cutting tool 0.5 inches beyond the surface of the material.

Figure 3:
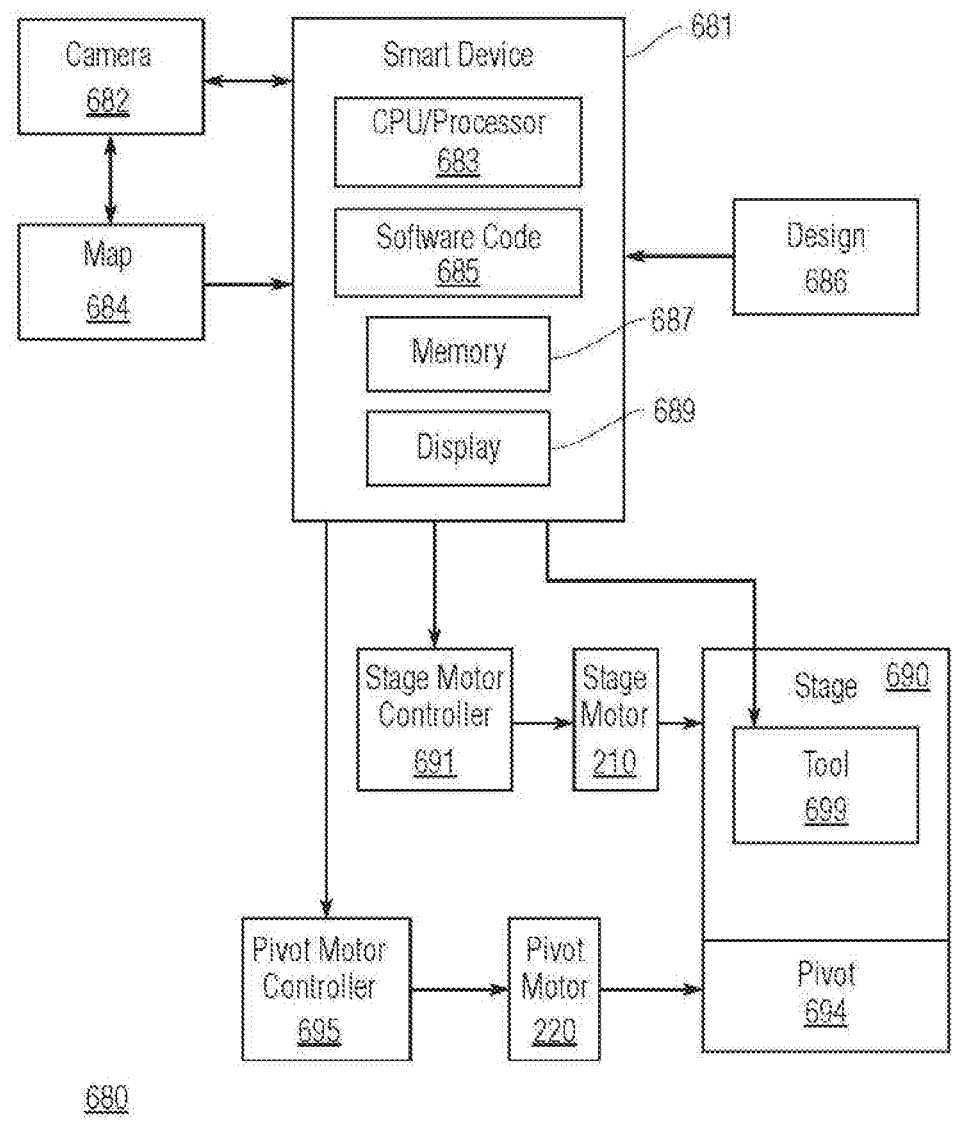
FIG. 3 is an illustrative block diagram of an embodiment of a system for automatically guiding tools.

Referring to FIG. 3, an illustrative block diagram of an embodiment of a system for automatically guiding tools is shown. In some embodiments, the system 680 includes a smart device 681. The smart device 681 may include at least one central processing unit ("CPU") or processor 683, and may include software code 685 that performs one or more processes, at least one memory 687, or at least one display 689. The smart device 681 may include a self-contained unit or the smart device 681 may include components that are not self-contained or separated. For example, the display 689 may be tethered to the smart device 681 or integrated into the housing of the smart device 681. In some embodiments, the smart device 681 may be integrated as part of the system 680 so that the system is a self-contained portable unit.

In some embodiments, a rig may include motors (e.g., 210, 220), actuator assemblies (e.g., stage 690, pivot 694), and an adapter (e.g., clamp, chuck) holding the working member. In some embodiments, a computing device without a display or a camera may be removably coupled with the components on the rig. The computing device may include one or more memories operatively coupled to one or more processors, wherein one of the one or more memories may have instructions stored thereon that, when executed by one of the processors, cause the system (including the computing device and the rig) to execute one or more of the disclosed embodiments. In some embodiments, a display may be operatively coupled to one of the one or more processors in the computing device. In some embodiments, the computing device may include the display. In some embodiments, one or more sensors (e.g., cameras, ultrasonic sensors) may be operatively coupled to one of the one or more processors in the computing device. In some embodiments, the computing device may include one or more sensors (e.g., cameras, ultrasonic sensors).

In various embodiments, the system 680 can include one or more sensors to facilitate determining a location of the tool (e.g., IR, lasers, ultrasonic range finding, etc.). For example, and in some embodiments, the system 680 can include a camera 682 that can be used in combination with the smart device 681 to build a map 684 of the material to be worked on. The camera 682 may be coupled or attached to any tool 699 to provide positioning for that tool 699. In some embodiments, the camera 682 is coupled with a display 689 and CPU 683. For example, the camera 682 may be part of a computer or smart device 681 that can be attached or coupled to any tool 699. A software application or code 685 can be installed on a mobile smartphone and can utilize the camera, CPU, memory, and display of the smartphone. In some embodiments, one or more aspect of the software or processing may be performed by a field programmable array device ("FPGA") or a digital signal processor ("DSP").

In some embodiments, the camera 682 can take images with a high-frame rate. For example, the camera can scan the surface of the material to obtain scanned data or scanned image data. In some embodiments, the camera may scan the surface of the material and a processor can process the scan to generate scanned data that indicates a map of the surface of the material. This may facilitate location functions or mapping functions disclosed herein. The camera 682 can also take images with a relatively low-frame rate and the camera 682 can be coupled with one or more optical sensors (e.g., sensors in optical computer mice). The optical sensors may provide low-latency dead reckoning information. These optical sensors may be used in conjunction with the camera 682. For example, the camera 682 may provide accurate global position information a few times a second and appreciable lag, and the optical sensors may be used to provide dead-reckoning information with low lag that fills in the time since the last image was taken. In some embodiments, accelerometers may be used for dead-reckoning. The system 100 may use multiple cameras to increase the accuracy or range of coverage when scanning, or to provide depth information.

In some embodiments, the system 100 is configured to build, generate or otherwise receive a map 684. In some embodiments, the map 684 may be built using computer vision ("CV") or sensors techniques. For example, a CV technique may be used to build a photo mosaic. A photo mosaic process may include taking multiple photographs of different parts of the same object and stitching at least two of the photographs together to make at least one overall image covering some or all of the object.

In some embodiments, the system 680 or processor may be configured to evaluate the scanned data using a technique that includes simultaneous localization and mapping ("SLAM"). SLAM may include using a sensor that is communicatively coupled with a processor 683 and related software 685 to build a map 684 of the material being worked on (or "target material") while determining (e.g., simultaneously) the location of the tool 699 relative to the map 684. For example, after building at least a portion of the map, a camera 682 may capture images of the material being worked. The images may be fed to and processed by the smart device 681 to determine the location of the tool 699 or rig. The system 680 may analyze the captured images based on the map 684 to determine the location of the camera 681 relative to the material. Upon determining the location of the camera 682, in some embodiments, the system 680 may identify that the location of the rig is a known or determinable offset from the position of the camera 682, which may be rigidly attached to the rig.

In some embodiments, to build a map, one or more processors (e.g., CPU/Processor 683) of a system (e.g., system 680) use one or more cameras (e.g., camera 682) to capture one or more images of the working surface. In some embodiments, one or more processors may analyze each captured image to identify marks or markers on the working surface. In some embodiments, the marks may be related to features of the workpiece (e.g., wood grain patterns). In some embodiments, the markers may be placed on the working surface by a user. For example, the user may apply a tape with markers having coded patterns (e.g., barcode, 2D-code) that are printed along the length of the tape at a given pitch. In some embodiments, each pattern may have an encoded ID that may be decoded by one or more processors using an image of the pattern and image processing algorithms. The encoded ID for each marker may not be unique. For example, a tape with markers having coded patterns may include 100 unique IDs that repeat. In this example, a working surface may have two markers with the same encoded ID if a user uses a long section of the tape or non-continuous sections of the tape. In some instances, a marker's encoded ID may be incorrectly decoded by one or more processors (e.g., based on debris covering the coded pattern) which may lead to two markers having the same ID.

In some embodiments, to generate a map using a set of captured images, one or more processors analyze each image to identify marks/markers. For each image in the set of captured images, data corresponding to an image ID for the image and mark/marker information, including mark/marker ID and position information for each mark/marker in the image, is determined. In some embodiments, the marker ID may be based on the encoded pattern's encoded ID. In some embodiments, the mark ID may be based on a characteristic of the mark (e.g., based on the color if the mark is a wood grain pattern). In some embodiments, data, including image ID and image-level mark/marker information, for all images in the set of captured images is analyzed together subject to constraints derived from the images where the marks/markers appear (e.g., relating to each mark's/marker's position in each image) using feature-mapping CV or SLAM techniques to determine the mark/marker positions. In some embodiments, the resulting mark/marker positions along with the corresponding mark/marker IDs are used to generate a global list of mark/markers (e.g., for each mark/marker, using an ID and position), wherein "global" is used to indicate that this list of marks/markers is not specific to any one captured image, this list may contain information about marks/markers that only appear in some captured images, and that it is possible that no one captured image contains all marks/markers in the list. As used herein, a "list" may have any format and may use any data structure to store information related to the list elements.

In some embodiments, the position for each mark/marker may be expressed using six or fewer than six degrees of freedom. In some embodiments, the position of each mark/marker is given as an X coordinate, a Y coordinate, and an orientation angle with respect to the X-axis (assuming the mark/markers all like in a 2D plane). In some embodiments, in addition to using the dimensions or pitch of the markers, if known in advance (e.g., if they are known patterns printed on the tape), one or more processors may use one or more measurements (e.g., made by the user) of features included in the working surface to adjust the dimensional scaling of the mark/marker positions along one or more dimensions.

In some embodiments, the system may use the global list of marks/markers as a map. In subsequent processing to determine the location of a camera using the map, a new image of the working surface may be captured by the camera. The captured image may be analyzed, by one or more processors (e.g., CPU/processor 683), to identify the marks/markers included in the new image. In some embodiments, a new list of marks/markers (e.g., for each mark/marker, using a mark/marker ID and information about where the mark/marker appears in the image) is generated based on the marks/markers identified in the new image. If markers with coded patterns are used, in some embodiments, a list of sub-features (e.g., for each sub-feature, using a sub-feature ID and the sub-feature's position in the new image) making up the identified markers in the new image is generated. For example, if the marker is marker 708 as shown in FIG. 7B, the number of sub-features in that marker would be 10 based on the 10 white blobs in the marker. Assuming the new image includes the collection of markers shown in FIG. 7B, the list of sub-features would include all white blobs across all 55 markers.

If markers with coded patterns are used, in some embodiments, one or more processors may identify a candidate list of markers from the global list as a match for the markers in the new list based on a match of one or more marker IDs between the two lists. In some embodiments, one or more processors may compare the marker IDs of nearby markers if the marker ID of a marker in the new list matches the marker ID of a marker in the global list. In some embodiments, the one or more processors (e.g., CPU/Processor 683) used to identify a candidate list of markers from the global list as a match for the markers in the new list may execute instructions, stored on one or more memories (e.g., Memory 687), that implement mathematical modeling (e.g., RANSAC), pattern searching, or graph traversal algorithms. After a list of markers in the global list is matched to the list of markers in the new list, in some embodiments, a global list of sub-features (e.g., for each sub-feature, using a sub-feature ID and the sub-feature's position) is generated for the matched list of markers in the global list. In some embodiments, the sub-feature ID in the global list of sub-features is based on the marker ID in the global list of markers. In some embodiments, the sub-feature position in the global list of sub-features is based on the marker ID and marker position in the global list of markers. In some embodiments, one or more processors may use the list of sub-features and the global list of sub-features and one or more mapping algorithms (e.g., methods to solve perspective-n-point problem) to determine the location of the camera when the new image was taken.

In some embodiments, the photo mosaic or a single image showing the working surface (e.g., taken with a DSLR camera, taken with Camera 682 of system 680) may be used as a map. In some embodiments, a new image of the working surface, captured by a camera (e.g., Camera 682 of system 680), may be compared with the photo mosaic to determine the location of the camera. In some embodiments, a combination of the photo mosaic and the global list of marks/markers may be used as a map for determining the location of a camera (e.g., Camera 682 of system 680) based on an image of the work surface (including one or more marks/markers) taken with the camera. In some embodiments, a new image of the working surface, captured by a camera (e.g., Camera 682 of system 680), may be compared with the single image to determine the location of the camera. In some embodiments, a combination of the single image and the global list of marks/markers may be used as a map for determining the location of a camera (e.g., Camera 682 of system 680) based on an image of the work surface (including one or more marks/markers) taken with the camera.

Various embodiments may use various other location processing and determining technologies including, e.g., integrating wireless position sensing technologies, such as RF, near field communication, Bluetooth, laser tracking and sensing, or other suitable methods for determining the position of the tool 699 on top of the workpiece. For example, ultrasonic, IR range finding, or lasers can be used to detect the location of the tool relative to a work area or surface of a material. The detected location of the tool can be provided to any other component of the system 680 to facilitate guiding or adjusting the position of the tool in accordance with an embodiment.

In some embodiments, the system 680 may be configured to compute the location of the tool 699 relative to the rig using the current orientations of the motor shafts. For example, the system 680 may identify the orientations of the motor shafts by homing them and then tracking one or more acts taken since the homing process. In some embodiments, the system 680 may use encoders could be used instead of homing as the encoders would be able to tell the orientations of the shafts directly. Through the offsets and calculations, the system 680 can identify the location of the tool 699 or rig relative to the material being worked on. The captured images that can be analyzed against the map 684 may include, e.g., characteristics of the material such as wood grains and deformations or may include markers placed on the material. Various aspects of the mapping and location technology will be described in more detail below.

In some embodiments, the system 680 may receive a design 686 or template. For example, the smart device 681 may be configured to receive the design 686 or template from a user of the system 680. The smart device 681 may include or have access to various input/output devices configured to receive the design 686. In some embodiments, the system 680 may receive the design 686 via a network. In some embodiments, the user or system 680 may modify or adjust the design 686 based on the map 684. For example, a user may adjust the size of the design 686 relative to the map 684 of the material in order to generate a desired working path on the material being worked on. In some embodiments, the system 680 may automatically adjust or optimize the size of the design based on the dimensions of the material.

The network may include computer networks such as the Internet, local, metro, or wide area networks, intranets, and other communication networks such as mobile telephone networks. The network can be used to access web pages, online stores, computers or data of a retail store that can be displayed on or used by at least one user device, system 680, or system 100, such as, e.g., a laptop, desktop, tablet, personal digital assistants, smart phones, or portable computers.

The system 680 may be configured to create, capture, or load designs 686 in a plurality of ways. In some embodiments, designs may be downloaded or otherwise obtained. For example, a user may generate a design on a computing device and transfer or otherwise convey the design to the system 680. In another example, the system 680 may receive the design from a third party entity. For example, a user may purchase a design online via a network and upload the design to the smart device or computer 681. In some embodiments, the system 680 may facilitate capturing a map of the surface and also of the design 686 on that surface. This may facilitate setting up the system 680 to follow a specific line or to show the user an image of the surface of the material underneath a large tool that obstructs sight, or to show the surface with a drawn plan in a pristine state before it is covered with debris or the surface on which the plan is drawn is cut away. In some embodiments, the design 686 could be designed, altered, or manipulated from its original form on the device 681 through a menu driven interface allowing the user to input distances, angles, and shapes or to free hand a drawing on a touch sensitive pad or display.

In some embodiments, while a user moves the system or rig 680 along the target material, the smart device 681 processes the captured images from the camera 682, determines the location of the rig 680, or provides a desired path to the user on display 689. Once the user has placed the rig 680 close to the desired path, the rig or system 680 may automatically adjust the position of the tool 699 to achieve the desired working path in accordance with the loaded design 686. The term "rig" and "system" may be used interchangeably as described herein. In some implementations, the rig includes the physical device and its attachments, and the system includes the physical device, its attachments, and related technology and software code embedded or included in some of the physical elements.

In some embodiments, the system 100 builds the map 684 based on images captured by the camera along an arbitrary path of the target material until the entire area of interest has been covered. For example, a user may sweep the camera 300 in an arbitrary path over the surface of the material until the entire area of interest has been covered. In some embodiments, the system 100 can be configured such that the camera 682 can be removed from the rig 100 to sweep or pass over an area of the material. The system 100 may stitch together the images obtained by the camera 682. For example, the system 100 may use an image mosaic software code 685 to form a cohesive map 684 of the area of interest of the surface of the material. The system 100 may store the map 684 in memory 687. Upon receiving an image taken by the camera 682 of mapped material, the system 100 can compare the image with the map 684 held in memory 687 and may further determine a position and orientation. For example, the system 100 may determine, based on the comparison, the position of the tool, drill, system, cutting member, stage, or rig.

In some embodiments, the system 680 may allow a user to create and load a design 686 after the map 684 has been assembled. For example, after the map 684 has been assembled on the smart device 681 (such as a computer), the user may create a design 686 on the computer by plotting it directly on the generated map 684. For example, the user may mark positions on a piece of wood where a drill hole is desired. The techniques and features of the software code 685 (include computer aided design and manufacturing) can be employed to create a design with accurate measurements. Then, when the user returns to the material, the position of the camera 682 on the map 684 may be displayed on a screen or display 689 to the user, with the design plan 686 overlaid on the map 684. For example, the system 680 can display on the display device a map image overlaid with an indication of a position (e.g., position of the sensor, device, cutting tool or drawing tool) relative to the surface of the material. In some embodiments, the system 680 may identify the location of the tool relative to the map. For example, the camera 682 may be attached to a drill and used to determine the position of the drill exactly relative to target drill locations specified in the design 686, facilitating the user to line up the drill more precisely.

In some embodiments, the system 680 is configured to build the map and track the camera's position using visual features of the target material. In some embodiments, the software 685 includes instructions to build the map and track the camera's position using visible features of the material such as grains, imperfections, or marks. The target material may be altered to facilitate mapping and tracking functions. For example, solid colored plastic may be too undifferentiated for the system 680 to effectively map or track. Therefore, a user may, e.g., alter the material surface in some way to add features that can be tracked. In another example, the system 680 may instruct a marker to arbitrarily add features that can be tracked. For example, features that may be added may include ink to the material that is typically invisible, but which can be seen either in a nonvisible spectrum or in the visible spectrum when UV or other light is applied, allowing the camera to track the pattern of the invisible ink while not showing any visible markings once the work is done. In some embodiments, the user may apply stickers with markers which can later be removed. Features could also be projected onto the material such as with a projector. Or, if the user will later paint over the material or for other reasons does not care about the appearance of the material, the user could simply mark up the material with a pencil or marker.

In some embodiments, the marker tape or stickers may include a unique sequence of barcodes over the entire length of the tape. In some embodiments, the marker tape may be thin such that the device may pass over the marker tape without getting stuck or disturbed. In some embodiments, the tape may be designed and constructed such that it will stay down as the device moves over the tape, but can also be easily taken off upon completion of the project. Marker tape materials may include, for example, vinyl or any other suitable material.

In cases where the camera cannot track the material, or cannot do so accurately enough, or the material is unsuitable for tracking (e.g. due to an uneven surface), or any other reason that prevents the camera tracking the surface directly, the camera may track other markers off of the material. For example, the user may put walls above, below, or around the sides of the material being worked on that have specific features or marks. The features or marks on the surrounding surfaces may enable the camera to determine its position on or relative to the material. In various embodiments, different types of positioning technology or devices may be used to locate the tool 699 or stage 690, possibly in conjunction with a camera 682 that is used mainly for recording the visual appearance of the material without needing to perform the tracking function. Positioning technology may include, e.g., ultrasonic, IR range finding, or lasers, for example.

The system 680 can adjust the precise location of the tool 699 by adjusting the location of the stage 690 or a moveable platform to which the tool 699 is attached. The stage 690 may be connected to an eccentric coupled to a motor shaft. As the motor shaft moves in a circular path the eccentric moves the stage 690 in complex arcs and paths. A pivot 694 may be connected to the stage and is also connected to an eccentric coupled to a second or pivot motor shaft. The pivot 694 may be configured to pull or push the stage 690 to achieve controlled movement of the stage within a 360 degree window. By controlling the rotation of the eccentrics, the system 680 may position the stage in almost any XY position in the window.

In some embodiments, the system 680 uses a reference lookup table to facilitate guiding the tool. For example, a reference look table may include motor coordinates related to desired stage positions. In some embodiments, the system 680 may compute calculations that can be used to adjust the motors that move the stage 690 and the cutting bit of the tool 699 connected to the stage 690 to the desired location. In some embodiments, the system 680 may move the tool 699 360 degrees in a two dimensional plane by positioning the stage 690 and pivot 694. For example, the cutting instrument of the tool can be moved anywhere within the 360 degree window of the adjustment region.

In some embodiments, electric motors may move, position or adjust the stage 690 and pivot 694. A stage motor controller 691 may control the stage motor 210. A pivot motor controller 695 may control the pivot motor 220. The stage motor controller 691 and pivot motor controller 695 may receive information that includes the desired location or coordinates from the smart device 681. Based on the received information, the stage motor controller 691 and pivot motor controller 695 may activate and control their respective motors 210, 220 to place the stage 690 and the pivot 694 in the proper or desired position, thereby positioning the tool in the desired location.

In some embodiments, the smart device 681 may communicate with, receive information from, and control the tool 699. For example, the smart device 681 may send instructions to power on or off or increase or reduce speed. In some embodiments, the instructions may signal when to engage the target material by, e.g., adjusting the depth of the tool 699 when the user is close enough to or near the desired path on the material.

Figure 4:
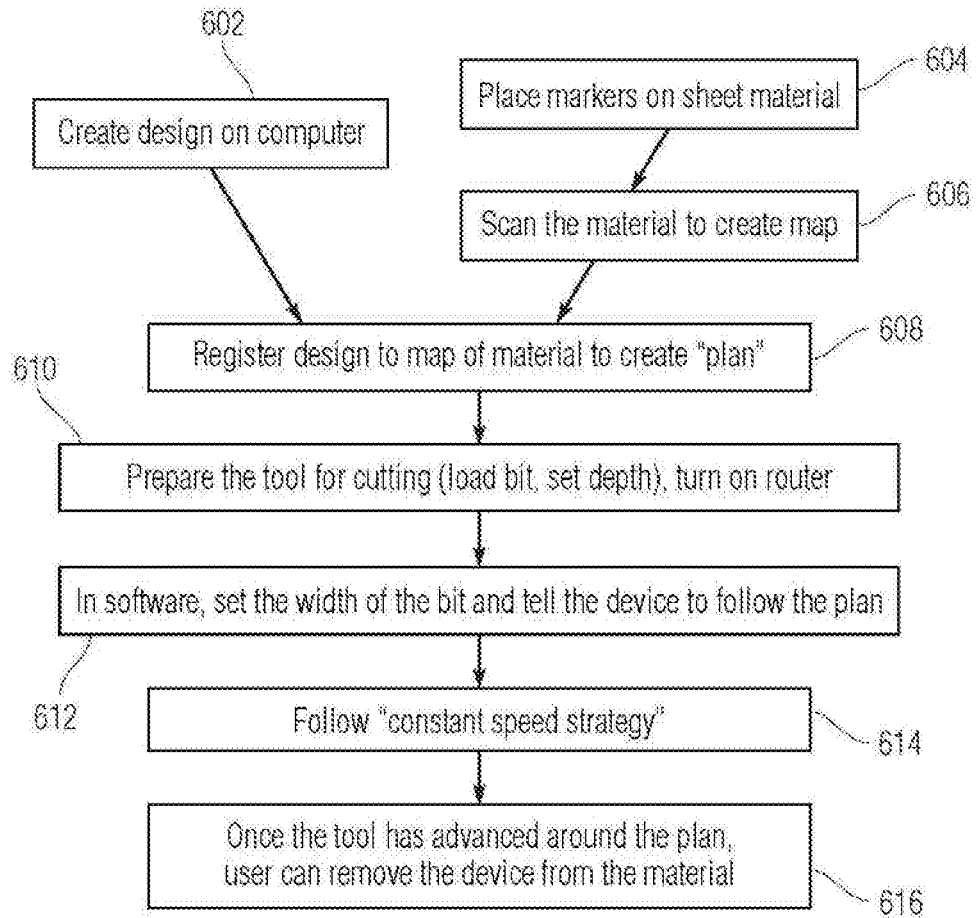
FIG. 4 is an illustrative flow chart of an embodiment of a method for automatically guiding tools.

FIG. 4 provides an illustrative flow chart of an embodiment of a method 600 for performing a task on a target material. For example, the method 600 may facilitate cutting a working surface using a router based embodiment. In some embodiments, at act 602 the user may find or create a design they want to cut out of a material. In some embodiments, the task may include a plurality of tasks (e.g., a first task and a second task that may be a subset of the entire task). For example, the task of cutting the design out of the material may comprise a first task of cutting a first portion of the design and a second task of cutting a second portion of the design. In some embodiments, the first and second task may be substantially similar (e.g., same type of cutting or drawing tool), while in other embodiments the first and second task may differ (e.g., different drill bit or drawing tool, different type of cutting tool, different user device, different area of the material, etc.).

Prior to or subsequent to identifying the design plan, the user may map the surface of the material or sheet of material. If the material has enough markings the user may use the material itself. However, in act 604, if the material has a flat surface or limited markings the user can place markers on the material. Markers may include, e.g., printer marker stickers or other type of suitable indicia capable of being readily identified.

In some embodiments, at act 606, a sensor may scan the material to obtain scanned data. For example, a camera scans the material and the various markers to create the map. The CPU may process the images captured by the sensor or the camera and generate the map or scanned data. The size and shape of the map can be appropriately manipulated to a preferred configuration. In some embodiments, at act 608, the design is registered or otherwise related to the map to create a cutting plan.

In some embodiments, at act 610, the cutting tool is prepared to perform the task. For example, a user may load, adjust, or secure the bit, mount it to the rig and turn the router on. In some embodiments, the system may turn on the router via a software initiated process in response to one or more parameters, including, e.g., motion sensing of a movement of the rig 100 in a particular direction by the user.

In some embodiments, at act 612, the system may receive various settings. For example, the user may set the width of the bit of the cutting tool, the range (e.g., area) of the tool's adjustment region, the size of the cross-hair, or the speed of the cutting tool. Thereafter, instructions may be provided to the software to begin the task.

In some embodiments, at act 614, the rig is placed adjacent to the desired path so that the system can automatically adjust the position of the tool into a starting adjustment region position along the desired path. The user may then follow the constant speed strategy as described herein, for example with regards to FIG. 3. In some embodiments, once the tool has advanced fully around the plan (act 616) the user can remove the device and work product from the material.

Figure 5:
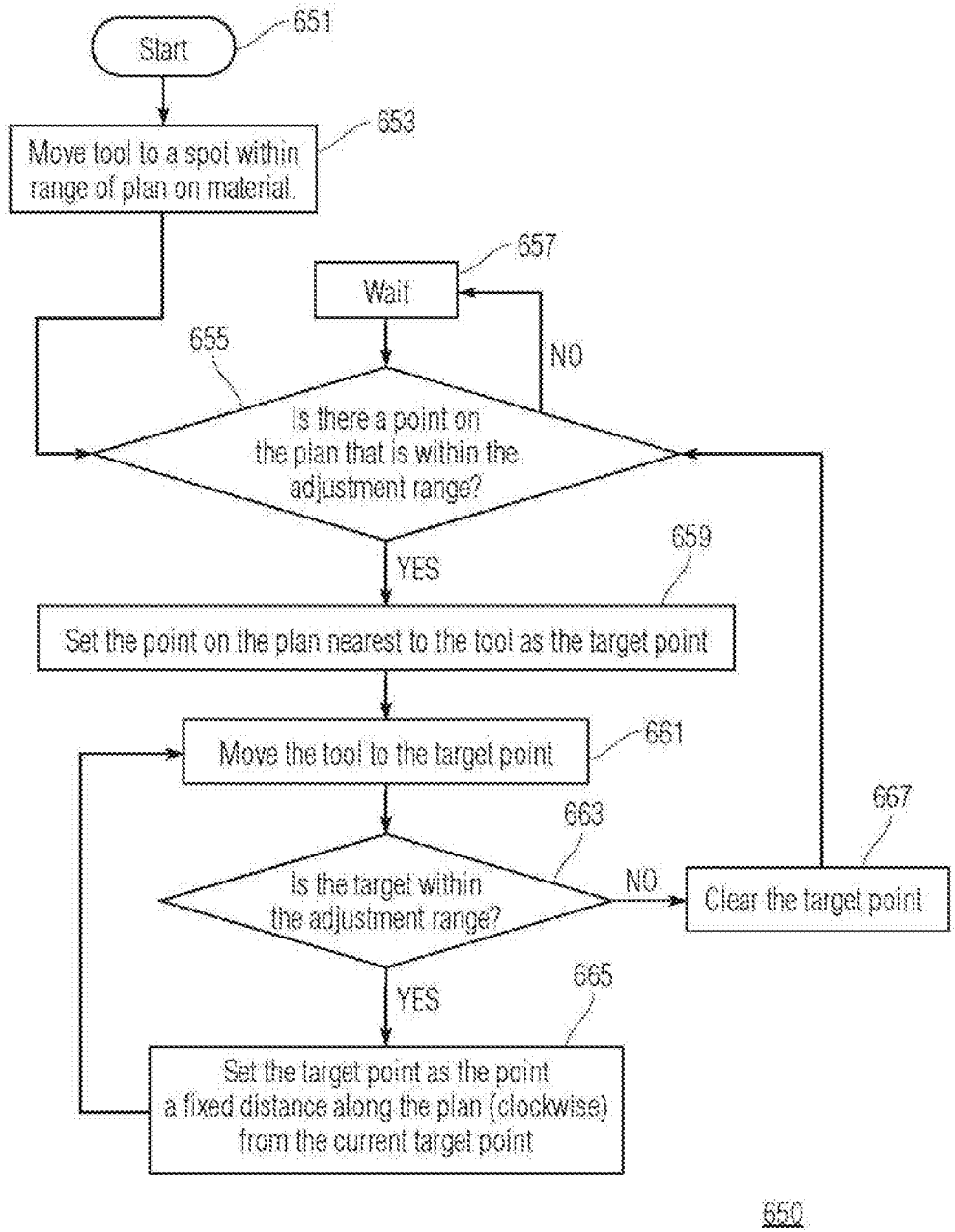
FIG. 5 is an illustrative flow chart of an embodiment of a method for automatically guiding tools.

FIG. 5 shows an illustrative flow chart of an embodiment of a method 650 for the constant speed strategy. The process in FIG. 3 assumes the user already has the router attached to the rig and has mapped their material and loaded up their design. In some embodiments, at act 651, the user starts the process to cut the material. The process can include moving the tool to a spot within the range of plan or path on the material (act 653). For example, a user may move the tool or the tool may be remotely controlled.

In some embodiments, the process includes determining, based on the location of the tool, whether there is a point on the plan within the adjustment region of the rig (act 655). In the event that there is no point within range, the process may include sending a notification (e.g., via the display, audio, vibration, light, or LED) and waiting until the user moves the device within the adjustment region (act 657).

In some embodiments, if there is a point within the adjustment region, the process includes, at act 659, setting the point on the plan nearest to the tool as the target point. In some embodiments, the process may include moving the tool to the target point and cuts the material (act 661).

In some embodiments, the process includes creating a second target by determining if a new target is within the adjustment region (act 663). If there is a second target, the process may include setting the second target point as the new target (act 665). The device may continue to move in a clockwise direction, cutting from the old target point to the new target point. In some embodiments, the process may include identifying the next target point within the adjustment region (act 663) while the tool or router is cutting from the old target point to the new target point. For example, the determination of an optimum or desired second target may be continuous, and based on the image, or various images, detected from the camera and processed by the system.

If there is no target point within range, in some embodiments, the process includes clearing the target point (act 667) and starting at act 655 to determine whether there is a point on the plan within the adjustment region. In some embodiments, this process continues until the tool has gone through the all or part of the plan in a particular direction, such as a clockwise direction.

In some embodiments, the mapping phase may be bypassed if the material size is greater than the design. For example, the user may determine a starting point that corresponds with a region on the design (i.e. the top right corner) and the system 800 may start painting the image.

The embodiments discussed herein so far have focused on rigs that accommodate a tool being attached to a stage and the stage is moved or controlled by one or more motors. The linear design depicts a router moved by a motor where the router is connected to a linear stage. In such instances, the router is attached or mounted as a separate unit. However, the system can be designed as one unit where the stage, motors moving the stage, controllers, and all within the same housing and within the same power system as the housing and power of the tool. By way of example, the router housing would be enlarged to fit the stage and motors and might include a display integrated into the housing. Through such an embodiment, the form factor might be improved to look like a one piece tool.

The embodiments presented here are not meant to be exhaustive. Other embodiments using the concepts described herein are possible. In addition, the components in these embodiments may be implemented in a variety of different ways. For example, a linear stage, or a hinge joint, or an electromagnetic slide, or another positioning mechanism may be used to adjust a tool or the stage the tool is on in reaction to its detected position and its intended position.

By way of example, the systems and methods described herein can be used with drills, nail guns, and other tools that operate at a fixed position. In such embodiments, the tool and software could be modified such that the plan includes one or more target points instead of a full design. The device could be moved by the user such that a target position is within the adjustment region. The software could then move the tool to the correct target position. The user could then use the tool to drill a hole, drive in a nail, or perform other operations.

In some embodiments, the tools can facilitate performing a task without providing automatic adjustment. For example, the stage, pivot, motors, and eccentrics could be removed. The tool could be attached to the lower stage housing. The software could be modified such that the plan includes one or more target points. The user could move the device such that the tool is directly over the target position. The user could use the location feedback provided on the display to perform accurate positioning.

In some embodiments, the present disclosure facilitates guiding or positioning a jigsaw. A jigsaw blade may be rotated and moved in the direction of the blade, but not moved perpendicular to the blade or it will snap. The present disclosure may include a rotating stage that can be placed on top of the positioning stage. The jigsaw may be attached to this rotating stage. The software may be modified to make the jigsaw follow the plan and rotate to the correct orientation, and made to ensure that the jigsaw was not moved perpendicular to the blade. In some embodiments, a saber saw may take the place of the jigsaw to achieve the same effect. The cutting implement may be steered by rotating the rotating stage, and the cutting implement could be moved along the direction of cutting by moving the positioning stage.

In some embodiments, the system may support rotation and not support translation. For example, the system may automatically orient the blade in a scrolling jigsaw (e.g., a jigsaw with a blade that can be rotated independently of the body). In this embodiment, the software may steer the blade to aim it at the correct course and the user may be responsible for controlling its position.

In some embodiments, the system may position a scroll saw. For example, the camera may be coupled to the scroll saw, and the user may move the material. The upper and lower arms of the scroll saw may be mechanized such that they can move independently by computer control. The user may then move the material such that the plan lay within the adjustment region of the scroll saw, and the software would adjust the scroll saw to follow the plan. In some embodiments, the upper and lower arms could be moved to the same position, or moved independently to make cuts that are not perpendicular to the material.

In some embodiments, the position correcting device can be mounted to a mobile platform. For example, the device may be placed on material and left to drive itself around. The device can also be used in an alternative embodiment in which two mobile platforms stretch a cutting blade or wire between them. For example, each platform may be controlled independently, allowing the cutting line to be moved arbitrarily in 3D, for example to cut foam.

In some embodiments, the system may be coupled or otherwise attached to vehicles or working equipment such as a dozer in which the position-correcting mechanism is mounted on the vehicle. For example, some embodiments of the hybrid positioning system may include a vehicle comprising a first position-correcting system that is accurate to within a first range and a second position-correcting system that is accurate to a second range that is less precise than the first range. The vehicle may be driven over a sheet of material such as a steel plate lying on the ground, and a cutting tool such as a plasma cutter could be used to cut the material. In some embodiments, the present disclosure may facilitate a plotting device or painting device, for example to lay out lines on a football field or mark a construction site. The vehicle, for example, may include an industrial vehicle such as a forklift type vehicle configured to include a cutter or other tool, a camera, and control circuitry described herein to determine location of the vehicle (or the tool) on the material, identify where to cut or mark the material, and adjust the tool to cut or mark the material in the appropriate location.

Figure 6:
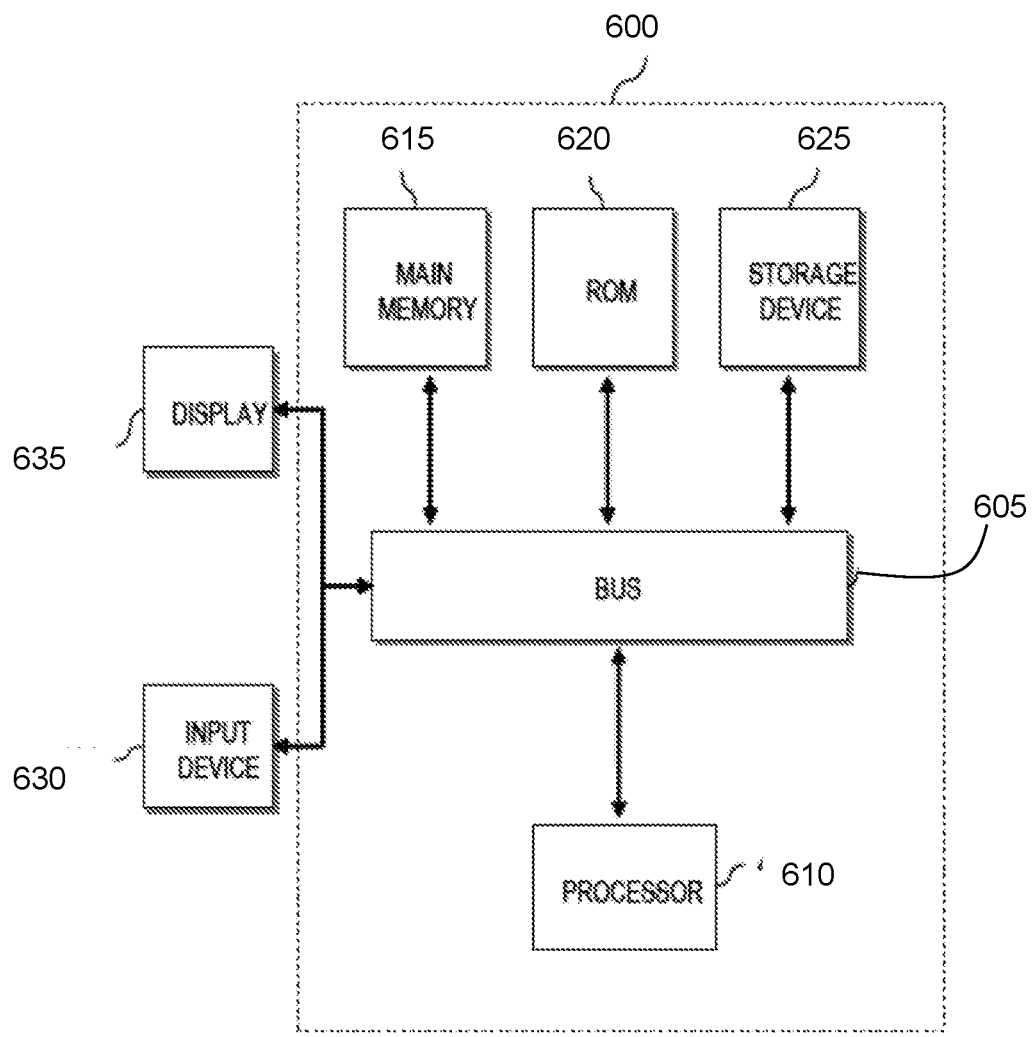
FIG. 6 is a block diagram illustrating a general architecture for a computer system that may be employed to implement various elements of the systems, apparatus and the methods disclosed herein, in accordance with an embodiment.

FIG. 6 is a block diagram of a computer system 600 in accordance with an illustrative implementation. The computer system 600 can be used to implement system 680. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 1220 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 7A:
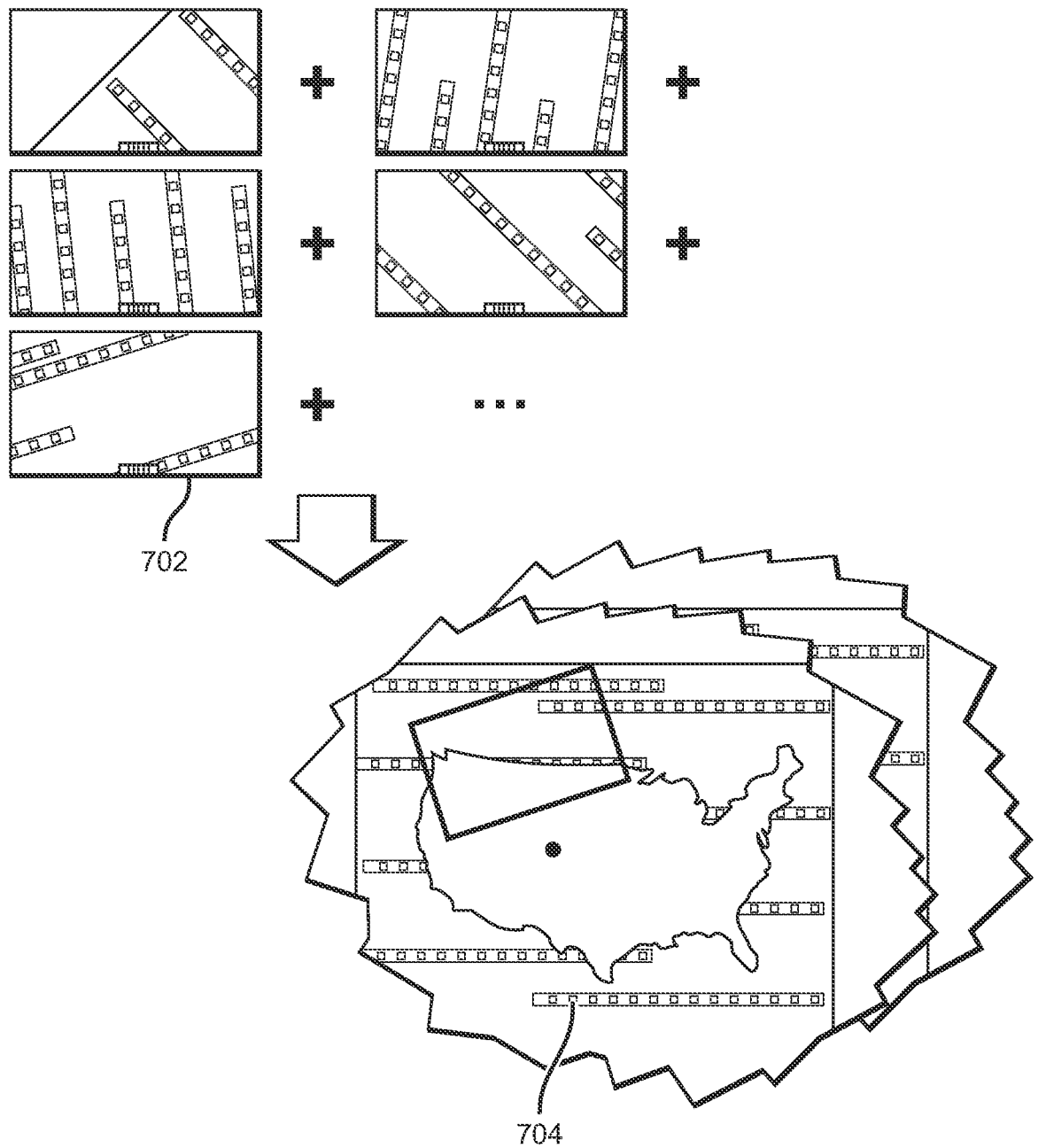
FIGS. 7A-7B are illustrative diagrams of locating markers that may be employed to implement various elements of the systems, apparatus, and the methods disclosed herein, in accordance with an embodiment.
Figure 7B:
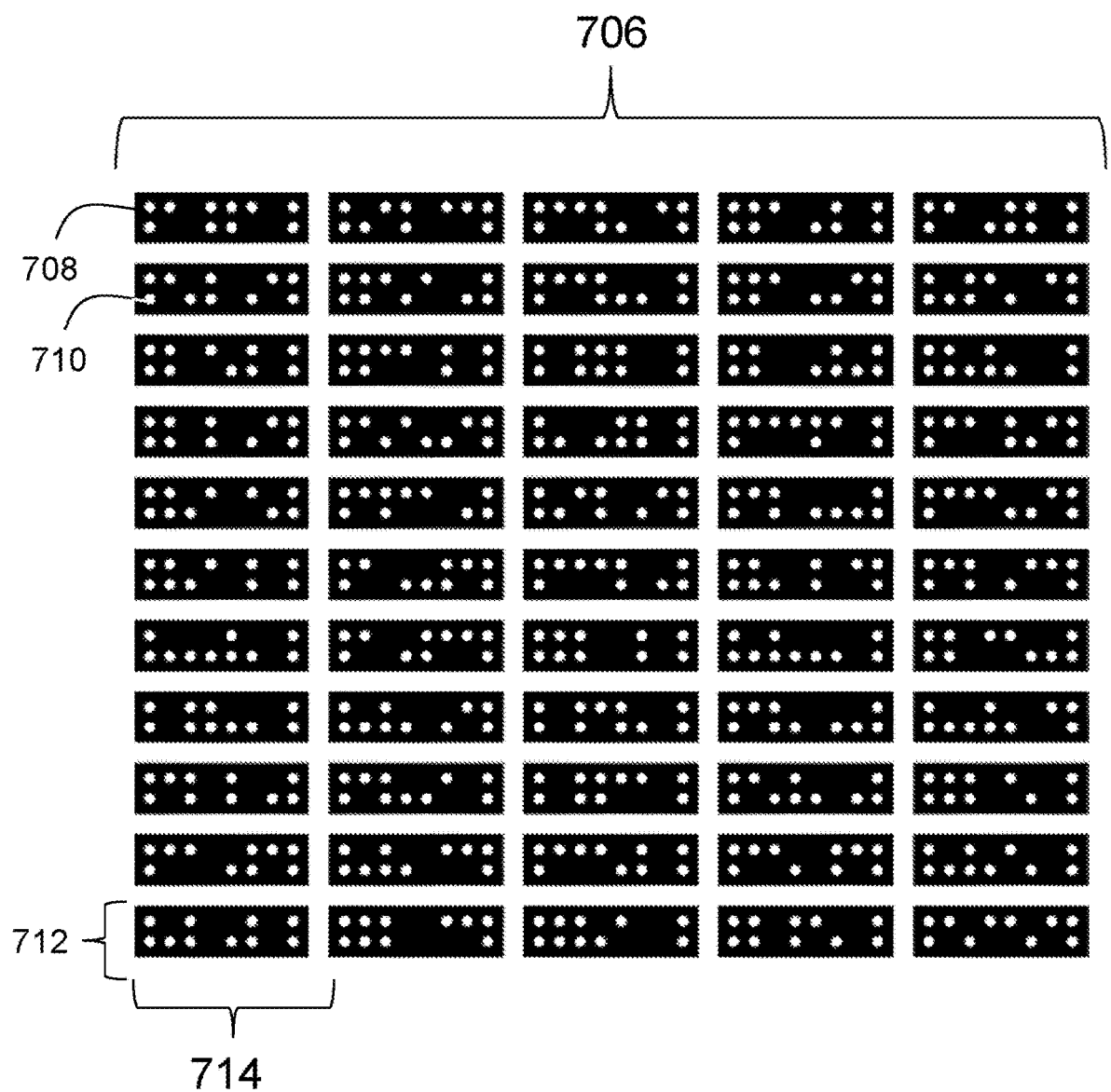

Referring to FIG. 7A, an illustrative example of an embodiment of a design plan and marking material 702 is shown. Placing marking material 704 may facilitate mapping the target material. For example, the target material may not contain sufficient differentiating marks. Adding differentiating marks (e.g., stickers, ink, pencil) to the target material may facilitate the system 680 in mapping the target material and tracking the positioning of the cutting tool during the cutting process. In this example, the design plan is in the shape of a country. The marking material may be placed on the surface of the target material to facilitate mapping the target material and tracking the position and adjusting the position in accordance with the design.

Referring to FIG. 7B, an illustrative example of an embodiment of locating markers 706 is shown. The locating markers 706 may be included as part of the design plan or may refer to a type of marking material 702 used to form the design plan. The locating markers 706 may be placed on the target material and used by the system 680 to map the target material and track a position of the cutting tool relative to the surface of the material.

Locating markers 706 can be designed, constructed or configured such that they are easy for the system 680 to detect and read (e.g., via camera or sensor 682). For example, the locating markers 706 may include dominoes that represent a binarized image. A binarized image may include an image with two values, such as an image with two colors. In some embodiments, the two colors may be selected such a first color of the two colors contrast with a second color of the two colors. For example, the two colors may include white and black, red and white, orange and blue, green and purple, etc. Dominoes-based locating markers 706 may be easy and fast to read by system 680. By using locating markers 706 with a predetermined number of features (e.g., blobs 710), the locating markers 706 can be read from a binarized image contour tree fast. Further, each domino can include a number, which facilitates tracking multiple dominoes. Further, the system 680 can easily determine a subpixel accuracy for each circle 710. In some embodiments, corner circles (e.g., 710) may be present in each of the plurality of dominoes 706. Having a corner circle 710 present in each of the dominoes facilitates reading the locating markers 706, and may allow the system 680 to read the locating markers at increased distances because there is a uniform size of features. Having uniformed sized features prevents a subset of the features from disappearing from the binarized image before all the features disappear. For example, if all the features 710 are the same size, then the system 680 may either detect all the features, or detect none of the features if the locating marker 708 is outside a detection range.

In some embodiments, the locating markers 706 can include a fiducial marker 708. A fiducial marker may refer to a marker that can be detected by system 680 with minimal computation power. In some embodiments, the system 680 can detect the locating markers 700 directly from input that is a black-and-white image (possibly as a binarization of an image with more data, e.g. grayscale or full color).

In some embodiments, the system 680 can detect locating markers 706 using a contour tree of a binarized image. The contour tree may refer to a tree of blobs. A blob may refer to a region of the same color. The contour may refer to or include a border of the blob or the region of the same color. The blob may have a shape, such as a circle, square, triangle, polygon, oval, ellipse, rectangle, pentagon, outline, or another shape that allows the system 680 to detect a location marker.

In some embodiments, the blobs can be organized in a tree such that each node in the tree corresponds to a blob. Further, a node may be a child of another node if the child blob is encompassed by the parent blob. For example, in an image of the capital letter "B", there are four blobs: the white background, the black of the letter, and two white blobs of the inner parts of the B. They are organized in a tree such that the letter is the child of the background and the two inner blobs are both children of the letter.

In some embodiments, location markers may include dominoes as illustrated in FIG. 7B. While rectangle dominoes are illustrated in FIG. 7B, other markers with patterns or other shaped blobs can be used. For example, rather than a rectangle marker 708, the marker may be a polygon, circle, ellipse, square, triangle, pentagon, etc. The blobs 710 may be circles, or other shapes. The collection or plurality of markers may be referred to as a scene 706 or plurality of markers 706 or plurality of candidate location markers 706. A marker 708 may be a candidate marker because the system 680 may perform initial processing to identify the image and determine whether the image is a location marker based on a threshold test or satisfying a criteria (e.g., whether blobs are present in predetermined locations, is there a pattern present, or other signature that indicates that the image corresponds to a location marker 708).

The location markers may include one or more rows 712 including one or more markers 708; and one or more columns 714 including one or more markers 708. In some embodiments, the plurality of location markers 706 or scene 706 may be symmetrical (e.g., a same number of rows and columns). In some embodiments, the plurality of location markers 706 or scene 706 may not be symmetrical (e.g., a different number of rows and columns).

Each of the dominoes 706 may include a recognizable signature in the contour tree. For example, a domino may include 10 white blobs inside a black blob. The white blobs may not have children blobs. The domino configuration may include a contour tree with ten white children that are leaves of the black background tree. Therefore, if the system 680 detects this configuration (e.g., a black blob with 10 white blobs), the system 680 can take the black blob and process it as a fiducial marker. This additional processing may end up rejecting the domino as a marker, or accepting the domino as a location marker. This possibility extends to any recognizable signature in the contour tree, which may involve a variable number of children blobs, as long as it is distinctive enough that just from the contours one can have a good probability that it is a marker and spend additional computational resources to study it closer.

Thus, the system 680 can be configured to perform an initial assessment of a detected image using an initial image processing technique. During the initial processing technique, the system 680 identifies a contour tree to determine if the contour tree matches or satisfies an initial screening. For example, if the system 680 detects a black blob and 10 white blobs (e.g., as shown in domino 708), the system 680 may determine that the image may include a location marker, and forward the image for further processing. By performing an initial assessment, the system 680 can pre-screen images and select a subset of the images for further, more computationally intensive processing. Thus, the system 680 can increase efficiencies and reduce the amount computational resources used to determine the location of a tool relative to a working surface.

In some embodiments, the marker that can be detected extremely quickly by binarizing an input image, computing the contour/blob tree, or looking for a known signature. In some embodiments, binarizing an image can refer to converting an image into black and white colors. In some embodiments, the location marker may encode data into each fiducial (e.g., 708) and be easy to detect. For example, the fiducial marker 708 may encode a number, which allows the system 680 to keep track of (manage, maintain, identify, or determine) multiple fiducials present in a scene (e.g., a scene may refer to location markers 706). The number of the fiducial 708 may be unique in the scene 706, or may not be unique in the scene 706. In some embodiments, marker such as each of the dominoes 708 includes a pattern of white blobs that encodes a number in binary.

In some embodiments, a marker 708 may include blobs (e.g., 710) that are positioned in a predetermined location. A marker 708 may include blobs in each of the four corners, allowing the system 680 to determine not just the presence of the fiducial marker 708 but a layout for it (such as the position and orientation of a marker relative to the camera 682. Including blobs in predetermined positions may improve the ability of system 680 to decode a message encoded in the marker itself. For example, if the blobs are arranged in a grid, recognizing the corners provides a layout of the grid and allows the system 680 to map each grid square to a 1 or 0 for a blob being present or absent. In some embodiments, the system 680 may use the blobs in the predetermined location of the marker to detect the layout of the domino or marker 708, but then parse some encoded data in another way, which may or may not be encoded in the binarized image/contour tree.

In some embodiments, the marker 708 may include blobs that are shapes that can then be resolved with subpixel accuracy by referring back to the full-color (or grayscale) image. For example, the system 680 may identify the blobs as circles (or preconfigured to identify the blobs as circles). The system 680 can determine the bounding box of each blob in the binarized image. The system 680 can then use the corresponding grayscale pixels in the grayscale image to fit an ellipse (circle viewed in perspective) to the pixels, giving a subpixel accuracy. The system 680 may more accurately detect the position and orientation of the fiducial 708 relative to the camera by using this subpixel-accurate detections of the blobs. This position and orientation can then be fed forward in the system 680 for further processing, such as localization of the camera in 3D space.

Figure 8A:
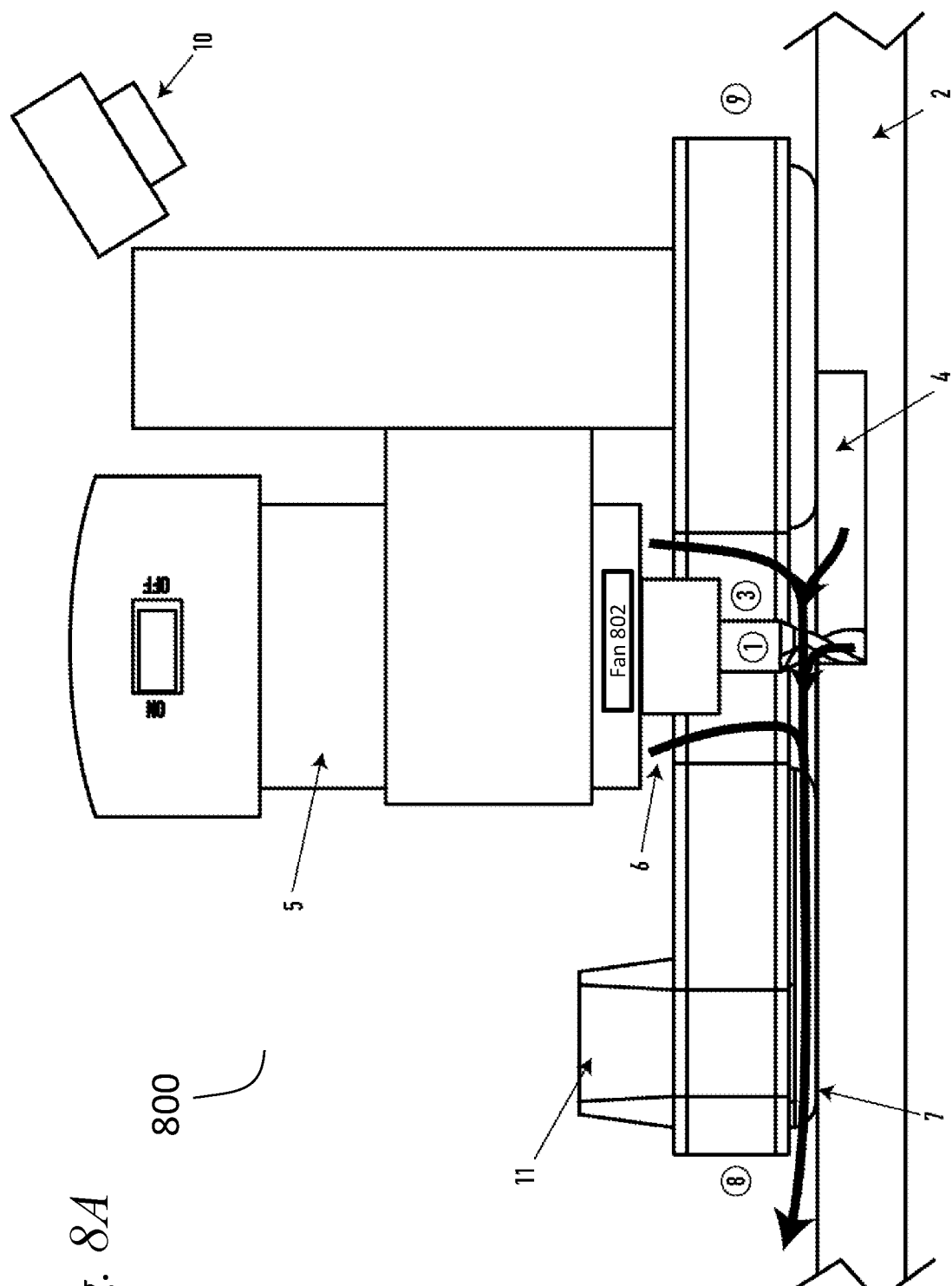
FIGS. 8A-8B are an illustrative example of an embodiment of an apparatus for directing or extracting dust particles that may be employed to implement various elements of the systems, apparatus, and the methods disclosed herein, in accordance with an embodiment.
Figure 8B:
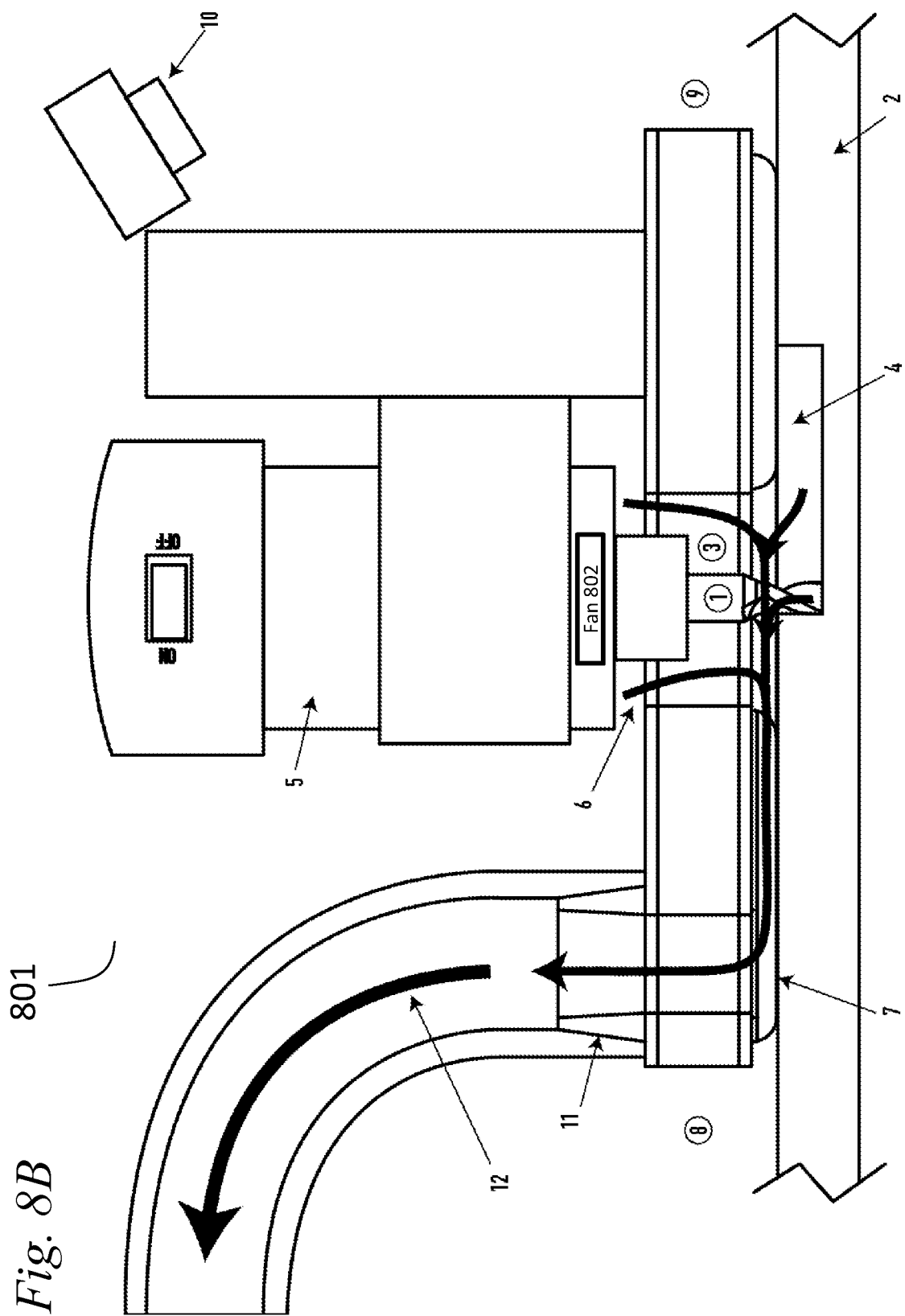

Referring now to FIGS. 8A-8B, systems, methods, and apparatus for directing and extracting dust is shown. Dust extraction may refer to the evacuation of particles of material that have been removed from a bulk workpiece (surface of a material, work surface) during a machining process such as milling, routing, sanding, etc. In the domain of woodworking, the dust may be saw dust. Effectively extracting dust facilitates maintaining a clean working environment, safe air for breathing that is free of dust, and prevents a buildup of dust in the vicinity of the tool that can otherwise impede its cutting action and also result in the generation of excessive heat. Additionally, the accumulation of wood dust can create an explosion risk. Further, for automatically guided tools (such as system 680) that utilize an optical method for localization (e.g., camera 682), dust can interfere with the tool's ability to determine a location of the tool relative to the surface of the material. Systems, methods and apparatus of the present disclosure efficiently evacuating dust from the working area of a tool. In some embodiments, dust can be routed away from the working area in a controlled direction in the absence of a vacuum source.

FIG. 8A illustrates a tool 800 configured to direct and evacuate dust in accordance with an embodiment. The tool 800 includes a rotating cutter 1 (or tool tip, or cutting member, or working member) that shears material 2 as the rotating cutter 1 moves axially, laterally, or a combination thereof through the material 2. The tool 800 includes a tool frame 3. The tool frame 3 may include a cavity formed of a void in the tool frame 3. The cavity 3 may be further formed by a space 4 where portions of working material 2 have been removed or cut away. A cutting member or router bit or tip of the tool can extend through cavity 3. The cavity 3 can form one or more channels or a portion of a channel. The channel directs air flow 6. Channels are further illustrated in FIGS. 9A-9B. The tool can include a camera 10, which can include one or more functionality of camera 682. The camera 10 can include or be referred to as a sensor, such as an image sensor, infrared sensor, or laser sensor.

In some embodiments, the rotational motive power for the rotating cutter 1 may be generated by a router 5 or spindle 5 (e.g., a woodworking trim router, or metal cutting tool, or plastic cutting tool, etc.) that includes an integral fan 802. The fan 802 may be a separate fan that is integrated into the spindle 5, or the fan 802 may refer to an airflow that is generated as a by-product of the spindle 5 rotating the cutting tool 1. In some embodiments, the fan 802 may be external to the tool, such as external to the spindle 5. The fan 802 can include one or more vanes or blades in an arrangement that, when rotated, generates airflow. This fan 802 can generate a downward airflow 6 that drives dust out of the collection cavity formed by the tool frame 3 and space 4 and along channels in the tool's base plate 7. These channels direct dust towards the front of the tool 8, which keeps dust from accumulating to the rear of the tool 9 where an optical locating system 10 (e.g., camera 682) may be aimed. In some embodiments, the front 8 of the tool 800 may refer to a portion of the tool that faces away from the direction the tool is cutting or a portion of the tool closer to the user of the tool. In some embodiments, the rear 9 of the tool 800 may refer to a portion of the tool that faces the direction the tool is cutting or a portion of the tool further away from the user of the tool. In some embodiments, the rear 9 of the tool refers to the portion of the tool 800 where a camera 10 is aimed. The tool 800 can include a vacuum port 11 that opens into one of the channels formed by voids 3 and 4 that receives air flow 6.

FIG. 8B illustrates an embodiment of a tool 801 similar to tool 800 that includes a vacuum source 12 attached to the vacuum port 11. The vacuum source 12 biases airflow towards the vacuum source 13. This can extract through the connected channel formed by voids 3 and 4 in base plate 7 and into the vacuum source 12. In this configuration, dust may be efficiently removed from the tool without entering the surrounding environment (e.g., rear of tool 9).

The channel formed by cavities 3 and 4 allow the airflow 6 generated by the fan 802 of the tool spindle 5 and the airflow generated by the vacuum source 12 to act along a common path to remove dust. This provides for efficient dust extraction system as the vacuum source 12 is not fighting against the airflow generated by the integrated spindle fan 802.

Figure 9A:
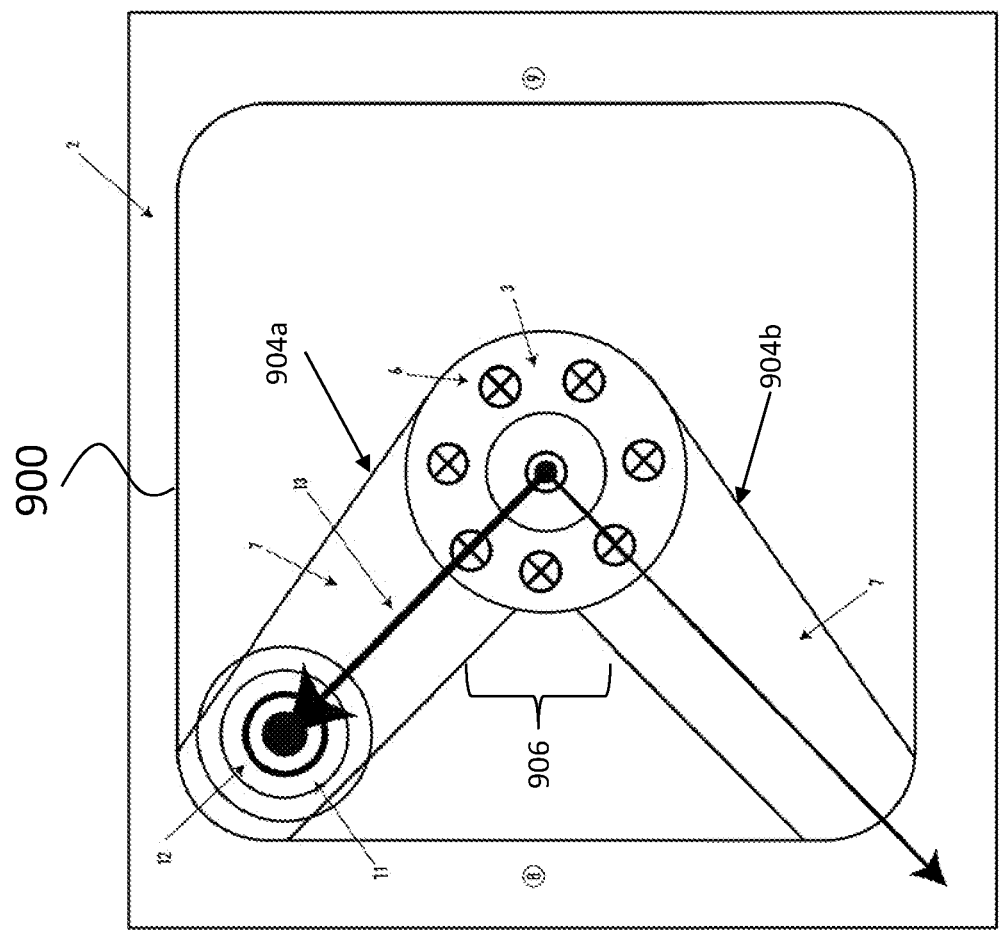
FIGS. 9A-9B are an illustrative example of a top perspective view of an embodiment of a base plate for directing or extracting dust particles that may be employed to implement various elements of the systems, apparatus, and the methods disclosed herein, in accordance with an embodiment.

FIG. 9A illustrates a top-down perspective view of an apparatus 900 for directing and extracting dust. The apparatus 900 may be coupled to, be part of, or be formed of one or more component of systems or apparatus 800 or 801. In some embodiments, apparatus 900 includes the base plate 7 of the tool 800. The baseplate 7 includes channels 904a-b formed by the void or cavity 3 in the base plate 7. A portion of the base plate 7 faces or rests on or is opposite the material 2. The fan 802 generates air flow 6 that flows downward towards the material 2. The vacuum source 12 generates airflow 13 towards the vacuum source 12 and vacuum port 11. The direction of airflow 6 as going towards the material 2 is illustrated by an X, while the airflow 13 shown going towards the vacuum port 11 is illustrated by a dot in a circle.

In some embodiments, the vacuum source may be coupled to one or more switches to control the friction between the base plate and the material. In some embodiments, the base plate may have one or more holes connected to air channels which are, in turn, then connected to the vacuum source by one or more switches. In some embodiments, the switch may be a relay that has one of two states, "ON" or "OFF," coupling the vacuum source to the connected air channel. In some embodiments, the switch may be a relay controlled to apply a variable amount of vacuum coupling between the vacuum source and connected the air channel. In some embodiments, the vacuum source may be controlled electronically (e.g., coupled to the vacuum source current regulator or speed control, coupled to a regulator based on the vacuum source suction/negative pressure).

Figure 32A:
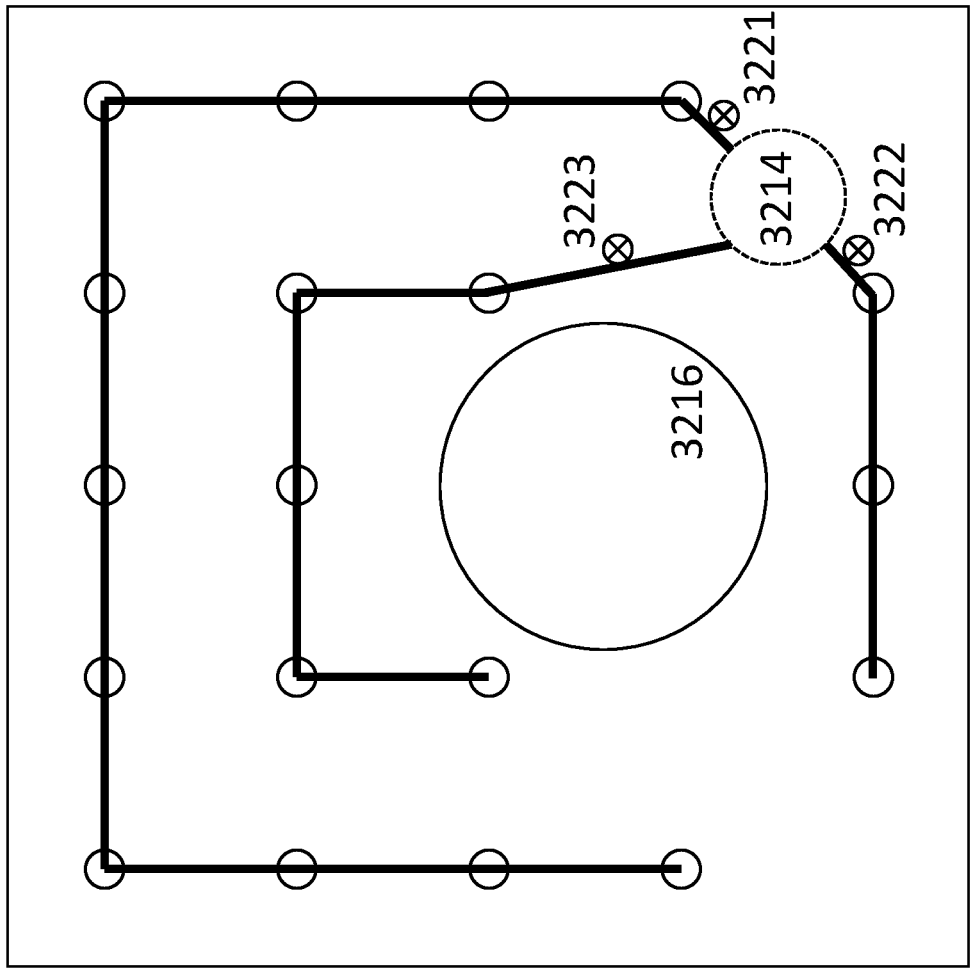
FIG. 32A is a view of a base plate showing an exemplary arrangement of vacuum holes.

In an exemplary embodiment, as shown in FIG. 32A, the base plate 3210 may have 19 holes which are grouped into three circuits connected to the vacuum source 3214 by 3 different air channels (solid lines). Each circuit is connected to the vacuum source 3214 through a switch (e.g., switch 3221, 3222, or 3223) which may be controlled to apply a friction (suction) force between the base plate 3210 and the material surface by applying a vacuum to the holes along the air channel connected to the controlled switch. In the exemplary embodiment, the amount of frictional force between the base plate 3210 and the material surface can be controlled by setting one or more of the switches (switch 3221, 3222, 3223) to the "ON" state with the remaining switches in the "OFF" state. In the exemplary embodiment, the maximum frictional force between the base plate 3210 and the material surface can be applied by setting all switches (3221, 3222, and 3223) to the "ON" state, thereby coupling the vacuum source 3214 to all air channels and all holes. In an exemplary embodiment, the minimum frictional force between the base plate 3210 and the material surface can be applied by setting switch 3222 to the "ON" state and setting switches 3221 and 3223 to the "OFF" state, thereby coupling the vacuum source 3214 to the bottom air channel and the 3 holes connected to the bottom air channel. In some embodiments, the base plate 3210 may be part of the AGS. In some embodiments, the base plate 3210 may be part of the SPS with the AGS mounted to it.

In some embodiments, an adjustable frictional force between the base plate and the material surface may be used to secure an AGS (e.g., the rig, see below) to a given location as a SPS (e.g., a robot arm, see below) moves the AGS. In some embodiments, the adjustable frictional force allows an AGS to mitigate a back reaction force applied by the material to the working member (e.g., cutting bit) during operation (e.g., cutting). In some embodiments, the adjustable frictional force allows an AGS to mitigate a motion of the SPS in instances where the SPS has mechanical compliance that leads to unwanted motion of the AGS (e.g., rocking, vibrations, drift).

In some embodiments, the AGS or SPS may include an electronically controlled switch to turn the vacuum source "ON" and "OFF." In some embodiments, the suction produced by the vacuum source may be used to collect material or cutting debris. In some embodiments, the suction produced by the vacuum source may be used to adjust the friction between base plate and the working surface.

In some embodiments, the channels 904a-b formed in base plate 7 are V-shaped. In some embodiments, there may be two channels 904a and 904b that extend from the cavity 3. In some embodiments, there may be one channel (e.g., just channel 904a). In some embodiments, there may be a plurality of channels (e.g., two or more channels). One of the plurality of channels may include a vacuum port 11 coupled to a vacuum source 12. The channels 904a and 904b may form a U shape. The channels 804 may include a third channel that extends perpendicular to channels 904a and 904b via the cavity 3.

The channels 904a and 904b may form an angle 906. The angle 806 may range from 1 degree to 180 degrees. In some embodiments, the angle 906 may be 90 degrees, 45 degrees, 60 degrees, 120 degrees, etc. The angle 906 may be selected such that dust from material 2 is effectively directed away from the rear 9 of the tool and towards the front 8 of the tool via channel 904a-b and air flow 6 and 13.

The channels 904a-b may include a channel depth. The channel depth may be the same for channel 904a and channel 904b, or may be different among the different channels. The channel depth may be greater than zero. The channel depth may be a value that ranges from 0.02 inches to 2 inches. The depth may be less or greater based on the type of tool or type of material being cut. For example, a size of particles being directed or extracted may determine a channel depth (e.g., shallower channel depth for smaller particles, and deeper channels for bigger particles).

In some embodiments, a first component of the air flow 6 and 13 generated from fan 802 may be greater than a second component of the air flow 6 and 13 generated from vacuum source 12. In some embodiments, a first component of the air flow 6 and 13 generated from fan 802 may be less than or equal to a second component of the air flow 6 and 13 generated from vacuum source 12.

In some embodiments, the air flow generated from vacuum source 12 may be determined such that the air flow holds the tool 800 (or apparatus 900) to the material 2. This may increase the friction between the portion of the tool touching the material, which may increase stability while cutting or performing the task on the material 2.

Figure 9B:
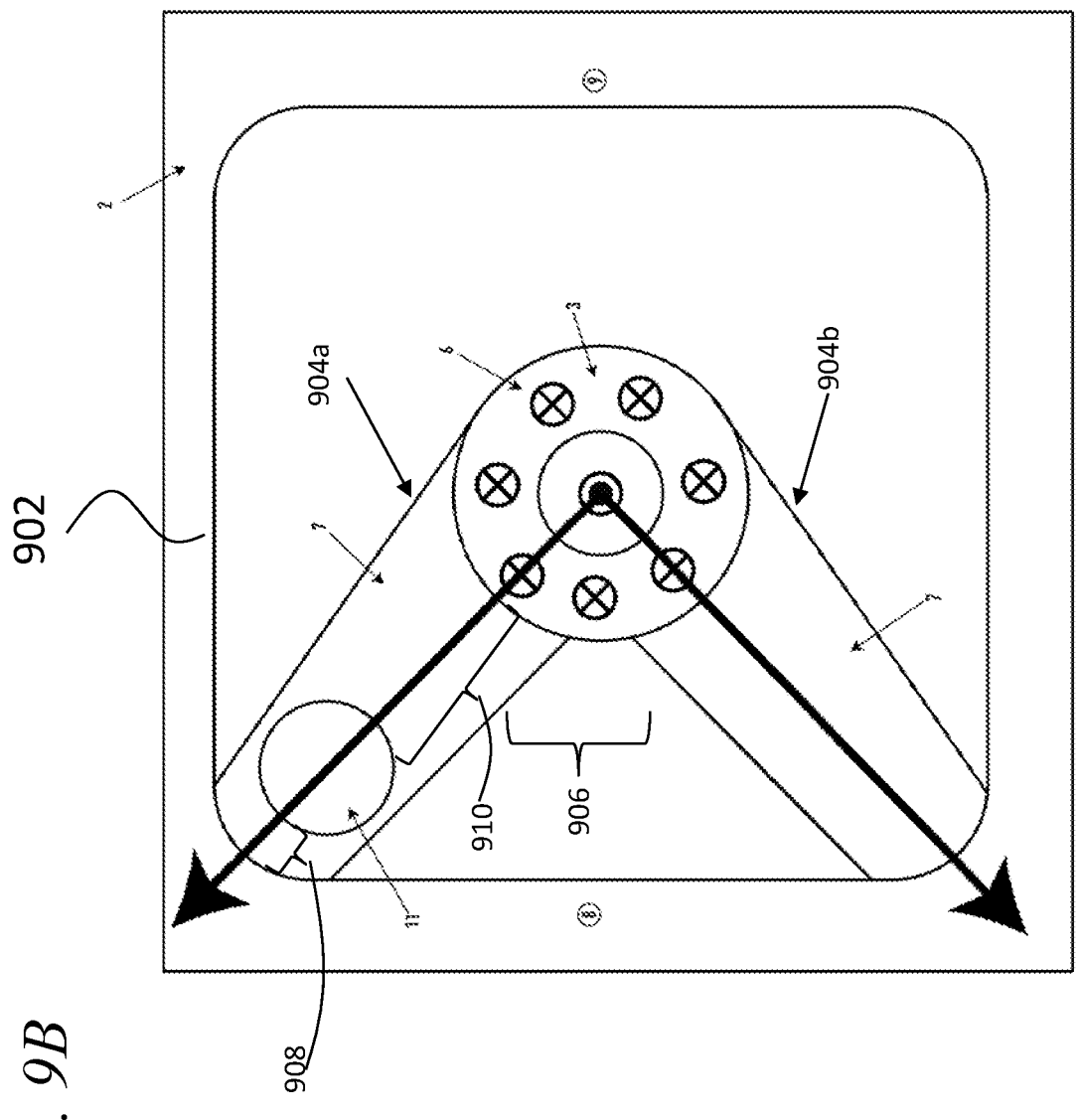

FIG. 9B illustrates an apparatus 902 for directing or extracting dust away from a rear 9 of a tool. FIG. 9B illustrates a top-down perspective view of the apparatus 902 or base plate 7 including channels 904a-b. The apparatus 902 may be similar to or include one or more component of apparatus 900. In some embodiments, the apparatus 902 includes a vacuum port 11, but is not coupled to a vacuum source (e.g., as shown in apparatus 900). While the apparatus 902 may not be coupled to a vacuum source at vacuum port 11, the apparatus 902 may still direct and extract dust via channels 804 and air flow 6 generated by a fan (e.g., fan 802).

The vacuum port 11 may be positioned anywhere along channel 904a or channel 904b. In some embodiments, the vacuum port 11 may be positioned closer to an edge or corner of the base plate 900 relative to the cavity 3. The distance 908 between the vacuum port 11 and edge of the base plate 902 may be greater than zero. The distance 910 between the vacuum port 11 and the cavity 3 may be greater than zero. The distance 910 may be different from distance 908. The distance 910 may be greater than distance 908. The distance 910 may be a multiple of the distance of 908. The distances 908 and 910 may be determined such that dust can be effectively and efficiently directed and extracted away from rear 9 of tool.

Figure 9C:
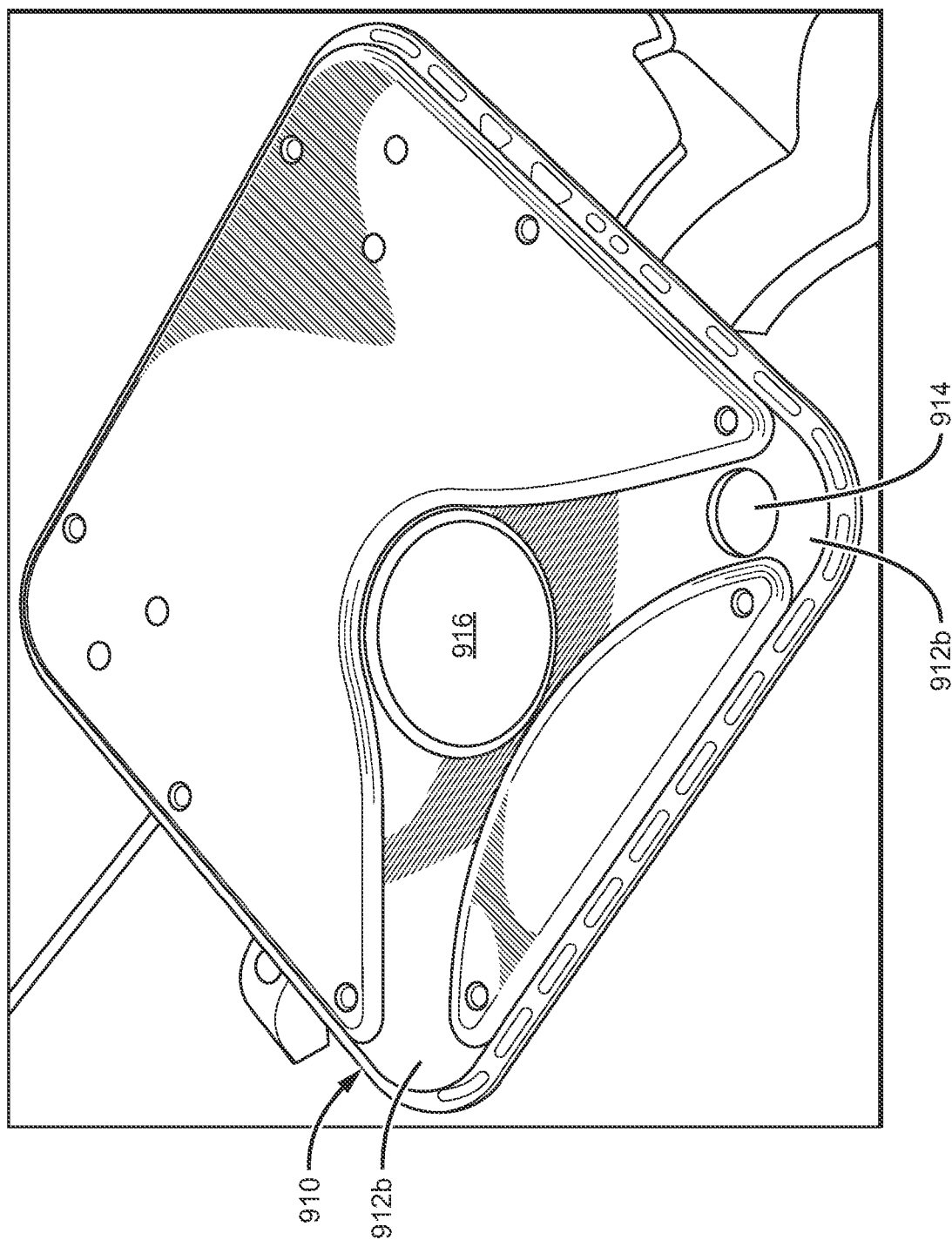
FIG. 9C is an illustrative example of a bottom perspective view of an embodiment of a base plate for directing or extracting dust particles that may be employed to implement various elements of the systems, apparatus, and the methods disclosed herein, in accordance with an embodiment.

FIG. 9C illustrates a bottom perspective view of base plate 910. Base plate 910 may correspond to base plate 7. Base plate 910 includes channels 912a-b, which may correspond to channels 904a-b. The base plate 910 includes a cavity 916 that may correspond to cavity 3. The base plate 910 includes a vacuum port 914 in channel 912, which may correspond to vacuum port 11. The vacuum port 914 may or may not be connected to a vacuum source.

The base plate 910 can be made of any material that facilitates operation of the system 680 or tool 800. The material may be metal, plastic, an alloy, or other material that provides adequate structural support for the tool 800 and friction to allow the tool to glide on the surface while providing some stability.

Figure 9D:
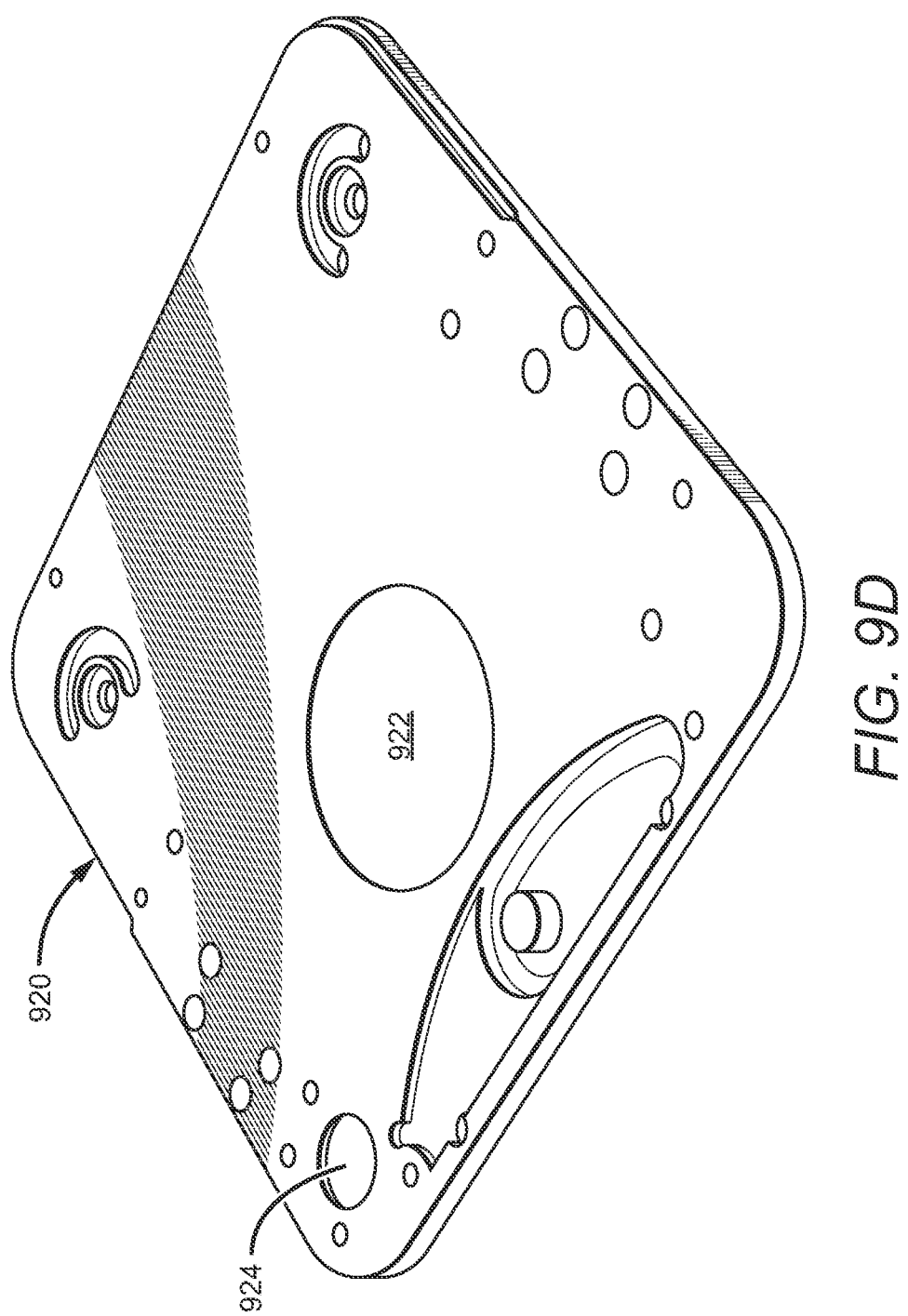
FIG. 9D is an illustrative example of a top perspective view of an embodiment of a base plate for directing or extracting dust particles that may be employed to implement various elements of the systems, apparatus, and the methods disclosed herein, in accordance with an embodiment.

FIG. 9D is a top down perspective view of base plate 920, which may correspond to an embodiment of the base plate 902 of FIB. 9B. The base plate 920 includes a cavity 922 through which the cutting member or tip of the tool may extend. The base plate 920 may include a vacuum port 924.

The base plate 920 may include channels on the bottom of the base plate 920 (e.g., the portion or side of the base plate opposite the material on which a task is to be performed). The base plate 920 may include additional openings or cavities or grooves for one or more screws, or coupling mechanisms used to couple the base plate 920 to a tool, such as tool 800.

Figure 10A:
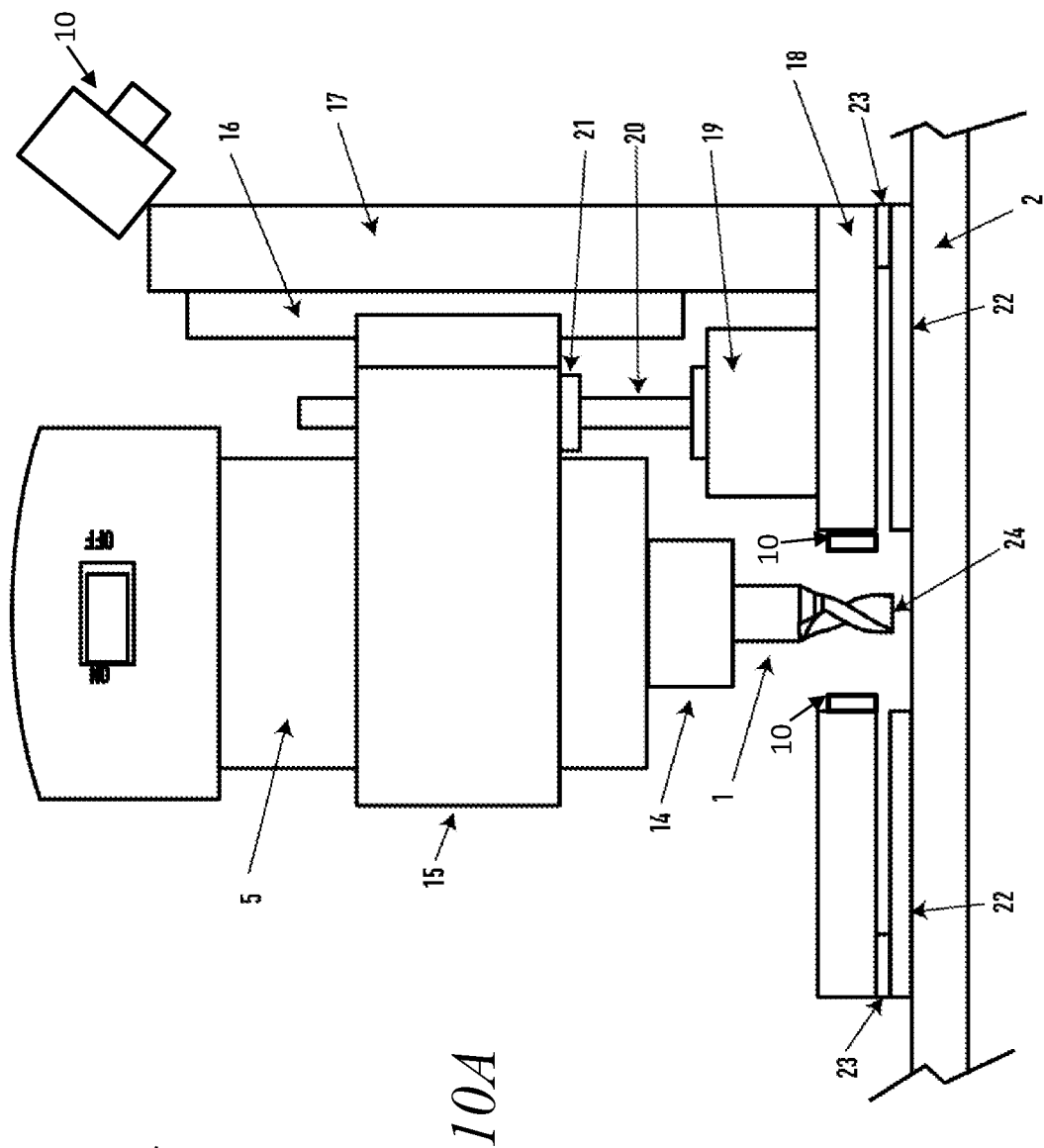
FIGS. 10A-10B are an illustrative example of an embodiment of a system for determining a location of a tool tip that may be employed to implement various elements of the systems, apparatus, and the methods disclosed herein, in accordance with an embodiment.
Figure 10B:
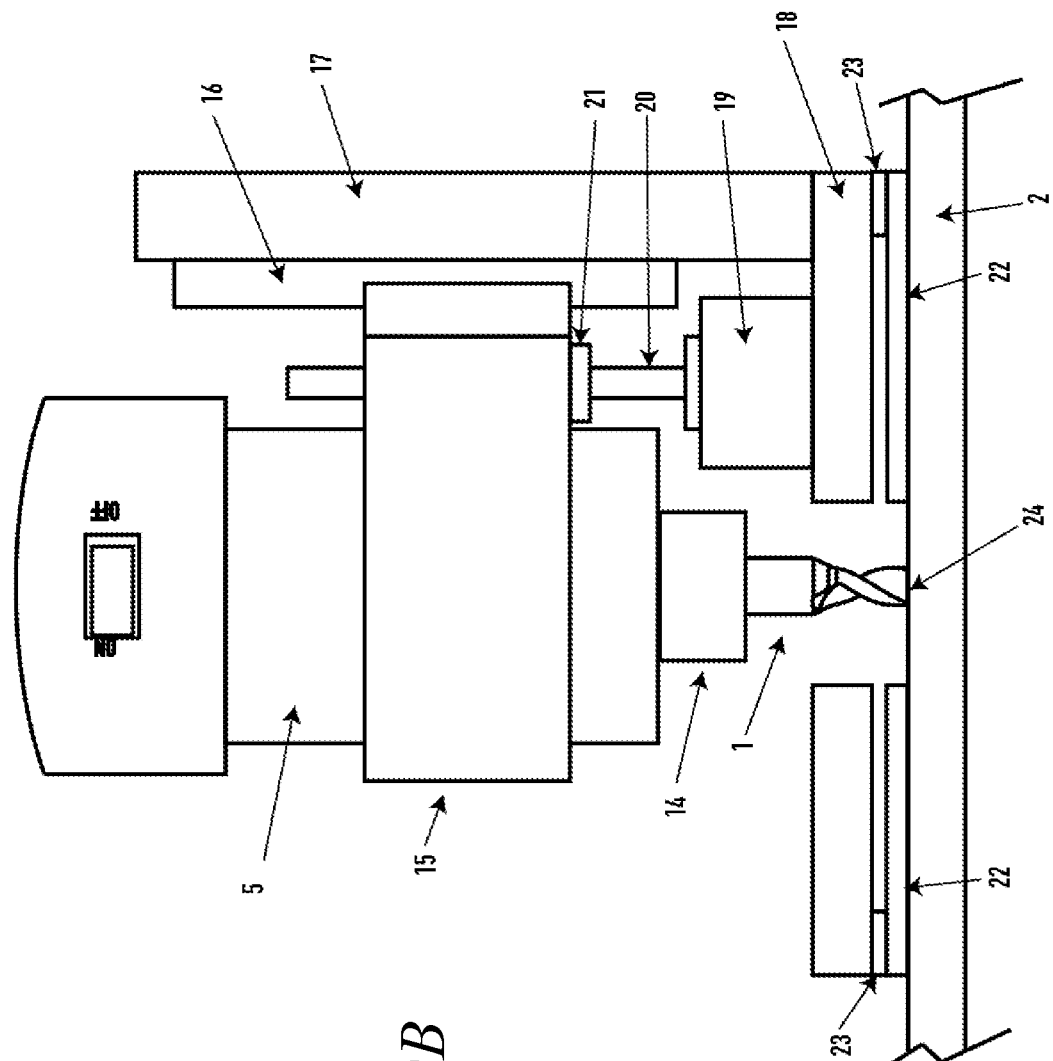

Referring to FIG. 10A, a system, method and apparatus for determining a position of a tool tip relative to a work surface or material is shown. The system, method and apparatus can calibrate position detection for the tool. In some embodiments, system 680 can be configured, designed or constructed to determine the position of the tool tip relative to the work surface. The system 1000 (or tool 1000) can move, position, or control motion of a tool tip 24 in one or more directions (e.g., FIG. 10B shows the tool tip 24 touching the surface of the material 2). The control may be manually or automatically motivated. In some embodiments, the tool 1000 may include or be configured with automatic control of the height of a rotating cutter 24 relative to the surface of a workpiece or material 2. The system 1000 can include one or more function or component of the system or apparatus of FIGS. 1-9 and 11A-11B.

The system 1000 (or tool 1000) can calibrate position detection for the tool. The system 1000 can include a base 18 coupled to the tool 1000. The base 18 can be in contact with a working surface 2. In some cases, the base 18 can include a pad 22. For example, the base 18 can include a pad 22 such that the base 18 is in contact with the working surface 2 via the pad 22. Thus, and in some embodiments, the base 18 can refer to the base 18 and the pad 22. In some embodiments, the base 18 may not be in contact with the working surface. The base 18 can be in contact with the sensors 23 that are in contact with the pad 22, and the pad 22 can be in contact with the working surface or workpiece or material 2.

The system 1000 can include one or more computing device having one or more processors. In some cases, the system 1000 can include the one or more computing devices remote from the tool. For example, the tool can include a wireless or wired communication interface that can transmit and receive data or control information from one or more computing devices that are remote from the tool.

The system 1000 can include one or more sensors 23 communicatively coupled to the computing device. The system 1000 can include a motor 19 controlled by the computing device to extend and retract the tool tip 24 towards and away from working surface 2. The motor 19 can control or include or refer to one or more components of the system 1000 configured to extend or retract the tool tip 24, including, for example, a moveable carriage 15.

The system 1000 can identify, via the one or more sensors 23, a first value of a parameter indicative of an amount of force exerted by a portion of the base on the working surface. For example, the sensor 23 can include a force sensor 23. The system 1000 can determine the first value as a first force value that indicates a default or initial force exerted by the base 23 on the material 2. This may indicate a weight of the tool. The force can be measured or determined in Newtons or pounds. The sensor 23 can repeatedly detect or measure the value of the parameter based on a time interval (e.g., every 0.1 second, 0.5 second, 1 second, 2 seconds, 3 seconds, 5 seconds, or some other time interval). The sensor 23 can compare a first value or first measurement with a second or subsequent measurement. The sensor 23 can repeatedly compare a measurement with a subsequent measurement until the sensor detects a change or difference (e.g., by 0.5%, 1%, 2%, 3%, or an absolute change such as 1 N, 0.5 N, 0.25 N, 0.1N, 0.05N, or 2N) between measurements. The difference can refer to a difference by a predetermined threshold. The threshold can be fixed or dynamic. The threshold can be based on a resolution of the sensor 23.

The system 1000 can instruct the motor 19 to instruct the motor to extend the working member or tip 24 towards the working surface 2. The system 1000 can then identify, via the sensor 23 upon the working member 24 contacting the working surface 2, a second value of the parameter. This second value can be a second force value. The second force value can be less than the first force value determined by the sensor 23 when the tool tip 24 was not in contact with the working surface. In some cases, there may be multiple sensors 23 and each sensor can determine a first force value and a second force value. In some cases, a first sensor can determine a first force value that is different from a first force value detected by a second sensor. The first values can refer to when the tool tip is not in contact with the material 2. The first and second sensors may identify different first values because due to the center of gravity of the tool not located evenly in between the first and second sensors. Thus, when the tool tip 24 contacts the material 2, a second force value detected by the first sensor may be different from a second force value detected by the second sensor. For example, when the tool tip 24 contacts the material 2, the base 18 of the tool may tilt in an angle (e.g., 1 degree, 2 degree, 5 degree, or 10 degrees). The tilting of the base 18 may cause the first sensor 22 to measure a second force value that is less than the first force value measured by the first sensor 22, while the second sensor 22 can measure a second force value that is greater than the first force value measured by the second sensor.

The system 1000 (or computing device) can identify the first value of the parameter based on a portion of the base 18 of the tool in contact with the working surface 2. The system 1000 can identify, via the sensor 23, the second value of the parameter based on the portion of the base of the tool not in contact (e.g., partially in contact or exerting less force on the surface than previously being exerted) with the working surface responsive to the motor 19 causing the working member 24 to contact the working surface 2. For example, not in contact may refer to or include less force being exerted by the portion of the base 18. In some cases, the system 1000 can instruct the motor 19 to contact the working surface 2 to tilt at least a portion the base 18. Tilting the base 18 can refer to distributing the force exerted by the base 18 such that a first portion of the base 18 exerts greater force on the material 2 than a second portion of the base 18. Tilting the base 18 can refer to changing the distribution of force exerted by the portions of the base 18. The system 1000 can determine the z-axis position of the working member 24 relative to the working surface 2 responsive to the working member 24 tilting the base 18 of the tool responsive to the working member 24 contacting the working surface 2.

The system 1000 can compare the first value of the parameter with the second value of the parameter to generate a difference between the first value and the second value. The system 1000 can determine an absolute difference (e.g., a difference of an amount of force), or simply determine that there is a difference in that the two values are not equal to each other. The system 1000 can determine that if the first and second values for a particular sensor 22 are not equal, then it is due to the tool tip 24 contacting the material 24 and offset or distributing the force exerted by the base 18 onto the material 2. The system 1000 can determine the z-axis position responsive to the first force value being greater than the second force value because less force may be exerted by the base 18 onto the material 2.

Responsive to detecting this difference, the system 1000 can determine that the tool tip 24 has contacted the material, and use this information to determine a z-axis position of the working member relative to the working surface. For example, the system 1000 can determine that this is the baseline or default position for the tool tip 24. The system 1000 can calibrate the position of the tool tip 24 such that this is a zero position. As the system 1000 retracts the tool tip 24 away from the material, the system 1000 can monitor or track the distance of the tool tip 24 from the calibrated zero position corresponding to the surface of the material 2. For example, the system 1000 can control or instruct the motor 19 to retract or move the tool tip 24 a distance (e.g., 1 millimeter, 5 millimeters, 1 centimeters, 5 centimeters, or 10 centimeters) away from the calibrated zero position which may correspond to the surface of the material. The system 1000 can, in some cases, instruct or control the motor 19 to insert the tool tip 24 a distance into the material 2. For example, the system 1000 can instruct or control the motor 19 to insert the tool tip 24 one centimeter beyond the calibrated zero position, which may insert the tool tip 24 one centimeter into the material 2. For example, the system 1000 can make a one centimeter hole in the material using the calibrated zero position.

The system 1000 can instruct the motor 19 to retract the working member 24 in contact with the working surface 2 away from the working surface 2. The system 1000 (or sensor 23 thereof) can identify when the working member 24 is not in contact with the working surface by measuring a third value of the parameter. The third value of the parameter may be greater than the second value of the parameter because the tool tip 24 is no longer offsetting the force exerted by the base 18 onto the material 2 (e.g., via sensor 23 or pad 22). The third value of the parameter may be equal to (e.g., substantially equal within 1%, 2%, 5%, or 10%) the first value of the parameter when the tool tip 24 was also not in contact with the material 2. The system 1000 can determine a second z-axis position of the working member relative to the working surface responsive to a second difference between the first value and the third value less than a threshold (e.g., the difference is less than a percentage of the first value or the third value such as 1%, 2%, 3%, 5%, or 10%; or a force value such as 1 Newton, 0.5 Newtons, 0.01 Newtons, 2 Newtons, 5 Newtons, or 10 Newtons).

Thus, to facilitate controlling the height of the rotating cutter 24, the tool may determine a reference or "zero" point so that the tool 1000 (e.g., via cutting member 24) can be positioned to remove an amount of material 2. For example, the tool 1000 may plunge a rotating cutter 24 a specified depth into a workpiece 2 before being moved laterally to create a groove. The tool may use a method to precisely determine the position of the tool tip relative to the work surface. In some embodiments, the tool 1000 uses low cost sensors 23, such as force sensors, that detect a delta or change in the force exerted by a portion of the tool 1000 on the material 2. In some cases, the sensors 23 can include capacitive sensors, photoelectric sensors, electromagnetic sensors, load sensors, strain gauge load cells, piezoelectric crystals, hydraulic load cells, or pneumatic load cells.

As the tip 24 moves towards the material 2 and touches the material 2, the force exerted by the base 18 may be reduced because the force is being offloaded to the tip of the tool 24. Detecting this change in force may indicate that the tip of the tool is touching the surface of material 2 and allow the tool to configure or set or initialize this position as a zero position. This may be useful for handheld power tools including automatically guided tools, and may also be applied to fully automatic machine tools.

In some embodiments, the tool 1000 includes a router bit 1 mounted in the spindle 14 of a router 5 (e.g., woodworking trim router). The router 5 may be secured in a movable carriage 15 that slides on a guide rail 16. The guide rail 16 may be mounted to a structural column 17. The structural column 17 may be fixed to a base 18 of the tool 1000. A motor 19 may be fixed to the base 18 of the tool 1000 to rotate a leadscrew 20. The leadscrew 20 may pass through a nut 21 on the movable carriage 15. The leadscrew 20 may include square threads, acme threads, or buttress threads. When the motor 19 rotates, the movable carriage 15 translates in proportion to the pitch of the leadscrew 20.

In some embodiments, the movable carriage 15 may be mounted to a moving stage which is constrained in the Z direction by the frame. In some embodiments, the Z column or guide rail 16 may be mounted to a moving XY stage which is constrained in the Z direction by a frame of the device 1000. For example, the tool or device 1000 can include a rig or frame with a stage that may be positioned on the surface of a piece of material such as wood. The tool can be electrically or mechanically coupled to the frame, and the frame together with the tool can be passed over the material. The tool can move (or provide instructions for a user to move) the frame, stage, or tool to a desired XY or Z coordinate on the material. For example, the tool may include one or more components (e.g., rig, tool, stage, etc.) of the system described in U.S. Patent Application Publication No. 2015/0094836. The U.S. Patent Application Publication No. 2015/0094836 is hereby incorporated by reference herein in its entirety.

In some embodiments, the tool 1000 may use one or more other configurations or techniques to move the tip 24 of a tool 1000 relative to the work surface. Other configurations may include a power screw, translation screw, ball screws, roller screws, fluid power, tear trains, worm drives, rack-and-pinion drives, electromagnetic actuation, piezoelectric actuation, hydraulic lifts, electrical lifts, rotary lift, pneumatic lift, mechanic lifts, levers, gears, etc.

The base 18 of the tool (or device) 1000 may be separated from the work surface 2 by a pad 22 on which the device 1000 rests. In some embodiments, one or more force sensors 23 may be positioned between the pad 22 and the base 18 of the device 1000. The gravitational force generated by the weight of the device 1000 partially or fully passes through the one or more force sensors 23 when the device 1000 is resting on the work surface 2.

To locate the tip 24 of the cutting tool 1000, the system or device 1000 may move the carriage 15 closer to the work surface 2, which moves the tip 24 towards the work surface. As this motion is performed, the force passing through the force sensors 23 may be measured (e.g., measured responsive to a motion, measured periodically, measured based on a time interval such as every millisecond, 10 milliseconds, 1 second, etc.). Once the tip 24 of the cutting tool makes contact with the work surface 2, additional motion results in a fraction of the weight of the device 1000 to be transferred to the work surface 2 through the tool tip 24, and the force passing through the sensors 23 is correspondingly reduced. The system detects the change in force on the one or more sensors 23 and the motion of the carriage may be stopped. The position of the carriage 15 is recorded and may correspond to the point at which the tool tip is positioned at the surface of the work. Because the tool tip and the work surface may be stiff, a detectable transfer of weight occurs over very small distances and the error of this method may correspond to less than 0.0005" using a ¼" carbide router bit on a birch plywood surface.

The system 1000 can repeatedly extend and retract the tool tip 24 towards and aware from the material 2 or a surface (e.g., desk, bench, floor, or other support structure) supporting the material 2. The system 1000 can repeatedly extend and retract the tool tip 24 to generate or create a 3-dimensional map of the material 2.

In some cases, the system 1000 can extend the tool tip 24 adjacent to an edge of the material 2. The system 1000 can extend the tool tip 24 adjacent to the edge of the material 2 until the tool tip 24 contacts a surface supporting the material 2. The system 1000 can determine a thickness of the material by determining the distance beyond the surface of material 2 the tool tip 24 extends in order to contact the surface supporting the material 2. The system can determine these positions using the force sensors 23 to detect when the tool tip 24 contacts the material 2 or the surface supporting the material. For example, the system 1000 (or motor 19) can extend the working member 24 towards a surface supporting the working surface. A part of the base 18 of the tool can be in contact with the working surface 2, while a part of the base 18 of the tool may be off the material 2. Or, in some cases, the base 18 may be in contact with the material 2, and the material can be shaped or configured such that the tool tip 24 when extended may contact the surface supporting the material 2 as opposed to the surface; or the tool tip 24 may extend through a hole in the material 2 to contact the surface supporting the material 2. The system 1000 (e.g., via sensor 23) can detect the working member 24 contacting the surface supporting the working surface. For example, the system 1000 can detect a third value of the parameter (e.g., force), and determine a thickness of the working surface 2 responsive to a second difference between the first value and the third value greater than a threshold (e.g., the difference can be greater than 1%, 2%, 5%, 10%, of one of the first value or third value; or the difference can be greater than a force value such as 1 Newton, 0.5 Newtons, 0.01 Newtons, 2 Newtons, 5 Newtons, or 10 Newtons).

In some embodiments, the sensors to detect material thickness may be included in an SPS (e.g., robot arm, see below) connected to an AGS (e.g., rig, see below) mounted on or connected to the SPS. For example, one or more portions of the SPS may have an adjustable height relative to the base of the SPS system (e.g., a table top) on which the material may be placed. In this exemplary embodiment, the height that the SPS system component has to move up in order to fit the material under the SPS (e.g., out of plane motion of the vertical arm in FIG. 30G) may be used to determine the thickness of the material. In some embodiments, the movement of the SPS component to accommodate the material may be measured by encoders on a linkage to detect how high the linkage is above the base of the SPS system (e.g., table top).

In some embodiments, one or more components of the SPS may have markers which are detected by the AGS to determine at least one or more of: SPS mechanical geometry, SPS motion range, and topographic information of one or more SPS components relative to the working surface. In some embodiments, the type of markers on the SPS may be the same as the type of markers used on the working surface. In some embodiments, the type of markers used on the SPS may be different from the type of markers used on the working surface. In some embodiments, the AGS may detect one or more markers on the SPS to determine a position of a sensor on the AGS (e.g., a camera detecting the one or more markers on the SPS), the working member in the AGS, or a component of the AGS frame relative to the SPS. In some embodiments, an AGS may use sensors (e.g., on the SPS, on the working surface, on the surface (e.g., table) on which the workpiece is fixed) to determine a range of motion for the SPS (e.g., to avoid falling off the end of the workpiece). In some embodiments, the AGS may use markers on the working surface to determine the allowable workspace which, in turn, may determine a range of motion for the SPS (e.g., only moving the SPS to locations which a region defined by the presence of markers on the working surface).

The system 1000 can determine multiple location points based on the working member 24 of the tool contacting the working surface. For example, the system 1000 can repeatedly extend and retract the working member of the 24 to contact the material 2 and move the working member 24 away from the surface. The system 1000 can record information each time the tool tip 24 contacts the material 2 (or does not contact the material 2). For example, the system 1000 can record or identify location points. Each location point can have an x-axis coordinate, a y-axis coordinate, and a z-axis coordinate. The x-y coordinates can be determined using markers on the surface of the material and may be relative to a surface of the material or position on the surface of the material. The x-y coordinates can be determined using fiducial markers on the surface of the material, imaging techniques, or visual techniques. For example, a second sensor of the tool (e.g., a visual sensor or camera) can determine the x-axis coordinate and the y-axis coordinate of each of the location points using a fiducial marker placed on the working surface. The system can determine the z-coordinate (or depth) by extending the tool tip 24 until the tip 24 contacts the surface, and measuring the depth relative to a calibrated zero position. The calibrated zero position can be a position on the surface of the material. The system 1000 can generate a three dimensional map of the working surface 2 using the location points.

The system 1000 can measure the geometry of the work surface 2 by correlating the tool tip 24 position with device (e.g., tool 1000) position on the plane of the work surface 2. To do so, the tool tip 24 (e.g., a cylindrical tool with a conical or spherical tip) can first be related to the reference frame of the tool 100 by detecting the position of the tool tip 24. Once the position of the tool tip 24 is known relative to the tool's reference frame, the tool can be positioned laterally over a surface of interest (e.g., working surface 2) to determine the vertical position of the working surface. The vertical position of the working surface can refer to a surface of the material of the working surface. In some cases, the vertical position can indicate a recess, cavity, indent, or concave portion in a piece of wood whose depth is of interest. In some cases, the vertical position can indicate a raised portion, bump, protrusion, or convex portion in a piece of wood whose depth is of interest. The tool tip can then be inserted, extended, lowered, plunged otherwise moved until the tool tip contacts the surface of the portion of the material (e.g., recess or protrusion). The additional displacement of the tool tip beyond the top portion of the surface where the tool tip first contacted the work surface can indicate the depth of the recess. Similarly, the reduction in displacement of the tool tip above the portion of the surface where the tool tip first contacted the work surface can indicate a height of the protrusion. If the surface profile of the recess was of interest, the tool might be moved around the recess to multiple points. The tool can determine, at each of the multiple points, the depth. The tool can record both the depth and lateral position of the tool (e.g., x, y, and z coordinates, where x and y coordinates can refer to the lateral position and the z coordinate can refer to the depth). The lateral motion could be accomplished automatically using a built-in positioning stage, or performed manually by the user, or a combination of both.

The system 1000 can identify or determine a center position of a hole on a work surface 2. For example, a tool 1 with a conical tip 24 can be fitted into the system. The tool 1 can then be positioned approximately (e.g., within 5%, 10%, 15%, 20%, 25%, 30%, 50%, 75%, or 90% of the diameter of the hole) over the center of the hole, and plunged until the tip 24 contacts the circle of the hole. Because the tool tip 24 can be conical, the tool tip 24 can cause the tool to center over the hole. The tool can then determine the lateral position (e.g., x and y coordinates) using, for example, a vision system with a camera 10 to ascertain the position of the hole.

The system 1000 can include or communicate with a computing device, processor or microprocessor (such as a processor of system 680). The computing device can include the one or more process of system 680. The system 1000 can use the computing device to control the motion of the positioning motor and also to measure the force passing through the one or more force sensors 23. Sensors 23 may include, e.g., force-sensitive resistors, piezoelectric sensors, strain gages, load pins, shear beams, tension links, magnetic level gauge, torque sensor, load cells, hydraulic load cells, pneumatic load cells, elastic devices, magneto-elastic devices, plastic deformation, foil strain gauges, etc.

In some embodiments, the tool can detect the tilt using a camera, visual information, gyroscope, or 3-axis accelerometer. The tool can include a camera 10 (also illustrated in FIG. 8A), or other sensor. Camera 10 can include one or more component or functionality of camera 682. The camera 10 can determine a shift in a captured image corresponding to a tilt resulting from the base lifting. The camera 10 can take a first picture or image before the tool brings the tool tip 24 into contact with the working surface 2, and then take a second image when the tool tip contacts the working surface. The camera 10 can repeatedly take images based on a time interval (e.g., every 1 second, 2 seconds, 3 seconds, 0.5 seconds, or 5 seconds) and compare a first image with a subsequent image to identify a tilt. The camera 10 can take a burst of images and then compare the images with one another to detect when the tool tip contacted the surface to cause the tilt. In some cases, each image in the burst of images can be associated with a time stamp. Each of the images can further be associated with, tagged with, or otherwise correspond to a position of the tool tip. The system can determine which image of the burst of images first indicates a tilt (e.g., an object in the image taken by camera 10 may appear closer when the tool 1000 is tilted towards the rear of the tool when the tool tip comes into contact with the material 2). In some cases, the system 1000 can determine a difference or misalignment in pixels between a first image and a subsequent image. Responsive to detecting the misalignment in the pixels, the system 1000 can determine that the tool tip contacted the material 2 at the timestamp corresponding to the subsequent or second image having the misaligned pixels relative to a first image or previous image. The camera can compare the first image with the second image to identify a tilt or variation between the two images.

The sensor 10 can include an image sensor or camera. The parameter can include a pixel. The pixel can have a location in the image. The system 1000 can capture (e.g., via the image sensor) a first image comprising a pixel with a first value (e.g., binary value, 256-bit value, red, green blue value, grayscale value, brightness value, or numerical value). The system 1000 can capture a second image comprising a second value of the pixel. The second value can be for the same pixel as the first value. The pixel can be a location in the image. The system 1000 can comparing the first image comprising the first value with the second image comprising the second value to identify the difference between the first value and the second value. The system can compare one or more pixels in the first image with one or more pixels in the second image to detect a difference. The system can compare the two captured images to determine that they are misaligned. The images may be misaligned due to the base being tilted in an angle, which may cause the camera to capture the second image at a different angle or from a different perspective as compared to the first image. Thus, the system can attribute the misalignment to the tool tip 24 contacting the surface of the working material and tilting the base.

The tool can determine the proximity of the tool tip 24 to the working surface 2 using a capacitive sensor 10 or an electromagnetic sensor 10. For example, the electromagnetic sensor 10 can sense or detect a change in inductance of a sensing coil in proximity to the tool tip 24 or working member 24 that includes metal by sensing eddy currents induced in the metal.

In some cases, the tool 1000 can include an accelerometer. For example, sensor 23 or sensor 10 can include an accelerometer, such as a 3-axis accelerometer or gyroscope. The accelerometer can indicate the tilt responsive to a motion or sudden motion caused by the base lifting. For example, the accelerometer can determine a first value indicating the acceleration of the base of the tool when the tool tip is not in contact with the surface. The first value can be zero, for example, because the base may be resting on the working surface. The accelerometer can determine the second value when the tool tip touches or contacts the surface. The second value or second acceleration value can indicate an acceleration of the base, an impact, a movement, a force or other displacement of the base caused by the tool tip contacting the working surface and moving the base that is mechanically connected to the tool tip. The computing device can compare the first value with the second value to identify the acceleration of the base of the tool based on the working member contacting the working surface. In some cases, the computing device can determine that the first value and the second value are not equal or substantially equal (e.g., within 1%, 2%, or 5%), and determine the tool tip contacted the working surface based on there being a difference in acceleration.

In some embodiments, the sensors to detect working member proximity to the working surface (e.g., force sensor, optical sensor, camera, accelerometer, etc.) may be included in an SPS (e.g., robot arm, see below) connected to an AGS (e.g., rig, see below) mounted on or connected to the SPS.

The tool can determine or detect additional information about the tool including tip or working member position, diameter, or tool geometry. Determining the geometry of the tool can include or refer to determining the diameter of the cutting tool. The tool geometry information can be used to automatically determine a length of a cutting flute of the working member and an angle of the cutter (e.g. a V carving bit or helix angle). For example, the tool can include cameras 10 or a break-beam sensor 10 (e.g. laser break beam sensor, infrared break beam sensor, photoelectric sensor, or optical sensor) proximate to the tool tip 24. The working member 24 can be dropped into the line of action of the sensors 10 and the tool can detect the position of the working member 24 when the working member 24 breaks the beam formed by sensors 10. In some cases, the axis of the beam can be pre-calibrated relative to the coordinate frame of the tool.

In some cases, the system can include one or more vision cameras 10 aimed at the tool tip 24 or tool member 1 to determine the position of the working member 1 or tool tip 24. The vision camera 10 can be pre-calibrated to the tool coordinate frame to detect the tool tip 24. In some cases, the vision camera can include a linear charge coupled device (CCD) sensor or other image sensor. A linear CCD sensor may use less processing than a vision camera to detect the tool tip.

The system 1000 can measure the diameter of the working member 1 or tool tip 24. The tool can shift the tool tip 24 around while measuring or determining the position of the tool tip. By shifting the tool tip, the tool can use a single break-beam sensor 10 to detect tool diameter by passing the tool left-to-right through the sensor 10. The lateral motion of the tool can cause a first break and then un-obstruct the beam to provide a measure of the tool diameter. Since router bits can have helical flutes, the tool can perform multiple measurements along the length of the tool to determine the diameter. The tool can determine the diameter using eddy currents or capacitive sensing with a one-dimensional sensor to gather multi-dimensional information about the tool geometry by correlating the sensor data to the tool position. The tool can determine additional information about the tool tip 24 such as tip angle in the case of a v-cutting bit. Furthermore, the tool can include a vision camera 10 to detect geometric properties of the tool.

In some embodiments, the sensors to detect tool or working member geometry (e.g., break beam sensor, optical sensor, camera, etc.) may be included in an SPS (e.g., robot arm, see below) connected to an AGS (e.g., rig, see below) mounted on or connected to the SPS.

The system 1000 can include or be configured with a hybrid positioning system to position the working member of the tool. For example, the system can include a stage. The system can include a skid pad proximate to the stage to facilitate moving the stage. The system can include at least one motor adapted to move the stage. The system can include at least one motor controller that controls the at least one motor. The system can include a computing device or a processor in combination with one or more software applications for processing data and providing information to the at least one motor controller. The system can include a first sensor configured to capture first information of a surface of a material to build a map of the surface. The first information can include an image of the surface. The system can include a second sensor communicatively coupled with the processor. The second sensor can capture second information of the surface used to determine at least one of a location of the working member and an orientation of the working member relative to the surface. The computing device or processor can build the map of the surface using the first information captured by the first sensor. The computing device or processor can receive a design corresponding to the map of the surface built using the first information. The processor can display the design overlaid on the map via a display screen. The system can receive, via the second sensor, the second information of the surface. The system can determine, based on the second information of the surface and based on the map, at least one of the location of the working member and the orientation of the working member relative to the surface. The system can display the location of the working member overlaid on the map via the display screen. The system can determine, based on the design registered on the map and at least one of the location and the orientation, a desired location for the working member. The system can provide motor control information to control the at least one motor to move the stage and the working member to the desired location while the tool is advanced in a first direction that is within a selected range substantially adjacent to an outline of the design. The system can automatically realign the tool to a boundary edge of the design in a second direction as the tool is advanced in the first direction.

For example, the system 1000 can use the determined z-axis position of the working member to provide, based at least in part on the z-axis position of the working member, motor control information to control the one or more motors to move the working member from a first location to a second location. The motor control information can include one or more of x-axis information, y-axis information, or z-axis information. The tool can be advanced in a direction that is within a range adjacent to a predetermined path for the working member of the tool.

In some cases, the system 1000 can receive first information from the first sensor and determine, based on first information of the surface of the material, at least one of a first location (e.g., x-y coordinates, or x-y-z coordinates) of the working member of the tool and an orientation of the working member relative to the surface using a map of the surface. The system can indicate, via a display screen of the tool, the first location of the working member of the tool relative to the map of the surface. The system can retrieve a design corresponding to the map of the surface to identify a path for the working member of the tool. The system can compare the first location of the working member of the tool with the design to determine a second location for the working member of the tool corresponding to the path for the working member of the tool. The system can provide, based on at least one of the second location and the orientation, motor control information to control the at least one motor to move the stage and the working member to the second location. The tool can be advanced in a direction that is within a range adjacent to the path for the working member of the tool.

The system can perform a constant speed technique to provide the motor control information to control the at least one motor to move the stage and the working member to a plurality of subsequent locations while the tool is advanced in a corresponding plurality of subsequent directions. The system can automatically realign the tool to a boundary edge of the design in a third direction as the tool is advanced in a fourth direction. The system can display an adjustment region window rendering an illustration of a point of reference of the tool, an intended cut path, and a desired tool movement path. The intended cut path can indicate a position in an x-y coordinates frame as well as z-axis depth.

The sensor can receive or capture a live feed of image data. The system can receive the live feed of image data captured by the sensor, and use the live feed image data to compare a previous position (e.g., x-y coordinates, or x-y-z coordinates) on the design and a preferred next position (e.g., x-y coordinates, or x-y-z coordinates) on the design to automatically realign a position of the tool.

While FIGS. 10A-10B illustrate determining the position of a rotating cutting tool 24 relative to the work surface 2, the method can apply to plotting pens, vinyl cutting knives, pipette tips, vacuum nozzles for pick and place machines, or any other system to determine a zero position of a working member 24 relative to a working material 2.

Figure 10C:
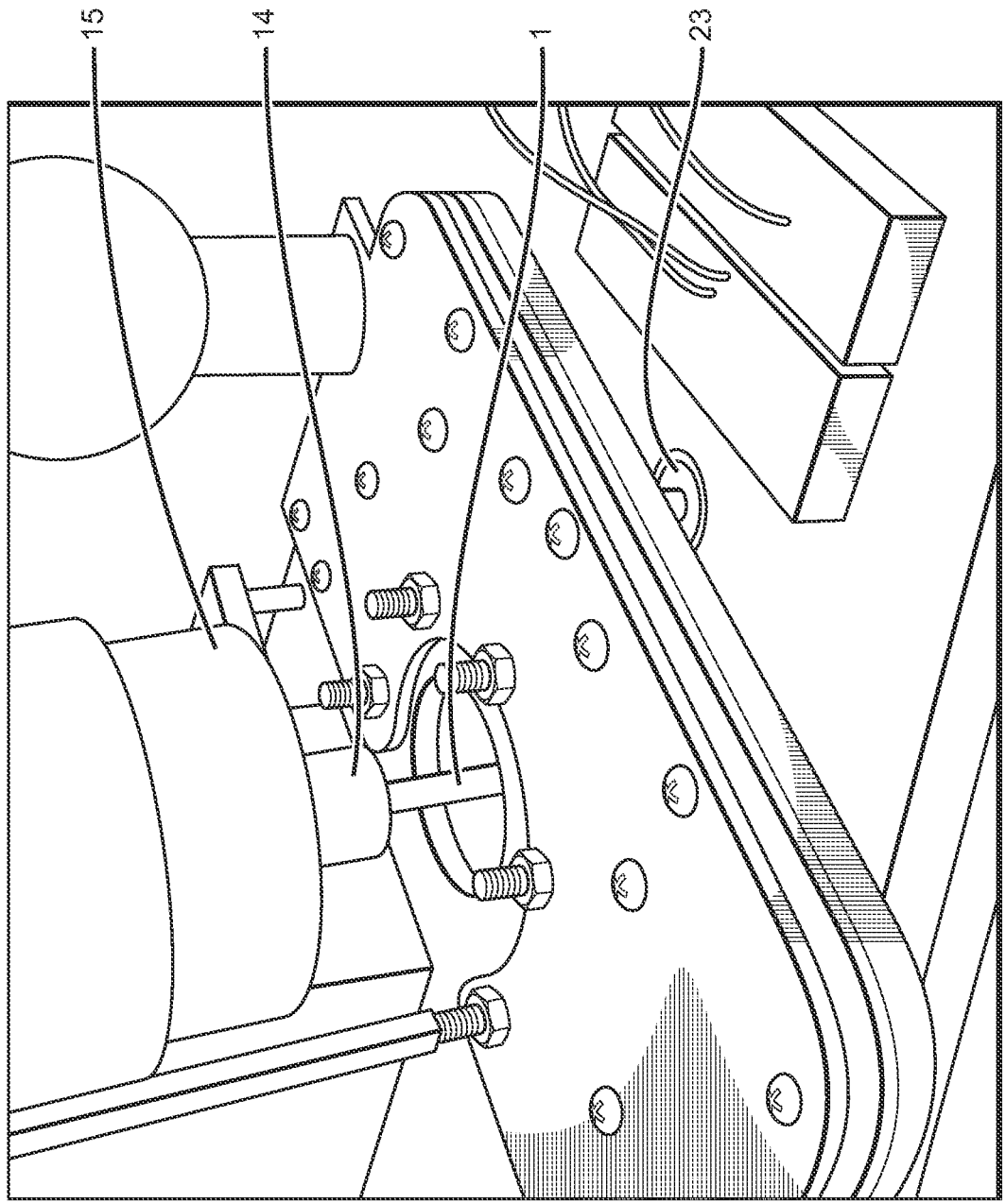
FIGS. 10C-10D are an illustrative example of an embodiment of a force sensor positioned on an apparatus for determining a location of a tool tip that may be employed to implement various elements of the systems, apparatus, and the methods disclosed herein, in accordance with an embodiment.

FIG. 10C illustrates a force sensor 23 adjacent to a pad in accordance with an embodiment. The force sensor 23 may be temporarily placed there to perform a calibration procedure to determine the zero position. The force sensor 23 may be removed after completion of the calibration procedure.

Figure 10D:
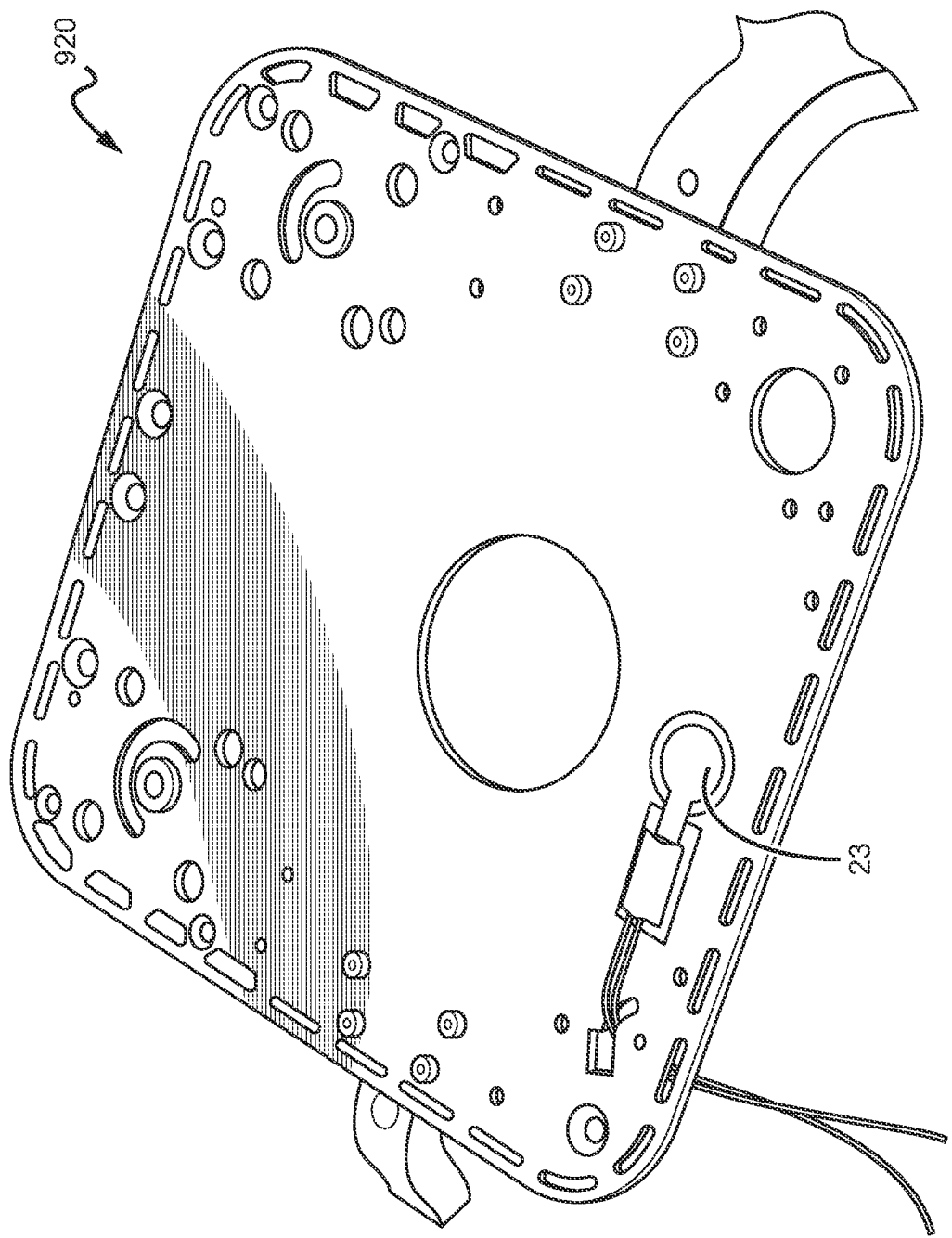

FIG. 10D illustrates a force sensor 23 positioned or placed on the top of the base plate 920. The one or more force sensors 23 can be positioned anywhere on the tool 1000 such that the force sensor 23 can detect a change in force corresponding to the tool tip 24 touching the surface of the material 2. The change in force may be a reduction in detected force because some of the force is being transferred via the tool tip 24 to the material rather than through the force sensor 23 onto the material.

Figure 11A:
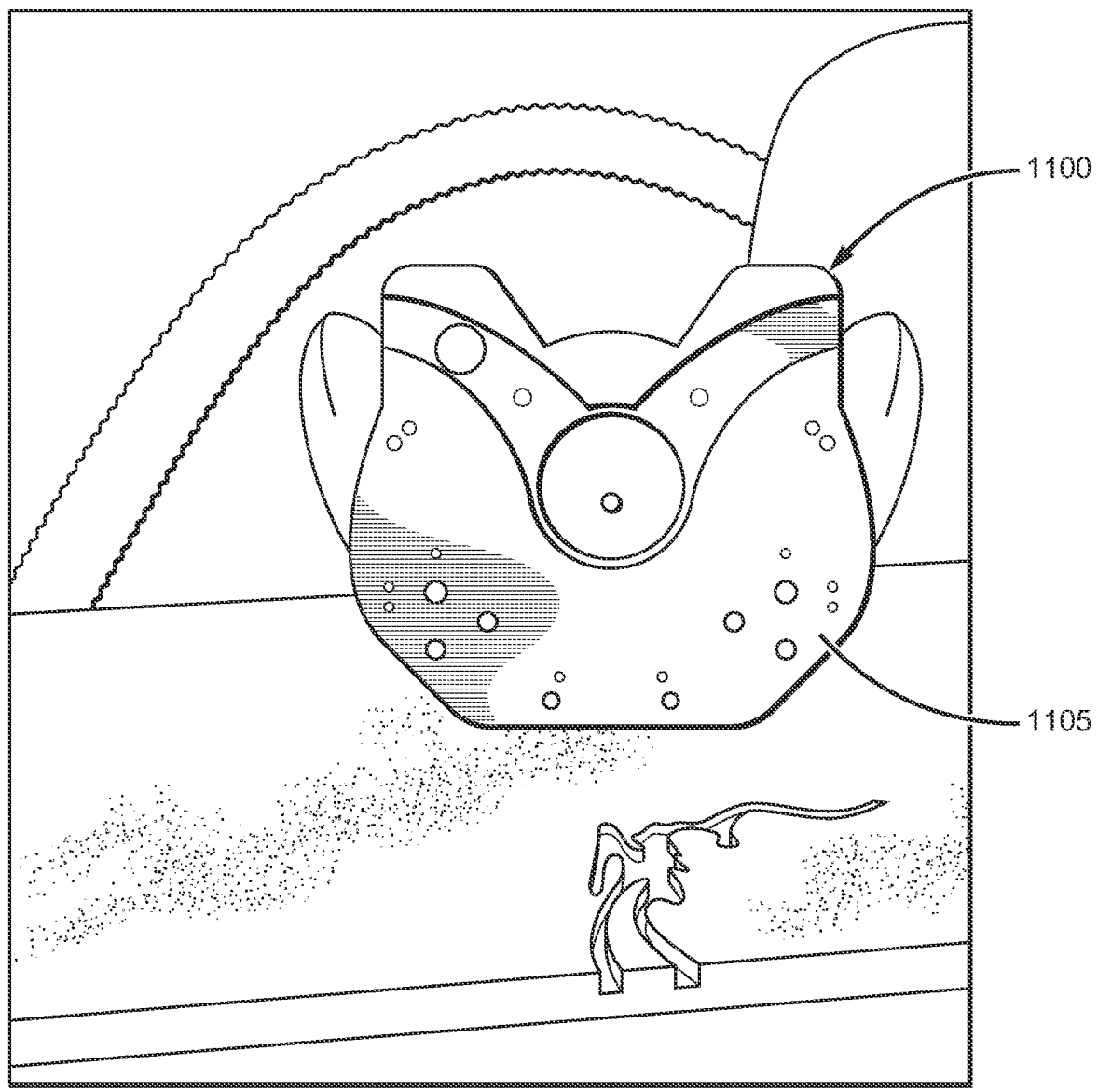
FIGS. 11A-11B are an illustrative example of directing or extracting dust particles using various elements of the systems, apparatus, and the methods disclosed herein, in accordance with an embodiment.
Figure 11B:
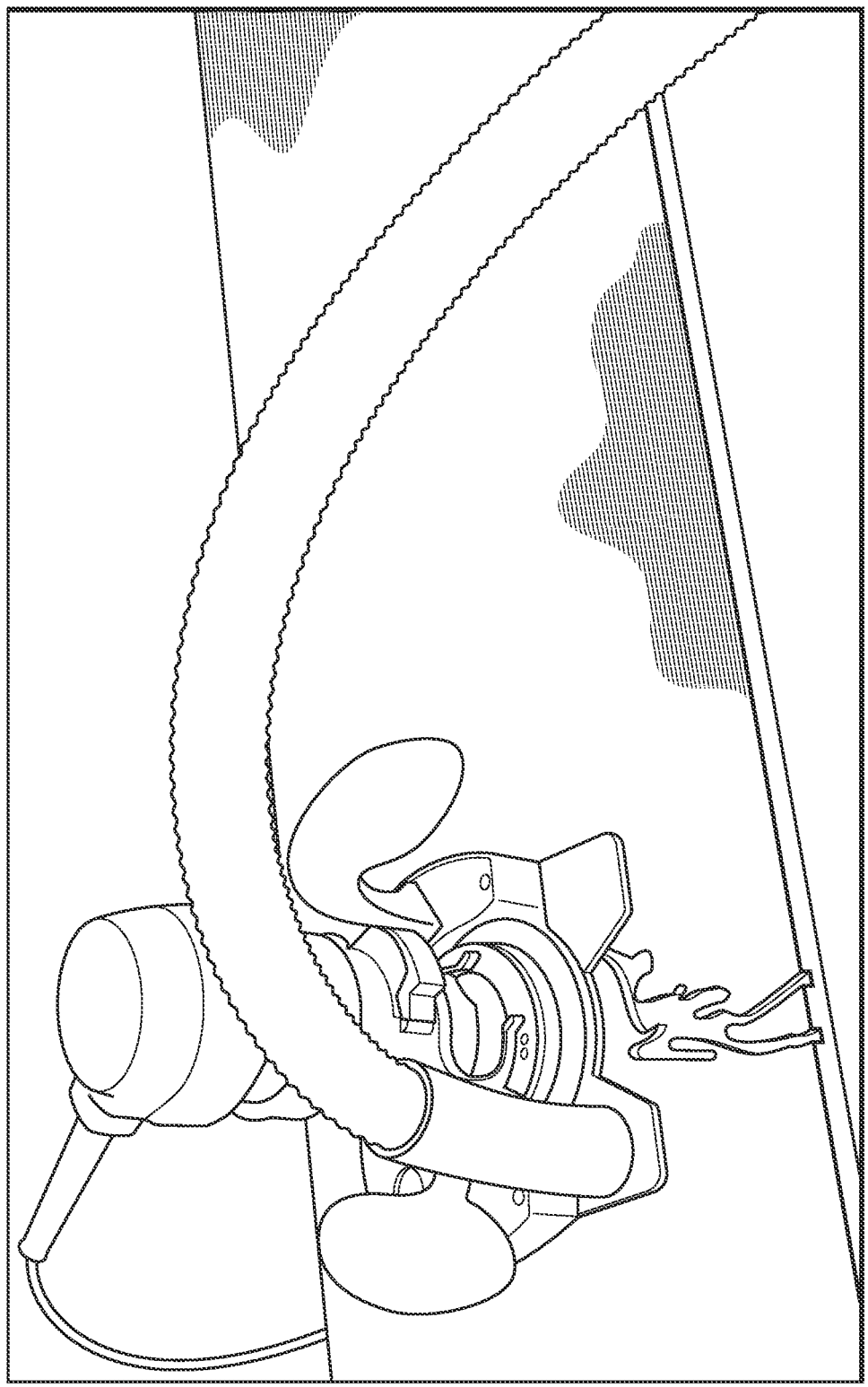

FIGS. 11A and 11B illustrate a tool 1100 with a base plate 1105. The tool 1100 may include one or more component of the tool 1000, and base plate 1105 may correspond to base plate 910. FIG. 11A illustrates the dust or particles that stay on the material when the dust extraction and direction techniques are not being used, while FIG. 11B illustrates how the dust direction and extraction techniques described herein can remove the dust from the material (e.g., via airflow generated by a fan and/or vacuum source traveling through a channel away from the rear of the tool or extracted via a vacuum port). The tool 1100 can moving, via a cavity or channel of a base plate of the tool, particles of material removed from the working surface by the working member. The tool 1100 can evacuate, by a vacuum, the particles via the cavity away from the working member.

Figure 12:
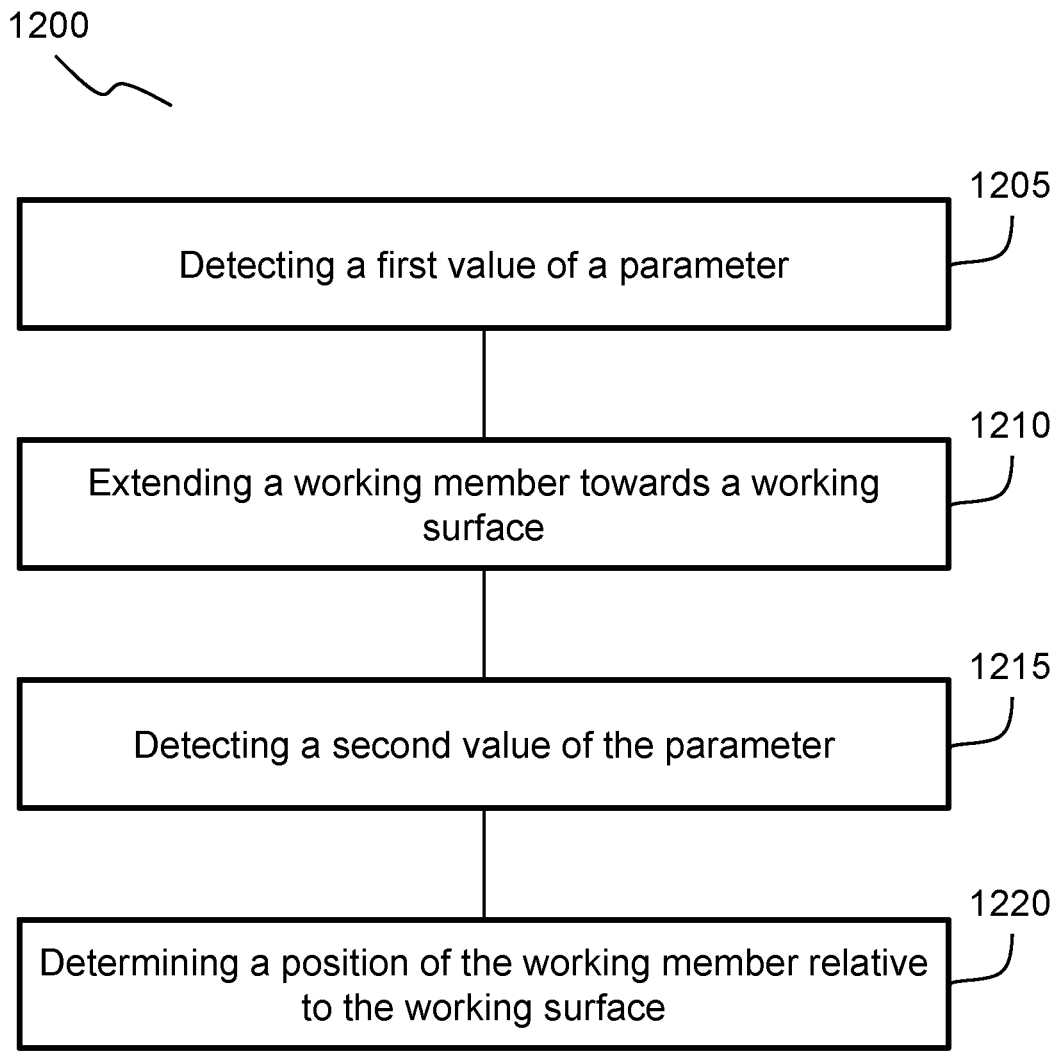
FIG. 12 is an illustrative example of a block diagram depicting a method of positioning a working member of a tool, in accordance with an embodiment.
Figure 13:
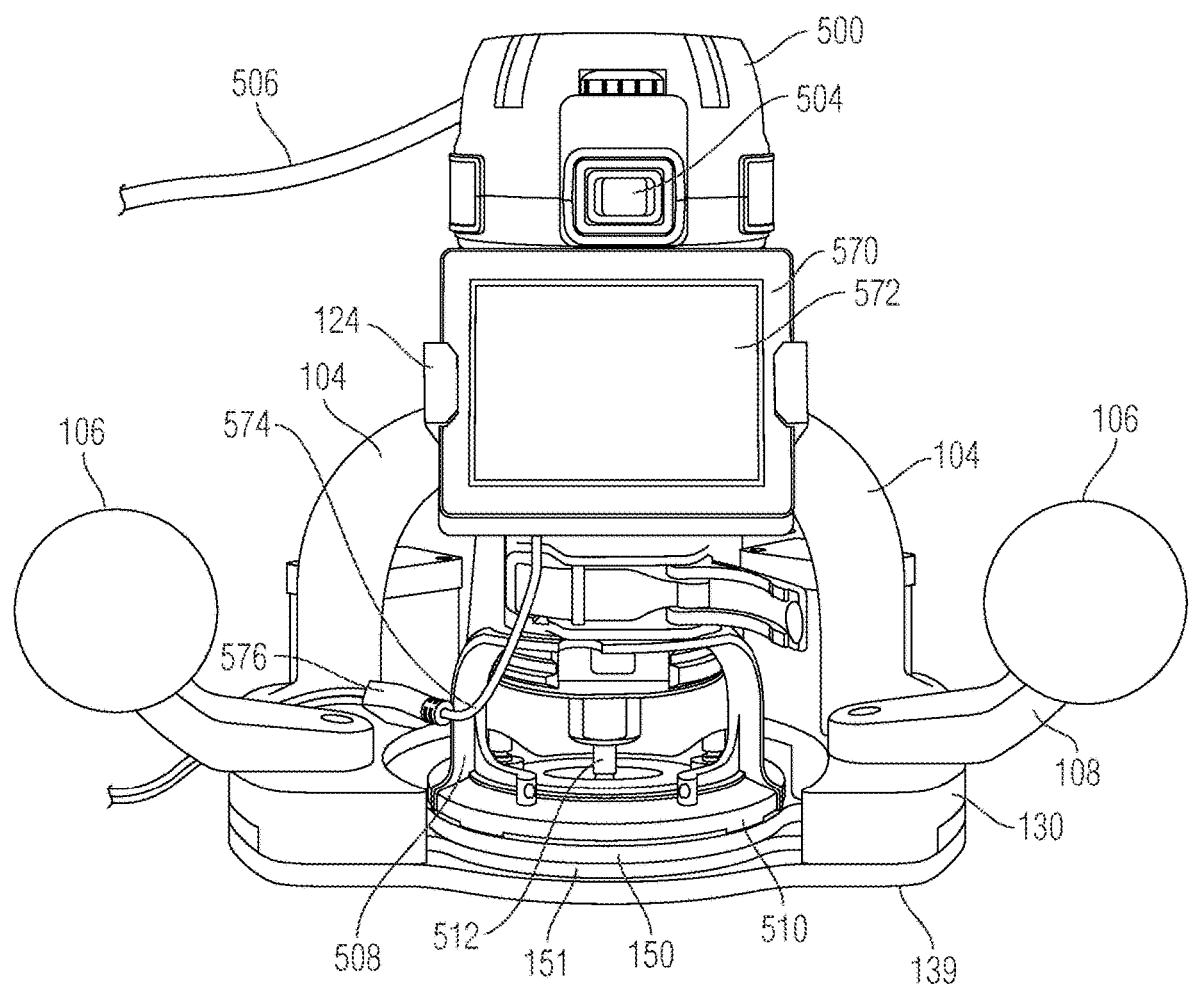
FIG. 13 depicts a front view of a tool in accordance with an embodiment.
Figure 14:
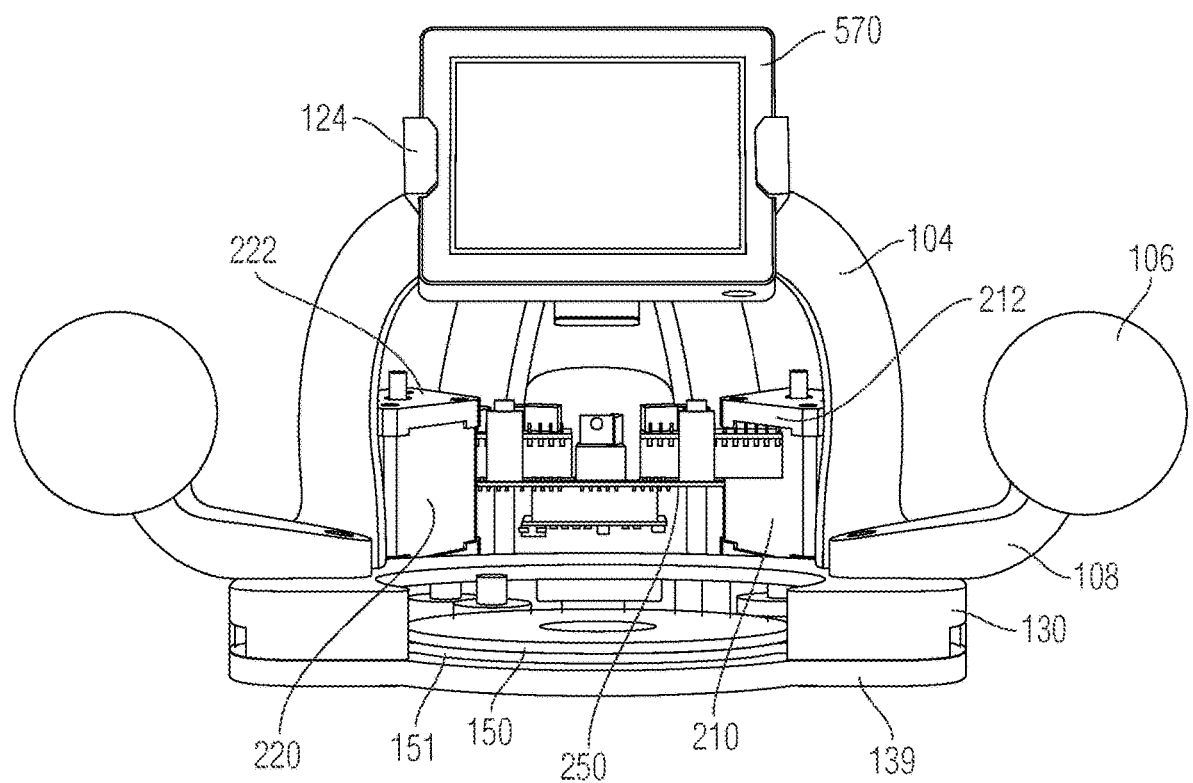
FIG. 14 depicts a front view of a tool without a working member attached in accordance with an embodiment.

FIG. 12 illustrates a block diagram of a method of calibrating position detection of a tool, in accordance with an embodiment. In brief overview, the method 1200 includes a tool detecting a first value of a parameter at 1205. At step 1210, the tool extends a working member towards a working surface. At 1210, the tool detects a second value of the parameter. At 1220, the tool determines a position of the working member relative to the working surface. The method 1200 can be performed by one or more component or module of one or more system depicted in FIGS. 1-11B.

Still referring to FIG. 12, and in further detail, the tool detects a first value of a parameter at 1205. The tool (e.g., via a sensor) can detect the first value of the parameter. The sensor can be communicatively coupled to a computing device comprising one or more processors. The parameter, or first value thereof, can indicate an amount of force exerted by a portion of a base of the tool on the working surface or towards the working surface. The tool can detect the first value of the parameter with the portion of the base of the tool in contact with the working surface. For example, the portion of the base can be resting or placed on the working surface or material. In some cases, the base can include a pad that is in contact with the working surface.

At step 1210, the tool extends a working member towards a working surface. The tool (e.g., via a motor controlled by the computing device) can extend the working member towards the working surface. When the working member contacts the working surface, the base can be at least partially in contact with the working surface. For example, the working member can contact the working surface and at least partially lift or tilt a portion of the base. The portion of the base may or may not be in contact with the surface depending on how much the tool tip in contact with the surface of the material lifts or tilts the base. In some cases, the base may still be in contact with the surface, but the amount of force exerted by the base on the working surface may be less. This lesser amount of force may correspond to the second value of the parameter.

At 1210, the tool detects a second value of the parameter. The tool (e.g., via the sensor) can detect when the working member contacts the working surface by identifying a second value of the parameter that is less than the first value of the parameter. The second value can be less than first value because the force exerted by the portion of the base can be less due to the tool tip distributing the force exerted by the base. The force can be distributed such that the tool tip exerts some of the force onto the material, or such that another portion of the base exerts greater force than a first portion of the base. For example, the tool tip can tilt the base such that a first portion of the base exerts less force than a second portion of the base. For example, the tool can detect the second value of the parameter with the portion of the base of the tool not in contact with the working surface responsive to the motor causing the working member to contact the working surface. The tool can determine the z-axis position of the working member relative to the working surface responsive to the working member tilting the base responsive to the working member contacting the working surface.

At 1220, the tool determines a position of the working member relative to the working surface. The tool (e.g., via the computing device) can determine a z-axis position or depth of the working member relative to the working surface responsive to a difference between the first value and the second value greater than a threshold. The tool can calibrate the position detection system of the tool based on these detected z-axis position. For example, the tool can set this position as a zero, initial or default position. The system can then determine the z-axis coordinate or position of the tool tip relative to the calibrated zero position. In some cases, the tool may not calibrate the detected surface as a zero position, but may record the absolute distance of the spindle. As the tool tip length can vary based on the type of working member or tool, the position of the tip of the spindle can be predetermined by the tool as it may not be interchangeable.

The form and structure of embodiments of the present disclosure for use with a cutting tool are provided and depicted in FIGS. 13-21. The embodiments depicted in FIGS. 13-21 provide a system or rig 100 which is configured for use with a router 500. The system 100 includes two support legs 104 which are attached to a base housing 130 on the lower end and terminate into a device mount 122 at the upper end. The device mount 122 includes left and right display clips 124 to clamp or lock the monitor or smart device 570 into the device mount 122. The device 570 includes a display screen 572 for the user to view the cutting path for that particular use. The base 130 also has left and right handles or grips 106 attached through handle support arms 108.

Figure 20:
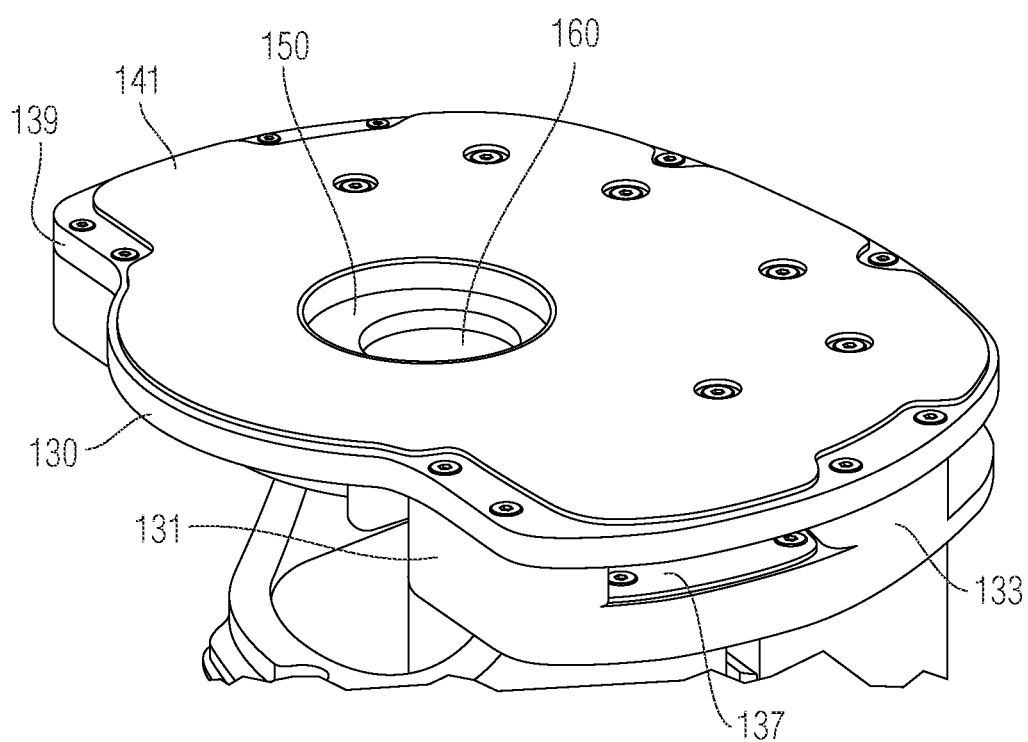
FIG. 20 provides a top view of a tool without a working member attached in accordance with an embodiment.

The lower end of the base 130 has a bottom plate 139 which encloses the stage 150 and a lower stage skid pad 151. The base 130 and bottom plate 139 are fastened to one another such as by machined screws. As seen in FIG. 20, the bottom plate 139 has a bottom skid pad 141 attached to the bottom. The bottom skid pad 141 is used to assist movement of the rig 100 along the surface of the material being worked on. The bottom skid pad 141 may be made of a high density polyethylene, Teflon, or other suitable material which is both durable and suited for sliding along the material.

Figure 21:
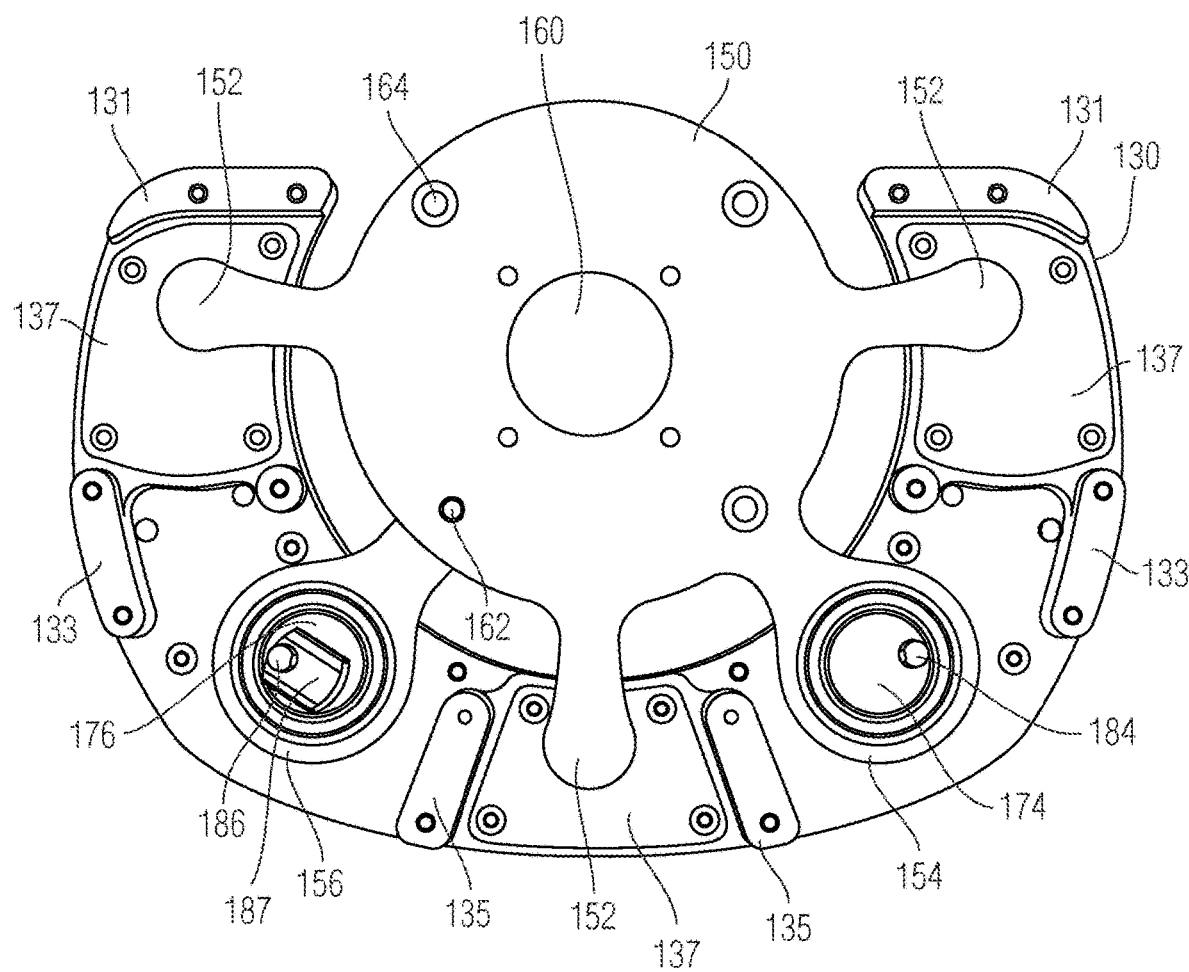
FIG. 21 provides a bottom view of the internal stage and pivot components of a tool in accordance with an embodiment.

The router 500 is added to the rig 100 by attaching the router base plate 510 to the stage 150. As seen in FIG. 21, the stage 150 has several tool attachment points 164 for attaching the router base 510 to the stage 150. The router base 510 has several router base support legs 508 which forms a cage around the router bit 512. The router 500 also has a power cord 506 and an on-off switch 504. The rig 100 may be implemented as a self-contained portable unit including an on-board source of power, such as a battery source.

The smart unit or monitor 570 can have an input cable 574 with a cable terminal or receptacle 576. If the device is a smart unit the CPU, software, and memory will be on the device itself. If the device 570 is simply a monitor then the cable 574 and receptacle 576 will connect to the CPU unit.

As shown in FIGS. 14-19, the system 100 can contain a stage motor 210 and a pivot motor 220. The stage motor 210 is used to control movement of the stage 150. The pivot motor 220 is used to control movement of the pivot arm 156 which pulls or pushes the stage 150 to convert the rotational motion of the motors 210, 220 into a relatively linear motion. The stage motor 210 and pivot motor 220 each have their own motor cap 212, 222 respectively.

The motors 210, 220 can be controlled by the stage motor driver 253 and the pivot motor driver 254 which are connected to the printed circuit board 250 and the microcontroller board 252. The microcontroller 252 processes low level instructions from the smart device or CPU unit (i.e. a laptop). The instructions would be instructions to move the motors 210, 220 to set positions (i.e. positions 150, 125) into the correct step commands to drive the motors to those positions. The motors' orientations are tracked by homing them to a zero position once and then tracking all subsequent steps taken. Alternatively, the system could use rotary encoders to keep track of the state of the motor shafts' orientations. The motors 210, 220 and the motor drivers 253, 254 are powered by connecting the power plug receptacle 255 into a power source.

Figure 15:
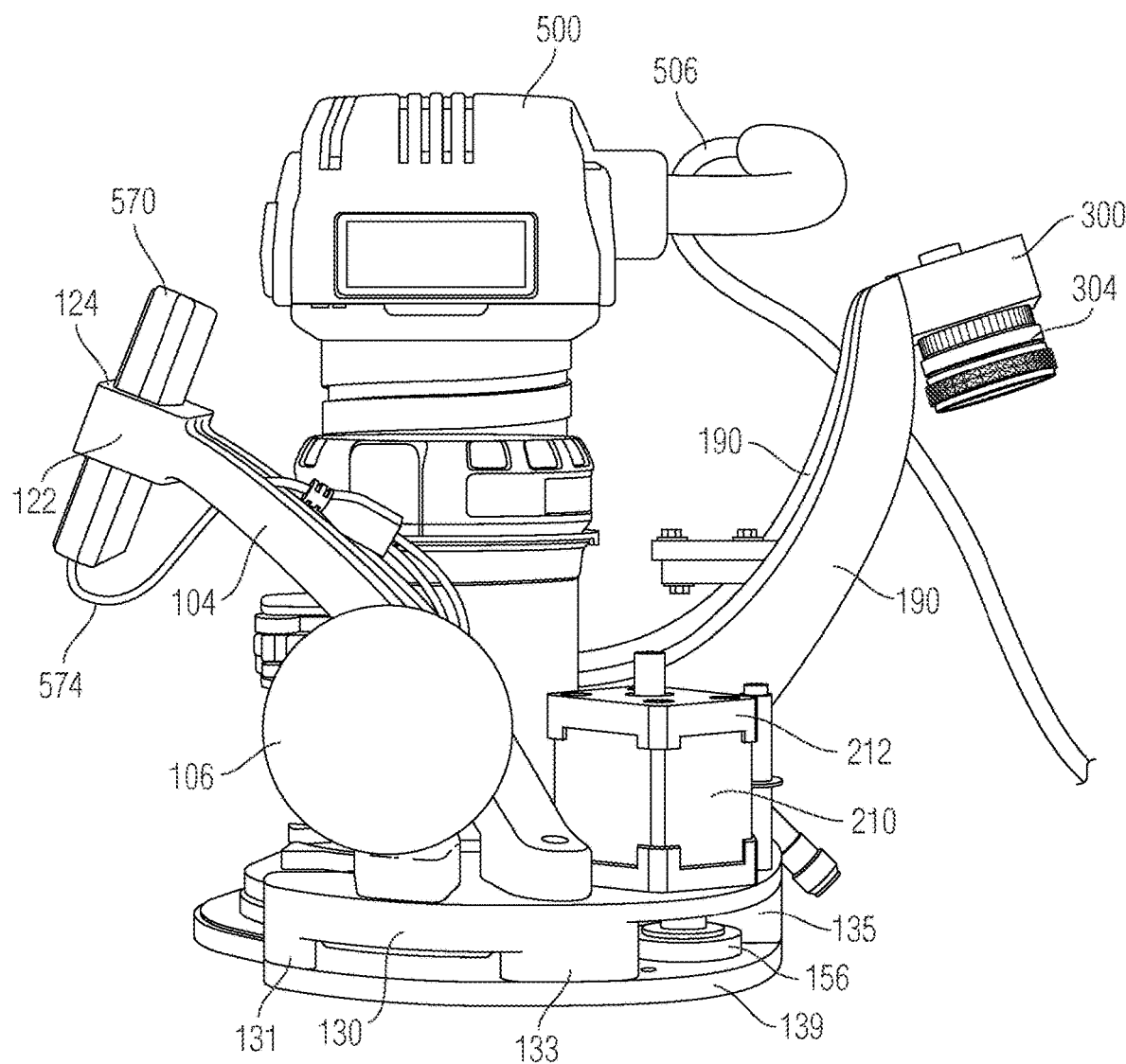
FIG. 15 provides a side view of a tool with a working member attached in accordance with an embodiment.
Figure 16:
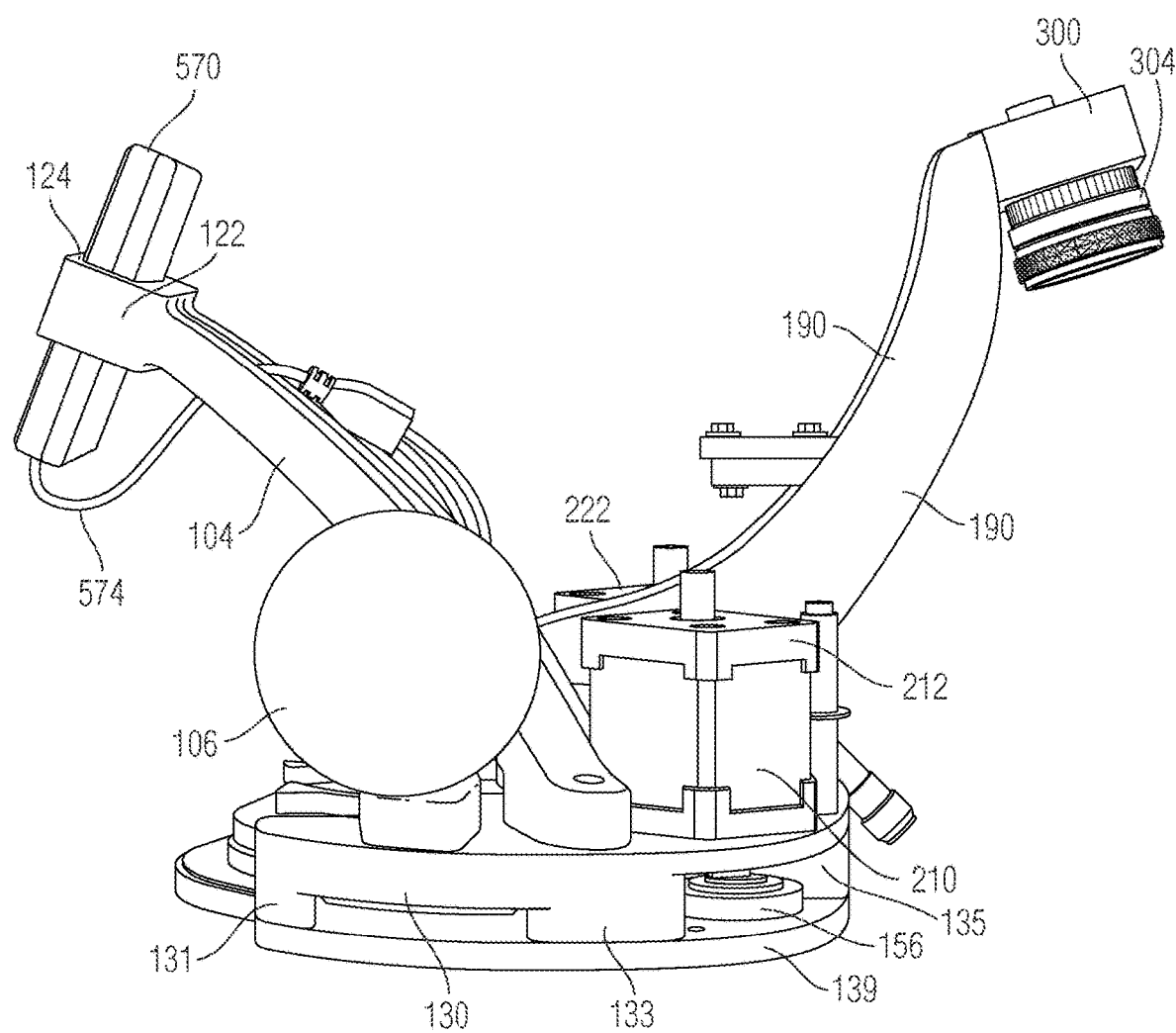
FIG. 16 provides a side view of a tool without a working member attached in accordance with an embodiment.
Figure 17:
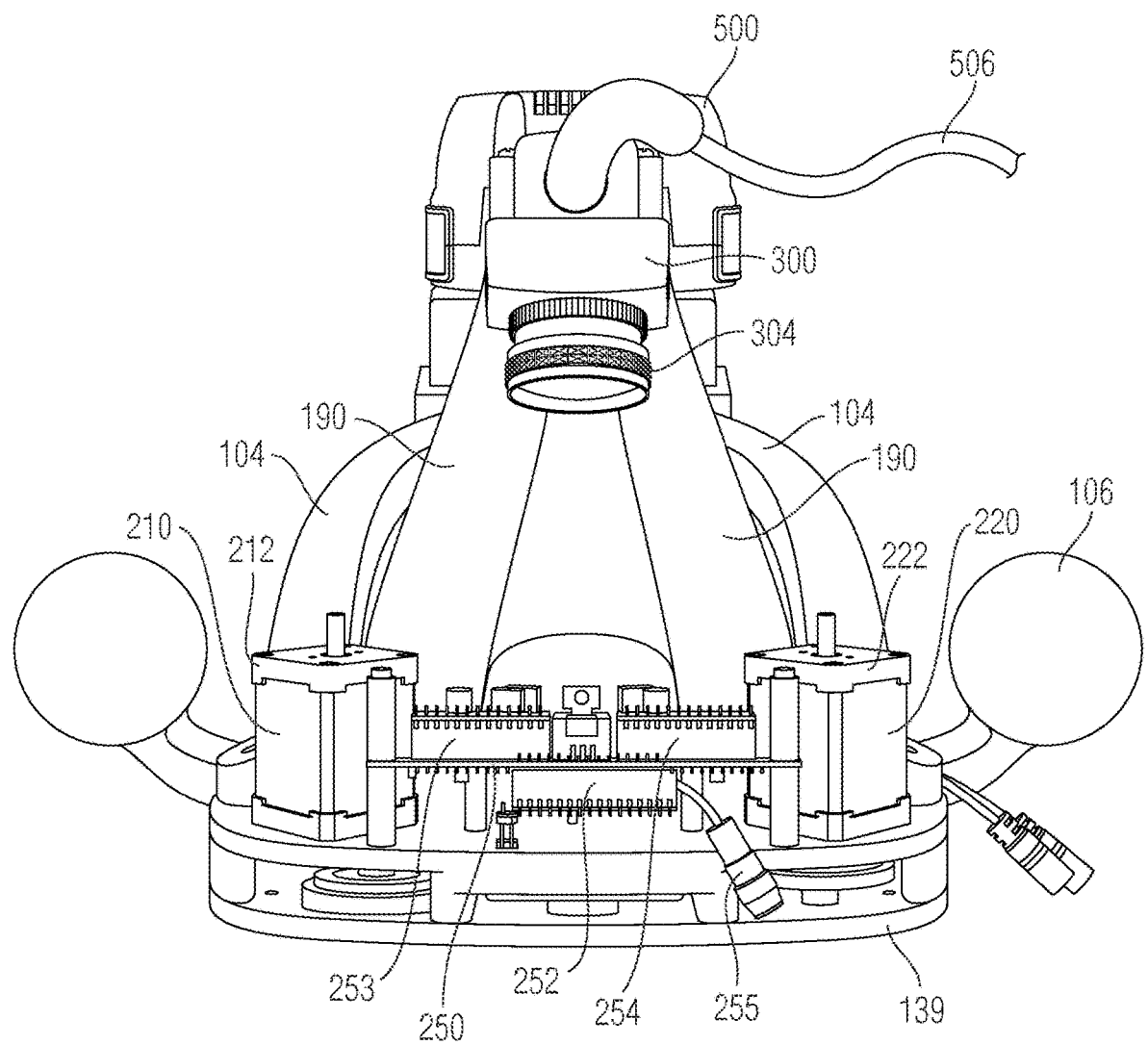
FIG. 17 provides a rear view of a tool with a working member attached in accordance with an embodiment.
Figure 18:
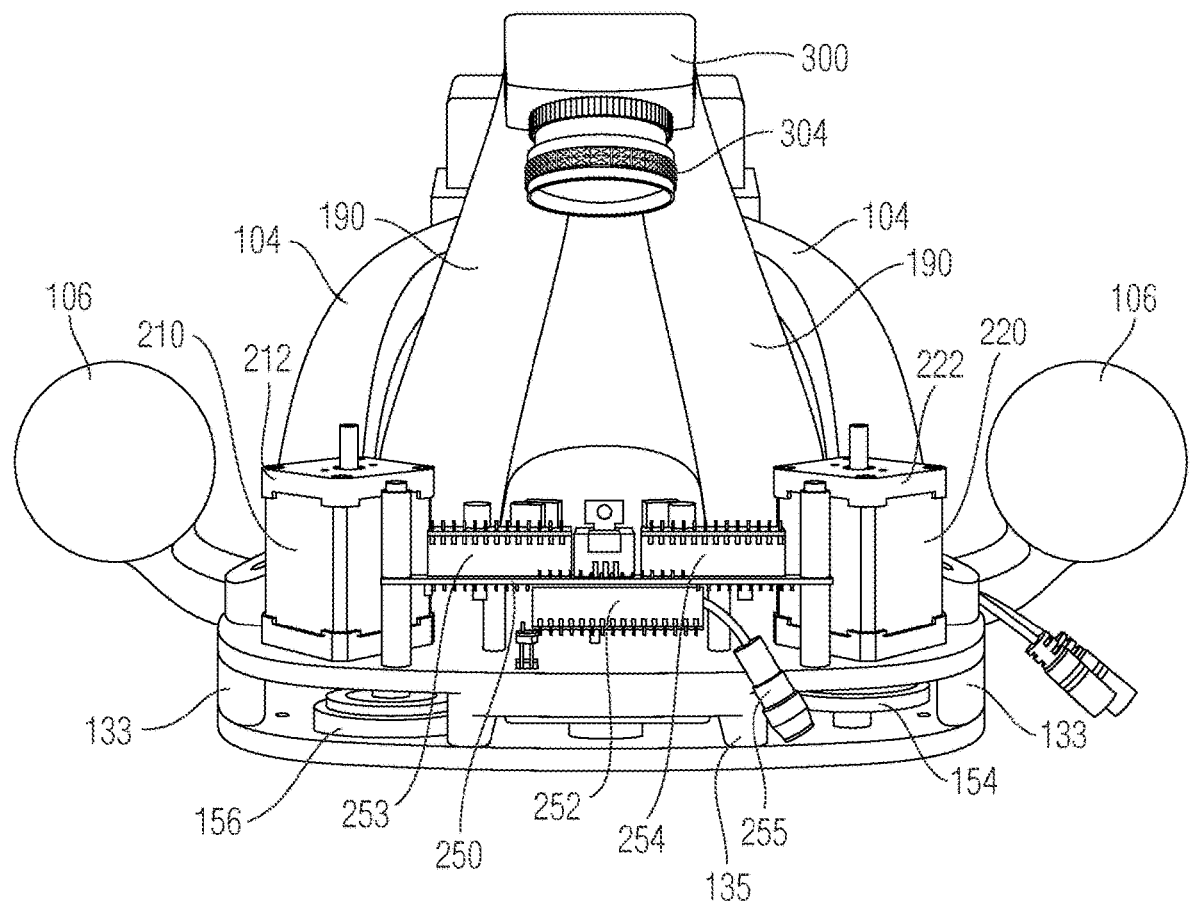
FIG. 18 provides a rear view of a tool without a working member attached in accordance with an embodiment.
Figure 19:
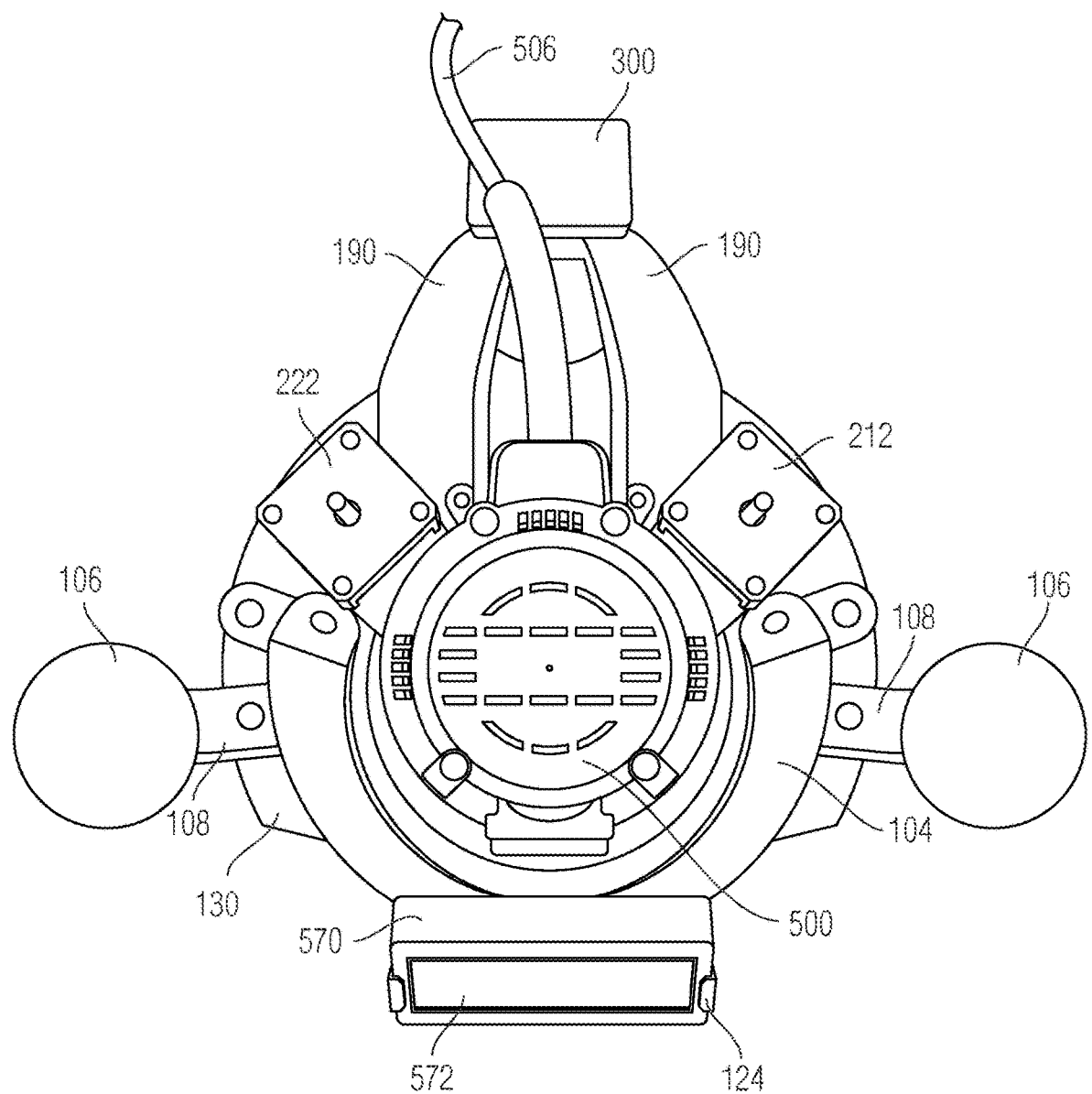
FIG. 19 provides a top view of a tool with a working member attached in accordance with an embodiment.

As shown FIGS. 15-16, the back of the rig 100 includes a camera support 190. The camera support 190 may be one or more support members which are connected to the upper stage housing 130 and terminate at the top of the rig 100 where a camera 300 is mounted. The camera 300 and a lens 304 are placed in a relatively downward position to capture images of the material being worked and the surrounding areas thereof.

The eccentrics can be used to convert the rotational motion of the motors into linear motion. Eccentrics are circular disks rotating around an off-center shaft. As the shafts are rotated, they produce linear motion in the collars wrapped around the eccentric disks. Eccentrics are able to maintain the same low backlash accuracy of a precision linear stage while being less expensive. A linear displacement range of ½" is well within the capabilities of an eccentric. The tool can include two eccentrics mounted to the frame and connected to a stage that can slide on its base. The eccentrics can be rotated by stepper motors, and by rotating them the stage can be moved within the frame. The size and shape of the various eccentrics can be varied to provide larger or smaller relative movement of the tool 699 relative to the workspace.

To constrain the stage, one eccentric can be connected directly to the stage by a ball bearing coupling, while the other is connected by a coupling and a hinge. This linkage design results in a nonlinear relationship between eccentric orientation and stage position. Near the center of the range moderate rotation of an eccentric produces moderate motion of the stage. In contrast, near the edge of the range much larger rotations are necessary to move the stage a fixed amount. In some examples, stage displacement is limited to approximately 95% of the maximum range to avoid positions with extreme nonlinearity. This linkage design also permits back driving, in that forces acting on the tool can cause the cams to rotate away from their target positions. However, the present disclosure makes use of adequately powered motors which have sufficient power to preclude back driving even in the presence of significant forces.

As shown in FIG. 21, the upper stage housing 130 can be a one piece unit with spacers 131, 133, 135 machined or formed into the upper stage housing 130. The spacers 131, 133, 135 provide the required space for the stage 150 and pivot arm 156 to move. The front spacers 131, side spacers 133, and rear spacers 135 need not be formed as one unit. Instead, the front spacers 131, side spacers 133, and rear spacers 135 could be separate pieces attached to the upper stage housing 130. The upper stage housing 130 also accommodates several upper stage skid pads 137. The upper stage skid pads 137 allow the stage stabilizing arms 152 to move along the pads 137 with minimal friction.

The stage 150 is ideally made of a light but durable and strong material such as aluminum or some other alloy. The stage 150 is most likely machined to include one or more stabilizing arms 152, the stage eccentric arm member 154, tool attachment points 168, and an opening 160 where the tool extends through the stage 150. In addition, a pivot arm 156 is most likely machined from the same alloy or material as the stage 150.

In operation, the stage motor 210 moves in response to rotation of the stage motor shaft 184. There is a stage eccentric cam member 174 attached to the stage motor shaft 184. When the stage motor shaft 184 rotates the stage eccentric cam 174 rotates and the cam design causes the stage arm member 154 connected to and surrounding the cam 174 to move the stage 150. A bearing ring may be used between the cam 174 and the stage arm member 154.

Additionally, when the pivot motor 220 moves the pivot motor shaft 186 rotates. There is a pivot eccentric cam member 176 attached to the pivot motor shaft 186. When the pivot motor shaft 186 rotates the pivot eccentric cam 176 rotates and the cam design causes the pivot arm member 154 connected to and surrounding the cam 176 to move the pivot arm 156 back and forth which causes the stage 150 to move relative to the pivot arm 156. A bearing ring may be used between the cam 176 and the pivot arm 156.

As the stage 150 and pivot arm 154 move, the stage stabilizing arms 152 move along the upper stage skid pads and the lower stage skid pad 151 (e.g., as in FIG. 13) to stabilize the stage 150 during movement. Further, the stage eccentric 174 and pivot eccentric 176 can include a boss. The boss gives the eccentric 174, 176 some extra material to house the set screw which clamps on the stage motor shaft 184 or pivot motor shaft 186, thus securely attaching it to the respective eccentric 174, 176. The pivot eccentric boss 187 is seen in FIG. 21. The stage eccentric boss is not shown in the figures as it is flipped relative to the pivot boss 187 because the stage 150 and the pivot arm 156 are operating on different planes.

Figure 22:
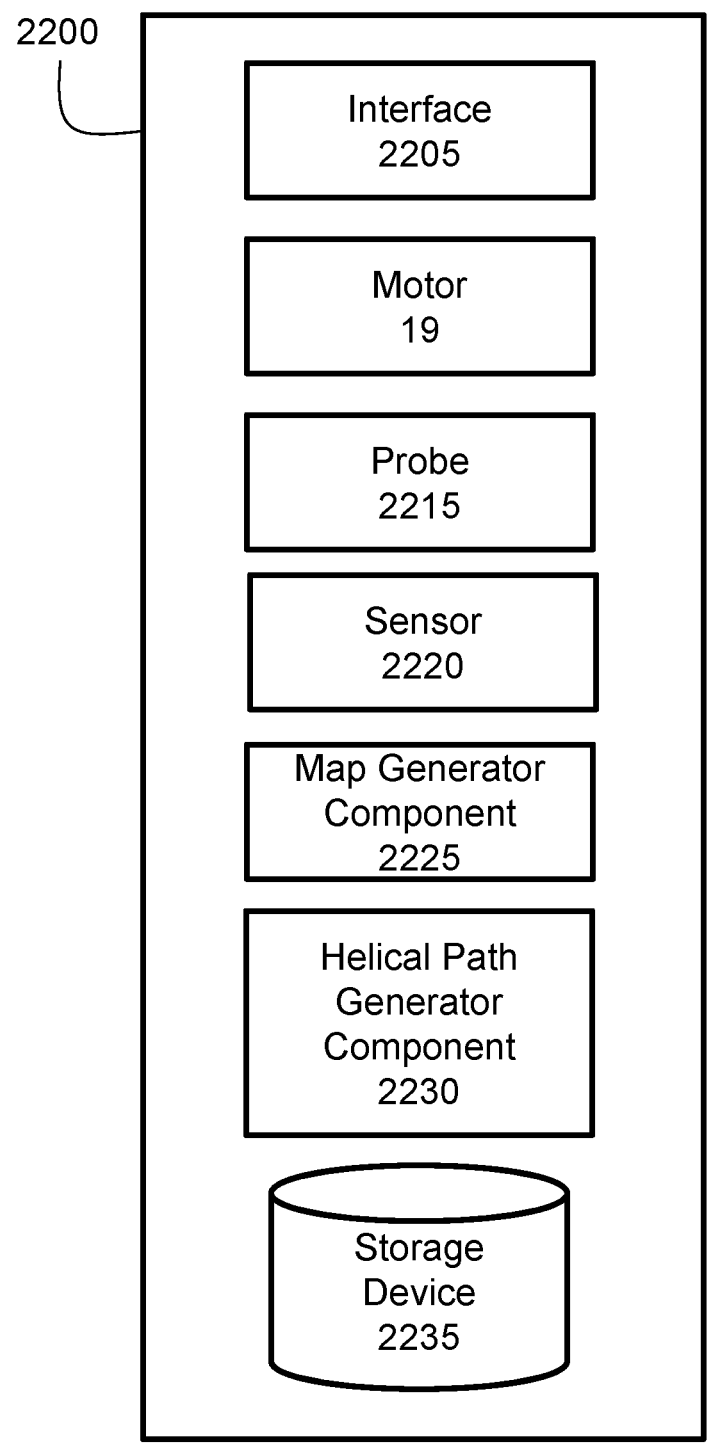
FIG. 22 depicts a system for guiding a tool, in accordance with an embodiment.

FIG. 22 depicts a system for guiding a tool. Manufacturing or making operations can include working on or with a piece of material with at least one flat facet, such as cutting a shape out of a piece of plywood. However, it may be challenging for a tool to determine the location of the edge of the flat facet, which may be a rectangle, as in a sheet of plywood, or a smooth contour, such as with the edge of a 2D template. Systems, methods, and apparatus of the present solution relate to a system for detecting the shape and/or position of the edge.

The system 2200 can be configured with one or more techniques to facilitate guiding a working member or bit of the tool. For example, the tool can include a probe and be configured with a lateral probing technique that measures a surface of a material or a workpiece, or establishes a reference point on or relative to the workpiece. The tool can probe one or more points of an outline of the workpiece to digitize a template. The tool can probe one or more points of the outline to scan the edge of a working material before and after flipping to align plans for two-sided machining. The tool can probe one or more points of the outline to generate a grid overlay.

In some embodiments, the system can include a handheld tool coupled with a digital processor. The handheld tool can include a physical element, such as a probe, of a known or approximately known geometry. The probe may be a part of the tool used in some other capacity than for probing in addition to functioning as a probe, such as a drill bit. Using one or more sensors, the system can determine the 3D position or location of the probe in an arbitrary coordinate frame, and store the position. The system can determine the position by detecting the position of the tool frame and using the offset from the tool frame to the probe, or the system can directly detect the position.

The system 2200 can include one or more component or functionality of system or tool 100, 680, 600, 800, 801, or 1000. The system 2200 can be integrated with or included with one or more component or element of system or tool 100, 680, 600, 800, 801, or 1000. The system 2200 can include one or more function or component of the system or apparatus of FIGS. 1-9 and 11A-11B. For example, the system can include tool 1000 and a base 18 or pad 22 coupled to the tool 1000. The system 2200 can include one or more processors (e.g., CPU 683), computing devices (e.g., 600), or memory (e.g., memory 687) designed and constructed to facilitate guiding a tool. The system 2200 can include an interface 2205. The interface 2205 can include a touch interface, buttons, toggle switches, motion interface, or a graphical user interface. The interface 2205 can include a dynamic interface 2205 that is manipulated by one or more processors of the system 2200. The interface 2205 can include an input/output interface, such as a touch screen, keyboard, mouse, or buttons.

The system 2200 can receive, via the interface 2205, an instruction or indication. The instruction can include an instruction to initiate or continue a probe or mapping operation. For example, the instruction can be to map a material or workpiece. A user can input the instruction via interface 2205. The interface 2205 can receive various instructions or indications. For example, the interface can receive an indication that the probe is in contact with an edge of a material. The interface 2205 can receive an indication or instruction to lower or raise the probe. The interface 2205 can receive an indication to initiate, continue, or terminate mapping the material. The interface 2205 can, responsive to receiving the instruction, provide or convey the instruction to a motor 19 (e.g., via one or more processors or a computing device). For example, the computing device can receive the indication via the interface 2205, and responsive to the indication, instruct the motor 19 to raise or lower the probe (e.g., a tool tip 24).

In some cases, the interface 2205 can receive an instruction or indication of a default or initial depth or length of the probe. For example, a user can input that the length of the probe is 0.25 inches, 0.5 inches, 0.75 inches, 1 inch or other length in another unit. The user may input an amount the probe 2215 extends beyond the base or beyond the surface of the material after the probe 2215 is lowered.

The system 2200 can include a motor 19. The motor 19 can include one or more component or functionality of motor 19 depicted in system 1000. The motor 19 can control the movement of a probe 2215 to raise or lower the probe 2215 (e.g., a working member, drill bit, or other protrusion) along an axis. The motor 19 can include one or more mechanical elements (e.g., gears, springs, coils, magnetic components, chain, pulleys, or levers) to raise and lower the probe 2215. The motor 19 can move the probe in a z-axis that is orthogonal or perpendicular to a plane of a base of the tool, such as a base plate 7 or stage 690.

The system 2200 can include one or more probes 2215. The probe 2215 can include a protrusion, working member or tool tip, such as tool tip 24. The probe 2215 can be formed of any material, such as metal, aluminum, alloy, steel, iron, plastic, fabric, or paper. In some embodiments, the probe 2215 can include a laser or light beam. The probe 2215 can have any shape, geometry or dimensions that facilitate probing the material to generate an outline, map or determine a position. For example, the probe 2215 can be cylindrical, rectangular, flat, narrow, or wide. The probe 2215 can have a radius or length, such as a radius of ⅛, ¼ of an inch, or ½ of an inch. The probe information, including shape, radius, length, can be stored in a data structure in storage device 2235.

The system 2200 can include one or more sensors 2210. The one or more sensors 2210 can include a camera, such as camera 682 or other sensors 22 or 23. The sensor 2210 can include a force sensor, proximity sensor, touch sensor, or motion sensor. The sensor 2220 can include an accelerometer or gyroscope to detect orientation.

The sensor 2220 can obtain an image of the material or workpiece. The sensor 2220 can obtain images on a continuous bases, or responsive to an indication or instruction. The sensor 2220 can, for example, receive an indication via interface 2205 that the probe is in contact with an edge of the material. Responsive to the indication, the sensor 2220 can obtain an image or capture other data about material or location of the probe 2215 or tool relative to the material.

In some embodiments, the sensor 2220 can automatically determine when the probe 2215 contacts the edge of the material. For example, the sensor 2220 can detect a force or impulse responsive to the probe pushed against the edge of the material. Responsive to detecting the force, one or more sensors or camera can capture an image or scan of the surface of the material.

The system 2200 can include a map generator component 2225. The map generator component 2225 can include or be executed by a computing device, such as computing device 600. The map generator component 2225 can determine, based on the identification that the probe 2215 is in contact with the edge of the material, a position of the probe 2215 relative to the material.

In some cases, the system 2200 can obtain or identify three-dimensional (3D) data to determine the position. Three-dimensional position data can include X, Y and Z coordinates. The system 2200 can determine X-Y coordinates using, for example, markers on the surface of the material. The system 2200 can obtain Z-axis data using the depth of the probe. The system 2200 can use the accumulated 3D position data and the known probe 2215 geometry to determine information about the edge of the material.

Figure 24:
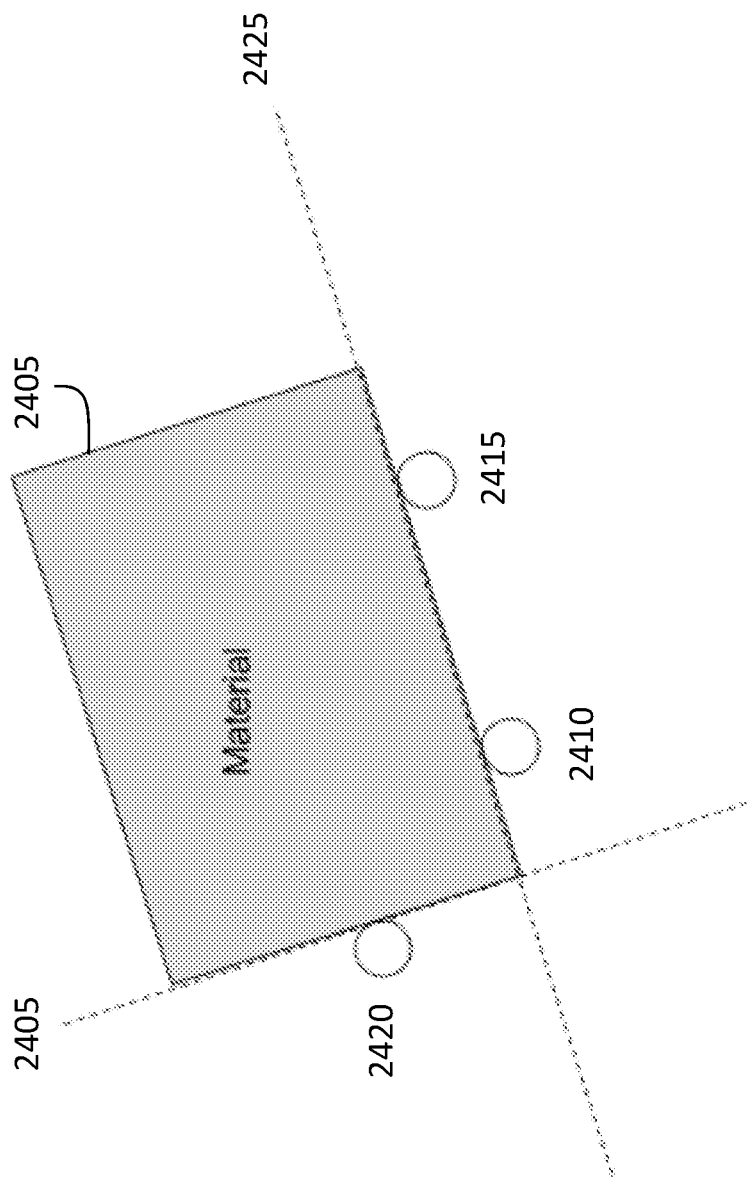
FIG. 24 is a diagram illustrating edge detection in accordance with an embodiment.

The map generator component 2225 can obtain and generate a map or outline as illustrated in FIG. 24. FIG. 24 is a diagram illustrating edge detection in accordance with an embodiment. For example, the system can identify or determine the probe 2215 geometry to be cylindrical. A user can move the handheld tool (e.g., tool 1000 integrated with system 2200) such that the probe 2215 is in contact at a point along an edge of material 2405. For example, the probe 2215 can contact the edge of the material at contact points 2410, 2415 and 2420. The user can repeatedly move the handheld tool to contact the edge points 2410, 2415 and 2420. In some cases, the user can continuously move the handheld tool to edge points 2410, 2415 and 2420, or additional edge contact points. The system 2200 can combine the determined positions 2410, 2415 and 2520 to generate a digital or electronic map or outline of the material, and store the electronic map or outline in storage device 2235.

The system 2200 can determine where the edge points 2410, 2415 or 2420 are located on the material 2405. The system 2200 can determine that edge points 2410 and 2415 are on an edge of the rectangular material 2405. For example, a user can input an indication that the edge points 2410 and 2415 are positioned on the edge of material 2405. The user can further input that point 2420 is positioned on an adjacent edge of material 2405.

The system 2205 can further determine an orientation of the tool. For example, the system 2205 can determine or be configured with information that indicates that the tool has an orientation relative to a flat facet (e.g., a base plate, stage or frame of the tool) such that the primary axis of the probe 2215 cylinder is perpendicular to the facet. The system 2200 can be configured with this information because the handheld tool may have a flat surface on which it rests on the flat material facet that enforces this orientation. From this data, the system can determine the 3D planes on which the probed edges 2410, 2415 or 2420 of the rectangle lie. The system can determine the 3D planes using computations involving the probe geometry, e.g. by offsetting a center of the probe at the detected locations by the radius of the cylindrical probe.

The system 2200 can generate a map or outline of a material or template by sliding the probe 2215 along a continuous edge. The system 2200 can generate the map of a material or template that is at least partially curved. The system 2200 can generate the map including the entire outline of the template or material that is detected by the probe 2215.

Figure 25:
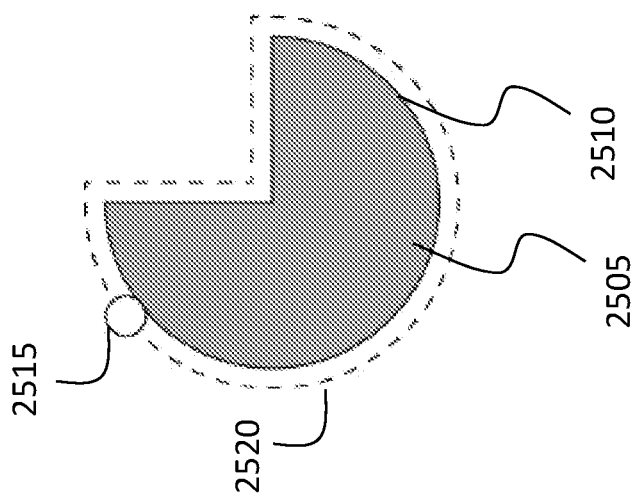
FIG. 25 is a diagram illustrating edge detection in accordance with an embodiment.

FIG. 25 is a diagram illustrating edge detection in accordance with an embodiment. FIG. 25 illustrates a material, workpiece or template 2505. The material 2505 can have an edge 2510. The probe 2215 can contact the edge 2510 of the material at a contact point 2515. When the probe 2215 contacts the edge point 2515, the center of the probe, for example a cylindrical probe, can be located on path 2520. The probe 2215 can be moved along path 2520. As the probe 2215 is moved along path 2520, the system 2200 can detect or continuously detect the position of the probe 2215 as corresponding to the path 2520. The system 2200 can continuously (e.g., based on a sampling rate of at least 1 Hz, 2 Hz, 5 Hz, 10 Hz, 25 Hz, 50 Hz or 100 Hz) detect the position of probe 2215 as it is moved along path 2515 adjacent edge 2510. The path 2520 can be offset from the edge of the material 2510 by a radius of the probe 2215. The system 2200 can correct for this offset to determine the shape of material 2505 as corresponding to the edge 2510.

Figure 26:
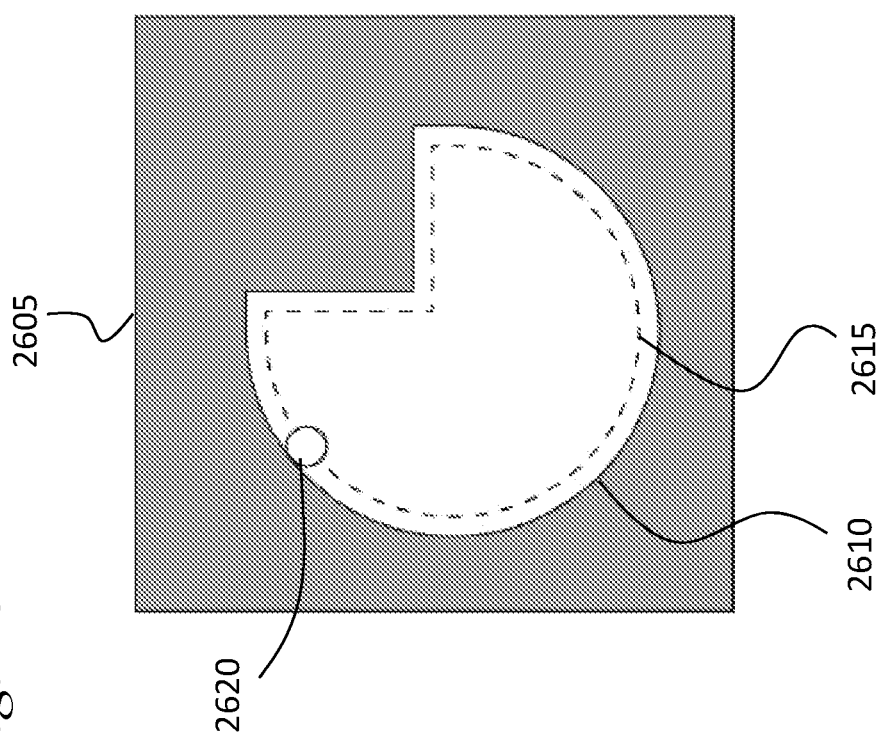
FIG. 26 is a diagram illustrating edge detection in accordance with an embodiment.

The system 2200 can receive (e.g., via interface 2205) an indication as to whether the detected edge is an interior hole in the geometry or an exterior profile, in order to offset the centers of the detected probe geometry in the correct direction to determine the probed edge geometry. FIG. 26 is a diagram illustrating edge detection in accordance with an embodiment. FIG. 26 illustrates a template 2605. The template 2605 can be formed of any material or marker, such as stickers, paper, metal or wood. The template 2605 can include a cutout 2610. The cutout 2610 can be in the interior of template 2605. The cutout 2610 can include a continuous edge. The system can determine the position of probe 2215 as at point 2620. The probe 2215 can be moved along the cutout 2610, and the system 2200 can determine the position of the probe 2215 as following along the dashed line 2615. The path 2615 can correspond to a center point of the probe offset by a radius of the probe, if the probe 2215 has a cylindrical shape. The system 2200 can continuously (e.g., based on a sampling rate of at least 1 Hz, 2 Hz, 5 Hz, 10 Hz, 25 Hz, 50 Hz or 100 Hz) detect the position of probe 2215 as it is moved along path 2615 adjacent edge 2610. Using the detected position of the probe 2215 along path 2615, the system 2200 can generate edge data, a map or outline of the cutout 2610. The system 2200 can store the edge data, map or outline in storage device 2235.

The system can use determined properties relating to the edge (e.g., 2510, 2520, 2610, or 2615) of a piece of material (e.g., 2605 or 2505) to compute derived values. The system 2200 can form a grid using this edge data to determine a Cartesian coordinate system with an origin and X and Y axes registered to the surface of the material. The system 2200 can use this grid to align digital files to the edges of the material, or to "snap" digital files to an orientation, or to "snap" a newly created shape to the grid. The system 2200 can overlay the grid on a surface of the material, or render the grid overlaid on a digital representation of the material. The system 2200 can snap a shape or newly created shape or design to the grid. The system 2200 can snap input points for generating shapes, e.g. two opposite corners of a rectangle, to be drawn. The grid can be used while creating shapes on the system 2200 or tool 1000. The position of the active snap point relative to the established origin can be displayed on the display screen of the tool 1000. The grid spacing or other dimensions can be adjusted.

Drawings made or captured (e.g., via probing) on the system 2200 or tool 1000 can be stored in storage device or other memory and later recalled or transmitted (e.g., over a network or wired communication) to other computing devices or servers.

On-tool 1000 or system 2200 creation can be used to draw other types of shapes, such as polygons or circles. The system 2200 can run scripts to generate shapes programmatically or vector-based shapes based on parameter (e.g., number of sides, dimensions, angles, or length) inputs.

The system 2200 can use the edge data to create a new digital file that can later be reproduced or followed by a digital fabrication device. For example, the user may provide a 2D wooden template, such as template 2605. The probe 2215 can follow the edge of the template 2605 to generate a digital file. The system 2200 can then use the digital file instead of the physical template 2605 when making objects that incorporate that shape.

The system 2200 can determine edge data about a piece of material on multiple occasions, and use the relationship between the two pieces to determine how the piece of material has moved. For example, a digital cut may have started on a piece of material, which may be later moved prior to completing the digital cut. The system 2200 can then update the digital specification of the cut to account for the motion to complete the cut.

The system 2200 can capture or obtain the edge data from multiple sides of a material. For example, a flat piece of material can be flipped. The system 2200 can obtain or capture edge data from the first side of the material and the second side of the material to align the second edge capture with the first edge capture. Thus, the system 2200 can align digital cuts to perform two-sided machining. In some cases, the system 2200 can obtain the edge data for each side via the lateral probing technique, while in some cases the system 2200 can obtain at least some of the edge data from other via other means.

In some embodiments, the system 2200 can be configured with a visual alignment technique. For example, the system 2200 can create a top-down image of at least a portion of the material. The system 2200 can create this top-down image while performing position tracking, taking an image, generating a grid, or using another technique. If the material has a marker or other drawing (e.g., if the user draws on a piece of material where they want to cut the material), then that drawing will appear in the top-down image, which can be rendered on a display or interface of system 2200 or tool 1000 (e.g., display screen 572). The system 2200 can be configured with an on-device shape creation tool or predetermined template to allow the user to perform a cut at desired location.

For example, a user can place an object on the surface of the material. The user can trace or outline the object with a marker, pen, or pencil. The system 2200 can scan in the surface of the material with the object removed. The scan can include the trace or outline of the object, but not the object itself. The system 2200 can include an on-device pen tool (e.g., interface 2205 which the user can use to digitally or electronically trace over the outline in the scan. Thus, the system 2200 can create a digital equivalent of the same shape, which the system 2220 can then use to guide a working member to cut out of the material.

The system 2200 can be configured to do various operations based on referencing the drawings that appear on the surface of a piece of material. The system 2200 can perform these operations using the top-down image as a reference to create the digital outline or trace on the system 2200 or tool 1000 itself.

In some cases, the system 2200 can automatically detect and digitize the drawings using computer vision. For example, the system 2200 can scan the surface of the material to create a top-down image or scan with the object still on the material. The system 2200 can use computer vision techniques to automatically identify the object. The system 2200 can automatically generate an outline or trace of the object using computing imaging or vision techniques. The system 2200 can render the automatically created trace on a display. The system 2200 can receive an indication from a user via interface 2205 to perform an operation on a portion or all of the outline, such as cut along one or more lines or paths of the automatically created trace or outline of the object.

Figure 23:
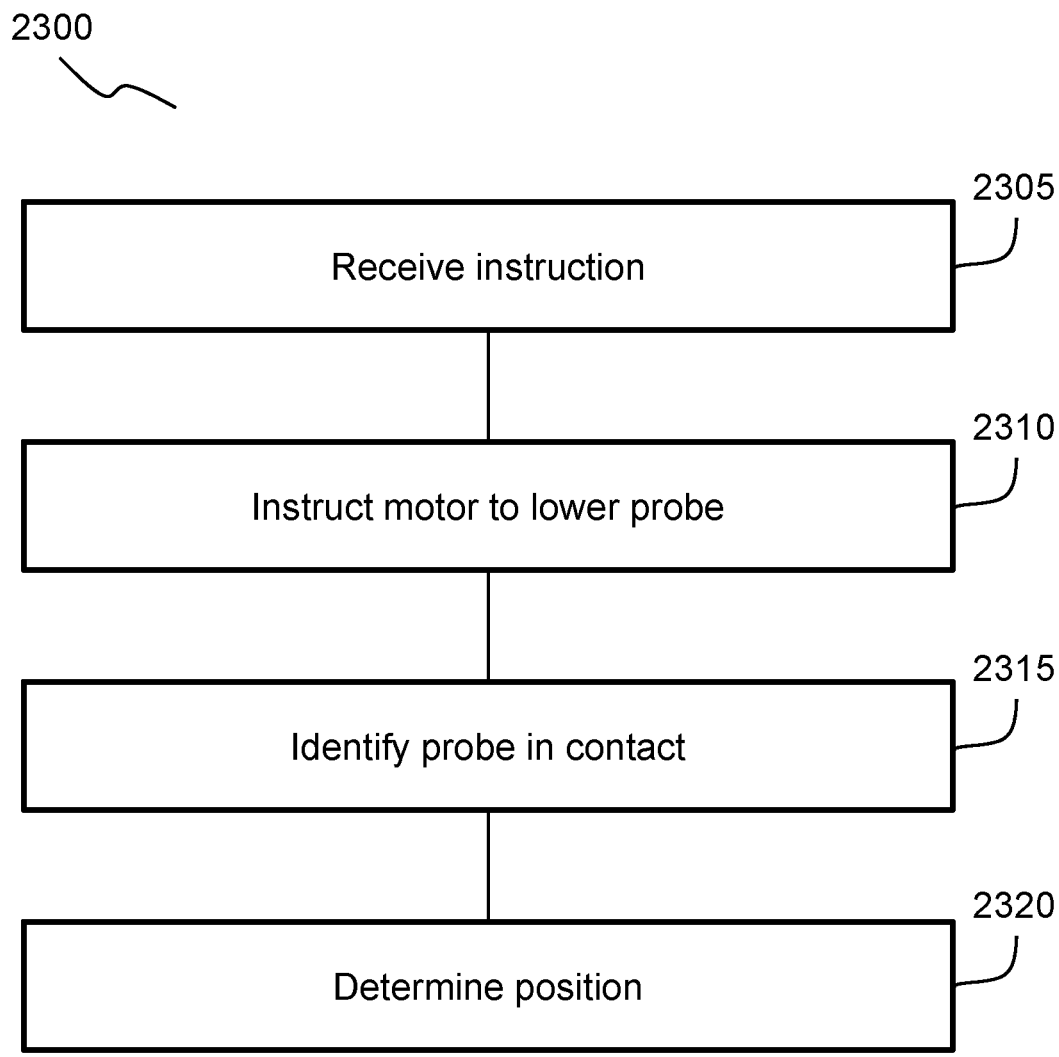
FIG. 23 depicts a flow diagram for guiding a tool, in accordance with an embodiment.

FIG. 23 depicts a flow diagram for guiding a tool, in accordance with an embodiment. The method 2300 can be performed by one or more component of system 2200 or tool 1000. The method can include a tool receiving an instruction to map a material at 2305. The tool can receive the instruction via an interface from a user or a remote device. The tool can receive additional information about parameters of the tool, material, or a probe used to map the material, such as geometry or dimension information.

At 2310, the tool can instruct the motor to lower the probe. The tool can lower the probe responsive to the instruction to generate a map. The tool can lower the probe prior to receiving the instruction to generate the map. The tool can lower the probe such that at least a portion of the probe extends beyond the base of the tool. The probe can be lowered such that the probe extends beyond the surface of the material on which the base of the tool rests. The probe can be lowered such that it is adjacent to or near an edge of the material that is to be mapped.

At 2315, the tool can identify that the probe is in contact with the edge of the material. The tool can include one or more sensors, such as force or pressure sensors, that detect the probe is in contact with the edge of the material. The tool can receive an indication via the interface that indicates that the probe is in contact with the edge of the material, or that the probe is otherwise located at a point.

At 2320, the tool can determine the position of the probe. The tool can determine the position responsive to or based on the identification that the probe is in contact with the edge of the material. The tool can determine the position relative to the surface or edge of the material. The tool can determine the position using images or scans of the surface of the material taken responsive to an indication that the probe is in contact with the edge of the material. The tool can use the position information or an orientation of the tool to determine a 3-dimensional position of the probe. For example, the sensors can include an accelerometer.

The tool can determine the position of the probe relative to the material based on a radius of the probe. The tool can be programmed with the radius of the probe, or the tool can receive the radius or other geometry information of the probe via an interface. The tool can determine multiple positions of the probe to identify multiple contact points along the edge of the material, and combine this edge data (e.g., two or three dimensional position data) to generate a map or outline of the material.

The system 2200 can be configured to generate different types of toolpaths or cutting paths. The system 2200 can include a helical path generator component 2230. For example, a cutting path can be a straight cutting path, or refer to a movement of the cutting tip or working member of tool 1000. In some cases, the system 2200 or tool 1000 can automatically generate a helical toolpath generation based on a desired edge shape or cutting shape. The system 2200 or tool 1000 can generate the helical toolpath in real-time, which can refer to the at or immediately (e.g., within 0.5 seconds, 1 second, 2 seconds, 5 seconds, 10 seconds, or 30 seconds) the time the tool 1000 is cutting the material.

When cutting a hole out of a piece of material, the system 2200 can drive the cutting bit in an approximately helical toolpath. A helical toolpath, as opposed, for example, to a circle repeated at multiple depths, can provide a continuous motion without sudden accelerations, which can provide better edge quality, and may get better performance out of the bit. The helical toolpath can facilitate cutting circular holes or other type of shapes in materials.

The system 2200 or tool 1000 can receive and process digital design files that identify or define what is to be cut. A digital design file can include, for example, a computer aided design (CAD) file. For example, the digital file can specify a circular hole of 0.3" diameter cut that is 0.5" deep into the material. The system 2200, tool 1000, or helical path generator component 2230 be configured with a computer aided manufacturing (CAM) technique to generate the toolpath from the digital file. By configuring the system 2200 or tool 1000 with CAM techniques, the system 2200 or 1000 can generate the helical toolpath at the time of cutting.

The helical path generator component 2230 can generate a toolpath that is a helix that starts at an offset of the bit radius from the desired hole perimeter and spirals down to the target depth in a single continuous motion. Thus, the digital handheld tool 1000, integrated with system 2200, can generate and implement the helical tool path on the same device on the fly or in real-time. Real-time can refer to a point in time after the user provides an indication or instruct to initiate cutting of the material. For example, real-time can be responsive to the user moving the tool near the target circular hole and then providing, via interface 2205, a command to start cutting. Responsive to receiving the command to start cutting, the helical path generator component 2230 can generate a helix that starts at the point on the target circle closest to the current position of the tool.

Figure 27:
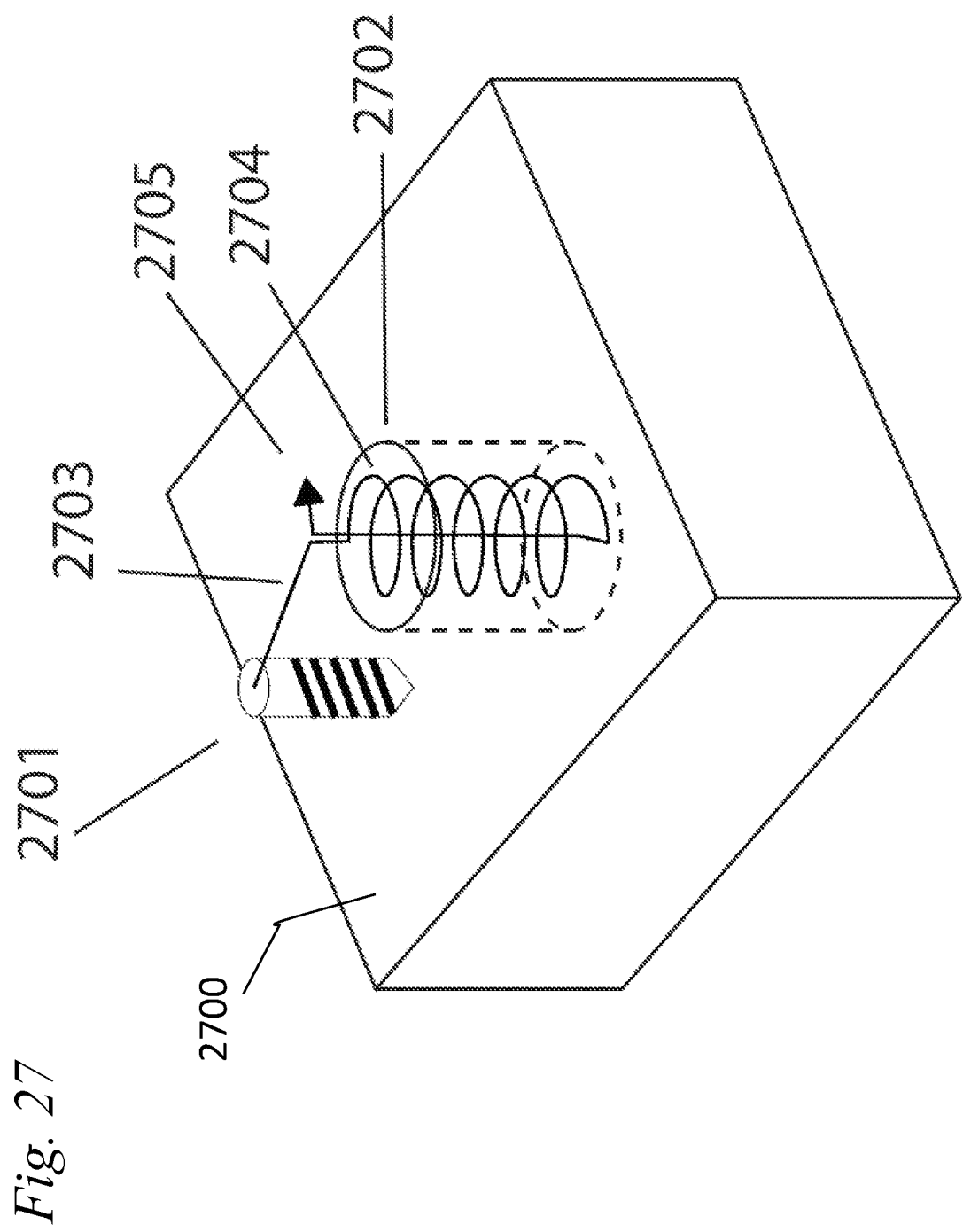
FIG. 27 is a diagram illustrating a helical tool path generated by a system in accordance with an embodiment.

FIG. 27 is a diagram illustrating a helical tool path generated by system 2200 in accordance with an embodiment. The system 2200 can use bit 2701 to cut out a hole 2702. The system 2200 can generate a helical tool path in which the bit 2701 is moved (e.g., via motor 19) to the nearest part 2703 of the hole 2702, then driven down to the surface of the material 2700, then driven down in a spiral 2704, then moved back to the center of the hole 2702, then retracted 2705. This illustration of the helical tool path is non-limiting, as the system 2200 can generate other types of helical toolpaths in real-time or on-the-fly.

In some embodiments, an automatically guided system ("AGS", e.g., system 100, system 680, system 800, system 1000, system 2200) disclosed herein allows a user to manually position the system on the working surface. In some embodiments, the actuators in the AGS position the working member along the cutting path as the user adjusts the position of the rig, which includes the actuators, an adapter holding the working member, and the working member. In some embodiments, the AGS may be combined with a second positioning system ("SPS") to permit further automation of tasks completed by the system. Using an SPS combined with an AGS, a user gets a system that has the localized position-correction capabilities of the AGS with hands-free operation of a conventional CNC. It may be desirable to combine the low-cost, automated capabilities of the AGS with large work area capabilities of a conventional CNC. In some embodiments, the AGS is responsible for the high frequency (e.g., more frequent movement), fast, accurate motion of the working member while the SPS may be responsible for the lower frequency (e.g., less frequent movement), slower, coarse movement of the AGS. In some embodiments, the AGS tracks its position with respect to the working surface and controls the motion of the SPS to position itself for a given task (e.g., instructing the SPS to move the AGS once the working member nears the edge of the adjustment region). In some embodiments, the SPS receives control instructions from the AGS and implements the control instructions to follow commands from the AGS. In some embodiments, the AGS provides position information (e.g., position of the working member, position of the AGS rig) to the SPS, and the SPS determines its own movement based on information regarding the working surface and design plan shared with the AGS.

In some embodiments, the AGS may be responsible for determining its position with respect to the working surface (e.g., with respect to a map of the working surface), determining the tasks to be performed on the working surface (e.g., determining cut paths and cut path location on the working surface for each cut path), instructing the SPS to position the AGS so that it may complete the tasks. In some embodiments, the SPS may not have the capability to determine its position relative to the working surface. In some embodiments, the SPS actuators may have low positioning accuracy and may not have encoders to determine actuator position. In some embodiments, the SPS may be a detachable unit that connects to the AGS when further automation of tasks on the working surface is desired by the user of the AGS. In some embodiments, the AGS may be used by a user to perform one or more tasks before attaching the AGS to an SPS for automating additional tasks. For example, a user may manually scan a surface of a workpiece with markers to generate data used for subsequent positioning of the AGS. After manually scanning the surface, the AGS may be connected to an SPS for automated processing of tasks, wherein a subset of the tasks use the positioning data captured by the AGS in manual mode (by the user). In another example, for a design with two or more parts, an AGS may guided manually by a user to cut the first part, and the AGS may then be connected to an SPS to cut the remaining parts in an automated mode. In some embodiments, a user may cut along a portion of a desired path by manually guiding an AGS. After cutting the portion of the path, the user may connect the AGS to an SPS to finish cutting along the desired path using the automated positioning of the AGS by the SPS. In some embodiments, the AGS or SPS may track the progress in cutting along a desired path so that the tracked data may be used to complete tasks (e.g., at a later time, using a different configuration (e.g., manual AGS, AGS connected to SPS), as discussed above) that are not completed.

In some embodiments, the SPS may attach to the edge of the working surface. In some embodiments, the SPS may be placed near the edge of the working surface. In some embodiments, the SPS may be a mobile carriage with the AGS seated on top. In some embodiments, an SPS may be configured to permit an AGS to work on a working surface that is vertical (e.g., a wall). In some embodiments, an SPS may be configured to permit an AGS to work on a working surface that lies above the AGS (e.g., a ceiling). In some embodiments, an SPS may be configured to permit an AGS to work with an arbitrary orientation with respect to the working surface. In some embodiments, the cost of the SPS may be minimized by using low resolution actuators or not including the actuator controllers for the actuators with the SPS. Designing an SPS with similar positioning capability as present on the AGS would lead to increased cost or weigh. By designing the SPS as disclosed herein, the combined AGS and SPS system permits hands-free automation without cost, complexity, and size/weight of a conventional CNC. In some embodiments, the AGS may be designed to accept a removable SPS control unit, reducing the cost and complexity of the AGS low until the capability to control the SPS is desired.

In some embodiments, the AGS may provide position information or position instruction to the SPS. In some embodiments, the AGS may provide instructions as a direction and a magnitude to the SPS, wherein the magnitude may be a distance, a speed, a virtual force, etc. In some embodiments, the AGS may provide position instructions to the SPS based on a feedback loop, with the AGS determining the position change based on the execution of a position instruction for the SPS and correcting accordingly. In some embodiments, the AGS may provide movement instructions to the SPS, or vice versa, which include at least one or more of: velocity magnitude, velocity magnitude and direction, direction, distance, displacement magnitude and direction, length, rotation angle, absolute coordinates, and relative coordinates. In some embodiments, the AGS may analyze the spatial frequency of the path and instruct the SPS based on the low spatial frequency path data and instruct the internal working member control system based on the high spatial frequency path data. In some embodiments, the low spatial frequency and high spatial frequency distinction may be made based on at least one or more of a physical dimension of the working member (e.g., the cutting bit diameter) and adjustment region of the AGS. In some embodiments, the control instructions may be selected to the SPS may minimize changes in direction (e.g., acceleration) to improve smoothness, which may improve positioning accuracy. In some embodiments, the control instructions may be selected for the SPS to reduce power consumption or wear. For example, the path of travel for the SPS may be selected such that: (1) all points on the path to be traversed by the working member are within the adjustment region of the AGS, and (2) the path of travel for the SPS lowers power consumption or wear (e.g., shorter SPS path that still enables (1), SPS path that lowers power consumption of SPS actuators, SPS path that lowers speed of AGS, and the like). In some embodiments, the control instructions to the SPS may be selected to minimize loads (e.g., force, torque) on the SPS (e.g., in the case of an articulated arm SPS where certain motions of the SPS may result in the SPS bearing a load at a large distance) or on the AGS. In some embodiments, the control instructions to the SPS may be selected to avoid areas where the AGS or the SPS may become unstable (e.g., driving the AGS near a working surface edge where the AGS may fall).

In some embodiments, the AGS may analyze the motion resulting from a command sent to the SPS to compensate for SPS positional error. For example, if the AGS sends a command to the SPS to move −5 mm in X and 10 mm in Y and the motion resulting from the SPS executing the command from the AGS results in a movement of −4.8 mm in X and 9.2 mm in Y (e.g., as measured by the AGS or the SPS), the AGS may compensate for the error in one or both axes. In another example, if the AGS sends a command to the SPS to move 5 mm/sec at 60 degrees and the motion resulting from the SPS executing the command from the AGS results in a movement of 5.4 mm/sec at 58 degrees, the AGS may compensate for the error in magnitude, direction, or both. In some embodiments, the AGS may update its internal model of the SPS's mechanics or the orientation of the SPS's coordinate frame relative to the AGS's notion of the working surface coordinate frame, such that future commands may not require some types of compensation. In some embodiments, the compensation used by the AGS to control the SPS may depend on the position of the AGS, SPS, or both—for example, if different positions on a surface of a workpiece require different compensation for the SPS (e.g., due to SPS geometry—articulated arms extended versus folded).

In some embodiments, the SPS may communicate information back to the AGS. In some embodiments, the SPS may communicate the completion of the execution of a command received from the AGS. In some embodiments, the SPS may communicate the beginning of the execution of a command received from the AGS. In some embodiments, the SPS may communicate the receipt of a command from the AGS. In some embodiments, the SPS may communicate position information for one or more components of the SPS to the AGS. In some embodiments, the AGS may convert motion commands (e.g., for distance, for speed) from one coordinate system (e.g., the AGS coordinate system) to another coordinate system (e.g., the SPS coordinate system). For example, the AGS may convert a command to move the SPS 5 mm in X and −10 mm in Y to move the SPS base 11.18 mm at 39 degrees (e.g., if the AGS uses an XY stage configuration and the SPS uses an articulated arm configuration). In another example, the AGS may convert a command to move the SPS 5 mm in X and −10 mm in Y to rotate SPS actuator #1 by 4 degrees and translate actuator #3 by 7 mm (e.g., if the AGS uses an XY stage configuration and the SPS uses a combination of an articulated arm and translating stage).

In some embodiments, the AGS may instruct the SPS to move the AGS to automatically scan the working surface (e.g., to generate a map of the working surface). In some embodiments, the AGS may instruct the SPS to move the AGS based on the AGS encountering new markers. In some embodiments, the AGS may instruct the SPS to move the AGS in a pattern (e.g., spiral, zig-zag, etc.) to scan the working surface. In some embodiments, the AGS may instruct the SPS to continue scanning in a given direction as long as additional markers keep appearing in the field of view as the AGS is moved by the SPS. In some embodiments, the AGS may instruct the SPS to move in a different direction if, after moving a certain distance in an original direction, no new markers are detected in the field of view. In some embodiments, an AGS configured for scanning or laying out tasks may exclude at least one or more of in-plane working member positioning capability (e.g., the capability of positioning the working member within a 2d-region), and working member operation capability (e.g., spindle to spin the working member in a router configuration) to lower the cost of the AGS. In some embodiments, the AGS may include a probe which may be adjusted in Z to determine working surface topography or working surface edge shape.

In some embodiments, the scan produced by the AGS may include at least one or more of: working surface topography information (e.g., acquired by probing the working surface with a probe), working surface shape information (e.g., acquired by probing the perimeter of the working surface with an edge probe), working surface marking information (e.g., design marks drawn on the working surface), information regarding markers placed on the working surface, and information regarding markers placed on one or more surfaces adjacent to the working surface. In some embodiments, the scanned information may be sent to one or more remote computer systems (e.g., wireless network connected AGS, wired network connected server).

In some embodiments, the AGS may communicate with the SPS using wired (e.g., RS-232, RS-485, SPI, I$^2$C, USB) or wireless (e.g., Bluetooth, WiFi) communication protocols. In some embodiments, the AGS may communicate with the SPS using a PCI or similar interface. In some embodiments, the SPS may power itself using a wired power outlet, and the SPS may also provide power to the AGS using the same wired power outlet. In some embodiments, the SPS may power itself using on-board energy storage (e.g., batteries), and the SPS may also provide power to the AGS using the same energy source. In some embodiments, the AGS may provide power to the SPS. In some embodiments, the SPS may provide a vacuum line to connect to a vacuum port on the AGS, as shown in the embodiment illustrated in FIG. 33A.

In some embodiments, the AGS may communicate with the SPS using a bi-directional communication interface. In some embodiments, the SPS may include sensors to determine its position with respect to the working surface, or to detect the edge of the working surface. In some embodiments, the SPS may include sensors to analyze the working surface or to analyze the performance of the AGS. For example, the SPS may include sensors to monitor the performance of a task by the AGS (e.g., an optical sensor to monitor the width of a cut made by the AGS, a depth sensor (e.g., mechanical probe) to monitor the depth a cut made by the AGS). In some embodiments, the SPS may include sensors to record parameters related to work environment (e.g., temperature, humidity), parameters related to the workpiece (e.g., type of material, texture, roughness, workpiece dimensions, workpiece shape), or parameters related to the AGS configuration (e.g., working member type, working member dimensions). In some embodiments, the AGS or SPS may include sensors (e.g., stereoscopic cameras, time-of-flight cameras, lidar) to map the 3D space around the AGS or the SPS. In some embodiments, the data from these detectors may be used to avoid collisions with objects in the work space or to define an area corresponding to the working surface. In some embodiments, the AGS may use data from the SPS to modify parameters related to tasks (e.g., working member spin speed, power level of motor driving working member) or to modify parameters related to positioning (e.g., direction or magnitude instructions for the SPS).

In some embodiments, the AGS or the SPS may include features to counteract cutting forces encountered by the AGS while performing tasks on the working surface. In some embodiments, the AGS or SPS may utilize a vacuum assisted base utilizing modulated vacuum force to vary the friction between the base and the working surface. In some embodiments, the vacuum assisted base may be part of the AGS. In some embodiments, the vacuum assisted base may be part of the SPS. In some embodiments, the AGS or SPS may include one or more gyroscopes that may be coupled with the AGS or SPS mechanical body in a modulated manner (e.g., using mechanical or frictional clutches) to add inertial stability. In some embodiments, the AGS or the SPS may include dampers (e.g., rotational or linear dampers) or variable friction devices (e.g., joints, hinges). In some embodiments, the AGS or SPS may measure the cutting forces (e.g., based on position, using a strain gauge, using an inertial sensor) and use one or more actuators (in the AGS or the SPS) to counteract the detected force or motion. In some embodiments, mass may be added to the AGS or the SPS to increase the inertial mass impacted by cutting forces.

Figure 30A:
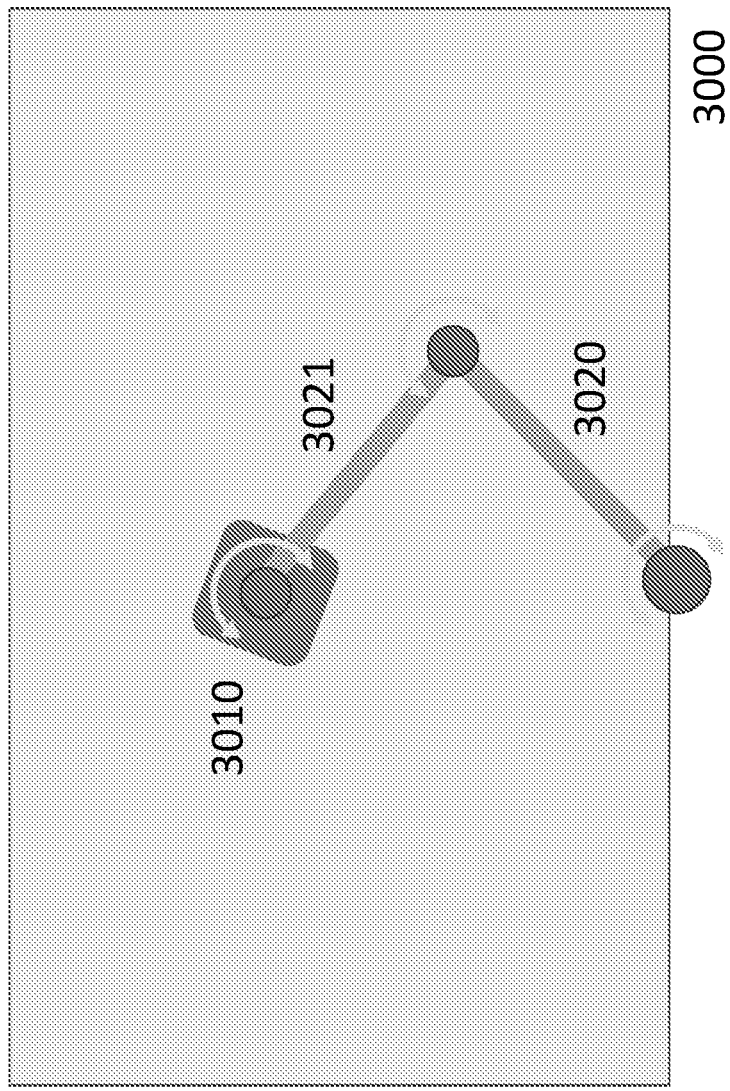
FIGS. 30A-30K are schematic diagrams of embodiments showing an automatically guided system connected to a second positioning system.

FIG. 30A provides a schematic illustration of an AGS 3010 connected to an articulated arm SPS with a first arm 3020 and a second arm 3021 relative to working surface 3000. In an exemplary embodiment, actuators at the joints at the end of each arm (3020, 3021) permit rotational motion. Based on the design geometry, the AGS 3010 may rotate in place or reach different positions on the working surface 3000 by adjusting the angle between the arms (3020, 3021) or by adjusting the angle between arm 3020 and an edge of working surface 3000.

Figure 30B:
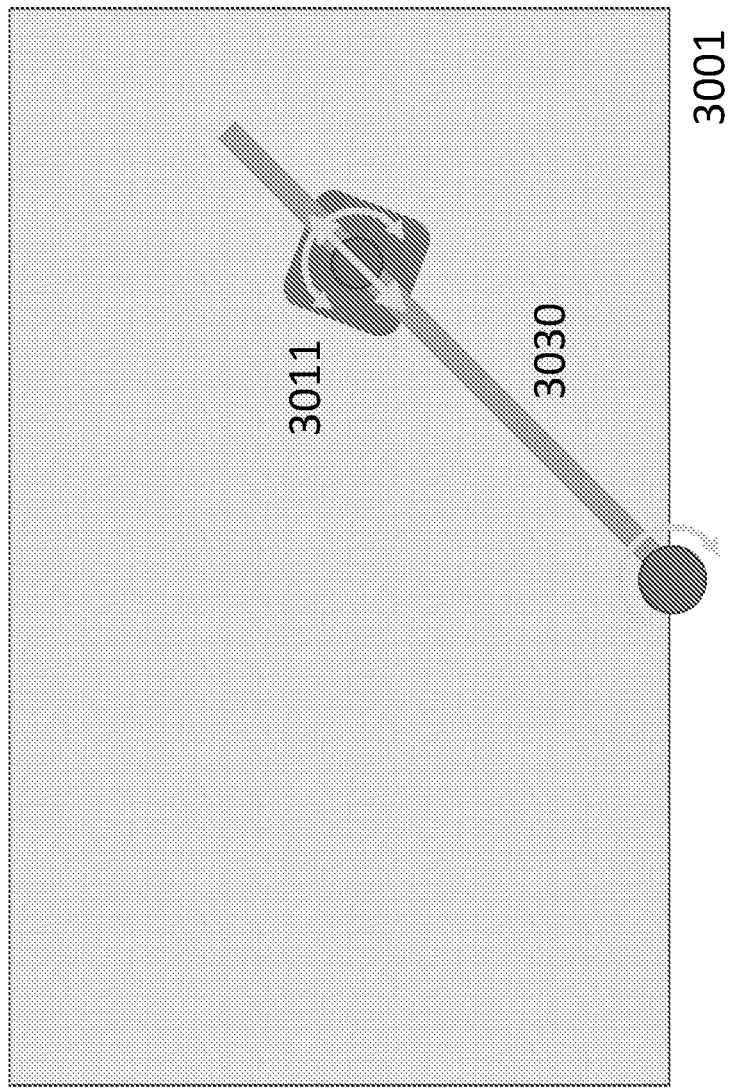

FIG. 30B provides a schematic illustration of an AGS 3011 connected to an SPS with an arm 3030 (e.g., rotary rail combined with a linear rail) relative to working surface 3001. In an exemplary embodiment, a first actuator at the end of the arm 3030 permits rotation of the arm 3030 relative to an edge of the working surface 3001. A second actuator permits motion of the AGS 3011 along the length of arm 3030. A third actuator permits the AGS 3011 to rotate in place. Based on this geometry, the AGS 3011 may rotate in place or reach different positions on the working surface 3001 by moving along arm 3030 or controlling the angle between arm 3030 and an edge of the working surface 3001. In some embodiments, a linear rail may comprise a stage platform, a stage base, and an actuator.

Figure 30C:
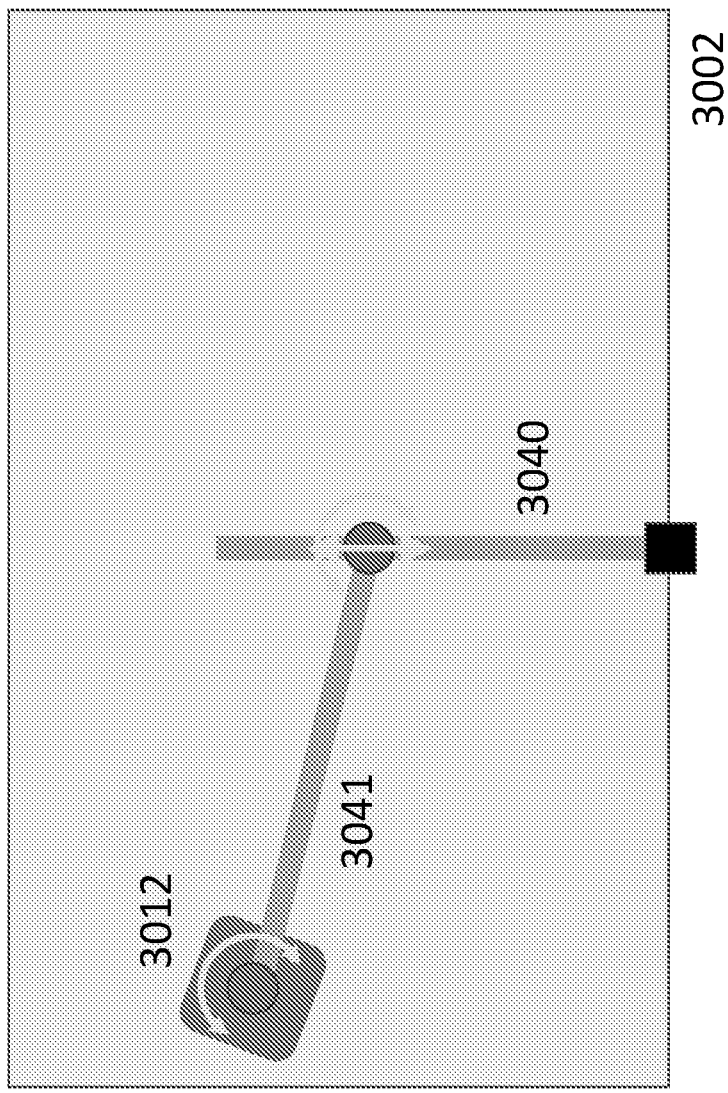

FIG. 30C provides a schematic illustration, relative to working surface 3002, of an AGS 3012 connected to an SPS with one fixed arm (3040) and one arm that is free to rotate (3041) relative to relative to the fixed arm 3040 (e.g., fixed linear rail with rotary rail). In an exemplary embodiment, a first actuator allows a first end of arm 3041 to rotate relative to arm 3040. A second actuator allows the first end of arm 3041 to move along arm 3040. A third actuator allows the AGS 3012 to rotate in place. Based on this geometry, the AGS 3012 may rotate in place or reach different positions on the working surface 3002 by moving arm 3041 along arm 3040 or controlling the angle between arms 3040 and 3041.

Figure 30D:
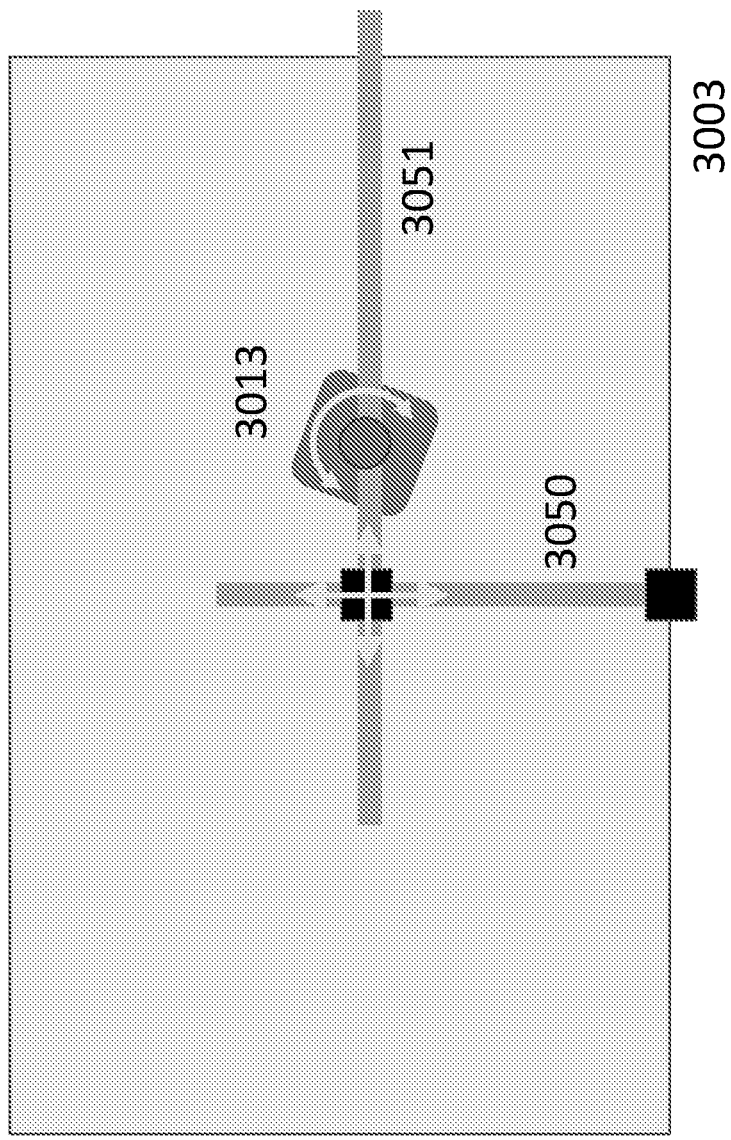

FIG. 30D provides a schematic illustration, relative to working surface 3003, of an AGS 3013 connected to an SPS with two right-angle intersecting arms (3050, 3051) that translate relative to each other (e.g., two linear rails). In an exemplary embodiment, a first actuator permits the AGS 3013 to rotate in place. A second actuator allows arm 3051 to translate relative to arm 3050. A third actuator allows arm 3050 to translate relative to arm 3501. Based on this geometry, the AGS 3013 may rotate in place or reach different positions on the working surface 3003 by changing the point of intersection of arms 3050 and 3051.

Figure 30E:
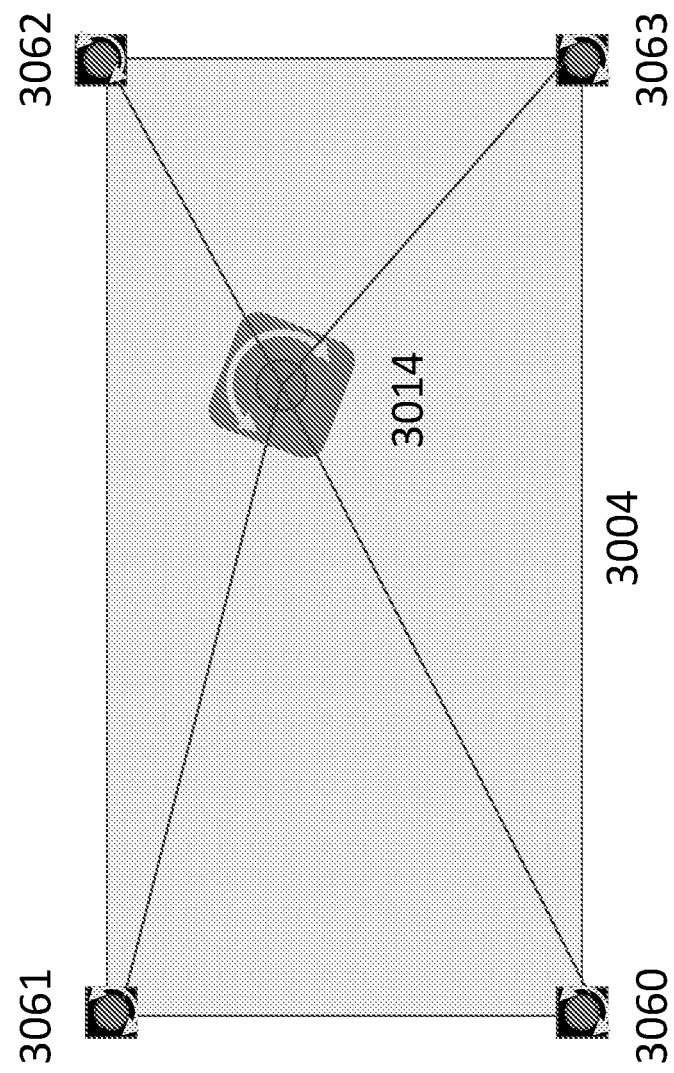

FIG. 30E provides a schematic illustration of an AGS 3014 connected to an SPS arrangement with 4 motor spindles (3060, 3061, 3062, and 3063) at the corners of working surface 3004. In an exemplary embodiment, connection wires to each motor spindle can be lengthened and shortened to control the position of the AGS 3014 on working surface 3004. An actuator permits the AGS 3014 to rotate in place. Based on this arrangement, the AGS 3014 may rotate in place or reach different positions on the working surface 3004 by changing the length of the connection wires.

Figure 30F:
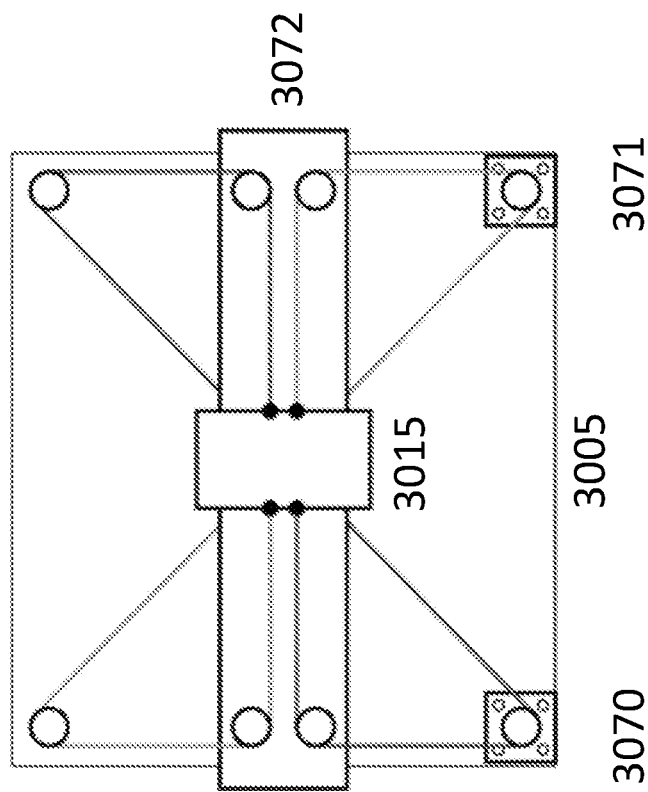

FIG. 30F provides a schematic illustration of an AGS 3015 connected to an SPS arrangement with two motor spindles (3070, 3071) connected to a linear slider 3072 relative to working surface 3005. In an exemplary embodiment, the AGS 3015 may move horizontally by rotating motors (3070, 3071) in the same direction. The AGS 3010 may move vertically by rotating motors (3070, 3071) in opposite directions. Based on this arrangement, the AGS 3015 may reach different positions on the working surface 3005 by rotating motors (3070, 3071). The mechanism illustrated in FIG. 30L is functionally identical to the mechanism illustrated in FIG. 30F. In FIG. 30L, two additional pulleys have been added to shift the belt cross-over outside the working envelope.

Figure 30G:
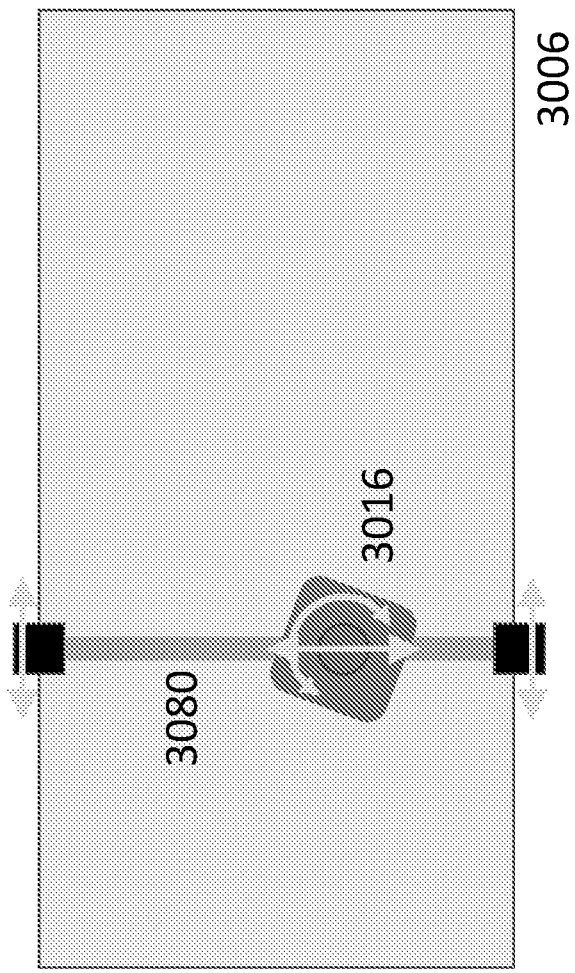

FIG. 30G provides a schematic illustration of an AGS 3016 connected to an SPS with a linear rail 3080 that translates horizontally along working surface 3006. In an exemplary embodiment, two actuators at the ends of linear rail 3080 translate the linear rail horizontally along the working surface 3006. A third actuator allows the AGS 3016 to rotate in place. A fourth actuator allows the AGS 3016 to move vertically along the linear rail 3080. Based on this arrangement, the AGS 3016 may rotate in place or reach different positions on the working surface 3006 by controlling the position of the linear rail relative to working surface 3006 or controlling its position on linear rail 3080.

In some embodiments, the mechanical design of the linear rail 3080 may prevent the linear rail 3080 from rotating within the plane (e.g., departing from the illustrated vertical orientation in FIG. 30G). In some embodiments, the actuators translating the linear rail 3080 horizontally across the working surface 3006 may be driven synchronously to prevent rotating the linear rail 3080 within the plane (e.g., departing from the illustrated vertical orientation in FIG. 30G). In some embodiments, the linear rail 3080 may rest on the working surface 3006. In some embodiments, a rig adapter (connected to linear rail 3080, not shown), on which AGS 3016 is fixed, rests on the working surface. In some embodiments, a drive belt (e.g., timing belt) fixed over two pulleys (e.g., one at each end of the linear rail 3080) is used to move the AGS 3016 along the linear rail 3080. In some embodiments, the linear rail end fixturing may be designed to keep the long axis (vertical direction in FIG. 30G) of the linear rail 3080 parallel to the working surface 3006. In some embodiments, the linear end fixturing may be designed to keep the short axis (horizontal direction in FIG. 30G) of the linear rail 3080 parallel to the working surface 3006.

Figure 33B:
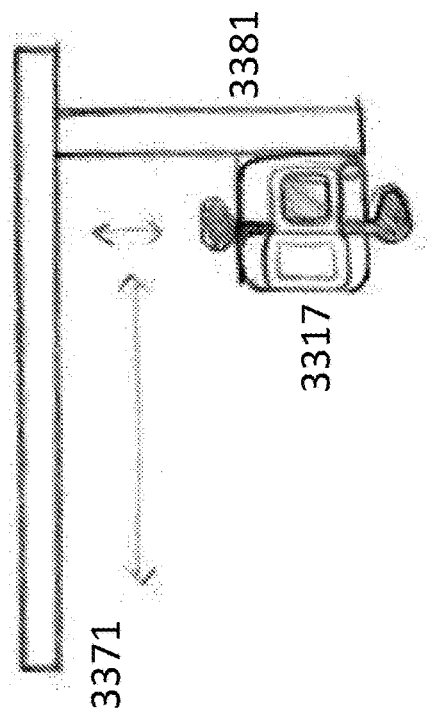
FIGS. 33A-33B are renderings of two embodiments of schematic diagram shown in FIG. 30G.
Figure 33A:
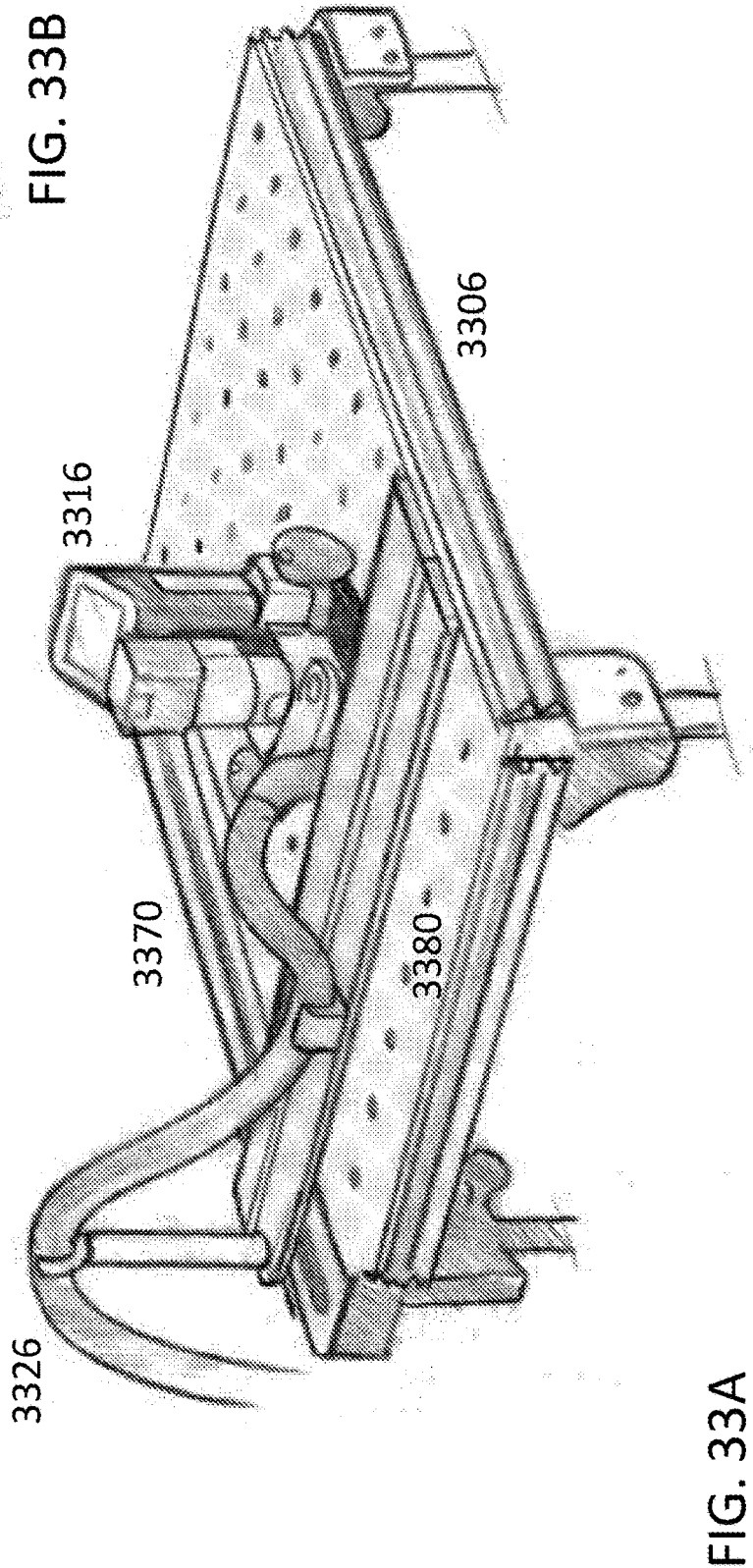

FIG. 33A shows an isometric-view illustration of a system based on the schematic shown in FIG. 30G. The system in FIG. 33A includes an AGS 3316 connected to an SPS with a linear stage 3370 and a linear stage 3380. The system in FIG. 33A moves the AGS 3316 to a position on the working surface 3306 using the linear stage 3370 to move the AGS 3316 along the length of the working surface 3306 (parallel to the long edge) and using the linear stage 3380 to move the AGS 3316 along the width of the working surface 3306 (parallel to the short edge). The system uses linear stages 3370 and 3380 to coarsely position the AGS (including a working member in the AGS) at a location where work is to be performed on working surface 3306. At a given position on the working surface 3306, the AGS 3316 may adjust the fine position of the working member anywhere within an adjustment region, using actuators in the AGS, to perform work at the given position on the working surface 3306. In some embodiments, a vacuum connection (e.g., hose) mounted to the SPS (3326) may be used to connect to a vacuum port on AGS 3316.

FIG. 33B shows a top-view illustration of a second system based on the schematic shown in FIG. 30G. The second system includes AGS 3317, linear stage 3371, and linear stage 3381. Linear stage 3371 allows the second system to position the AGS 3317 along the X-axis. Linear stage 3381 allows the second system to position the AGS 3317 along the Y-axis.

Figure 30H:
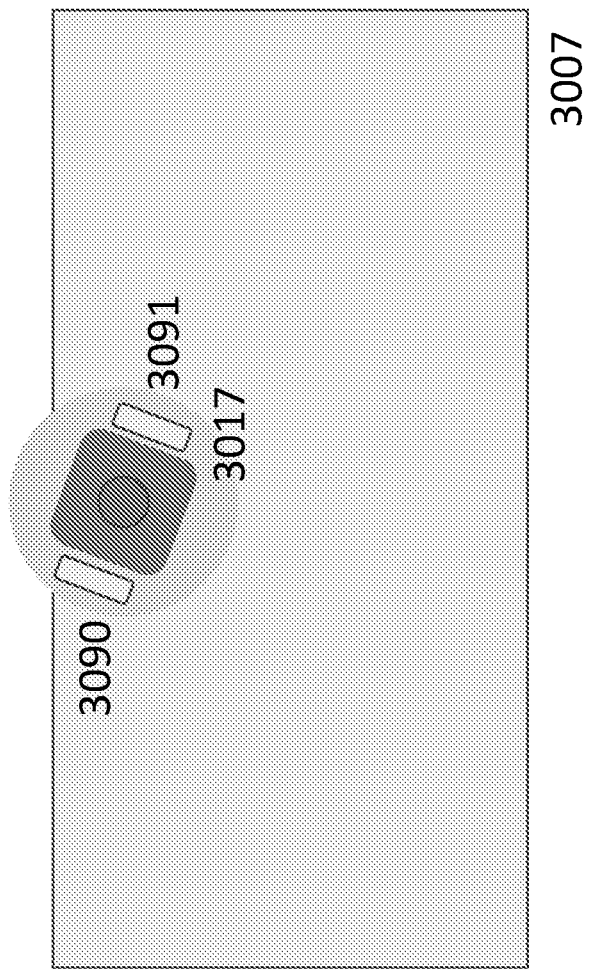

FIG. 30H provides a schematic illustration of an AGS 3017 connected to an SPS moveable platform with two independently driven wheels (3090, 3091) on working surface 3007. In an exemplary embodiment, the AGS 3017 may rotate in place by rotating the two wheels (3090, 3091) of the SPS moveable platform in opposite directions. The AGS 3017 may translate with respect to the working surface 3007 by rotating the two wheels (3090, 3091) of the SPS moveable platform in the same direction. Based on this arrangement, the AGS 3017 may rotate in place or reach different positions on the working surface 3007 by combining the rotating in place and translation motions. In some embodiments, the AGS may have one driven wheel (e.g., gyro-stabilized AGS), two driven wheels (as shown in FIG. 30H AGS 3017), three driven wheels, or more than three driven wheels. In some embodiments, the AGS may include a holonomic drive system. In some embodiments, the AGS may have cylindrical or spherical wheels. In some embodiments, the actuators used to move the working member within the adjustment region may be used to move the AGS on the working surface.

Figure 30I:
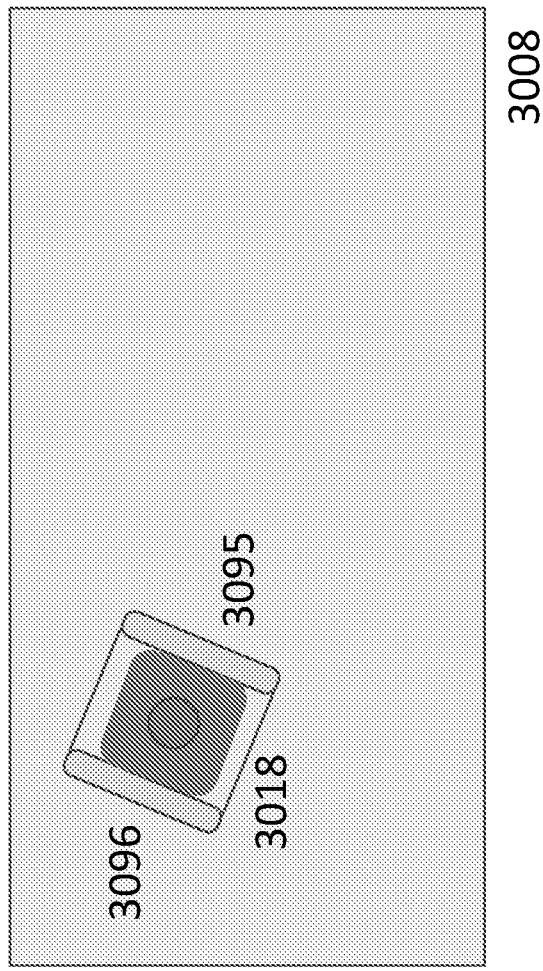

FIG. 30I provides a schematic illustration of an AGS 3018 connected to an SPS moveable platform with two independently driven treads (3095, 3096) on working surface 3008. In an exemplary embodiment, the AGS 3018 may rotate in place by rotating the two treads (3095, 3096) of the SPS moveable platform in opposite directions. The AGS 3018 may translate with respect to the working surface 3008 by rotating the two treads (3095, 3096) of the SPS moveable platform in the same direction. Based on this arrangement, the AGS 3018 may rotate in place or reach different positions on the working surface 3008 by combining the rotating in place and translation motions.

Figure 30J:
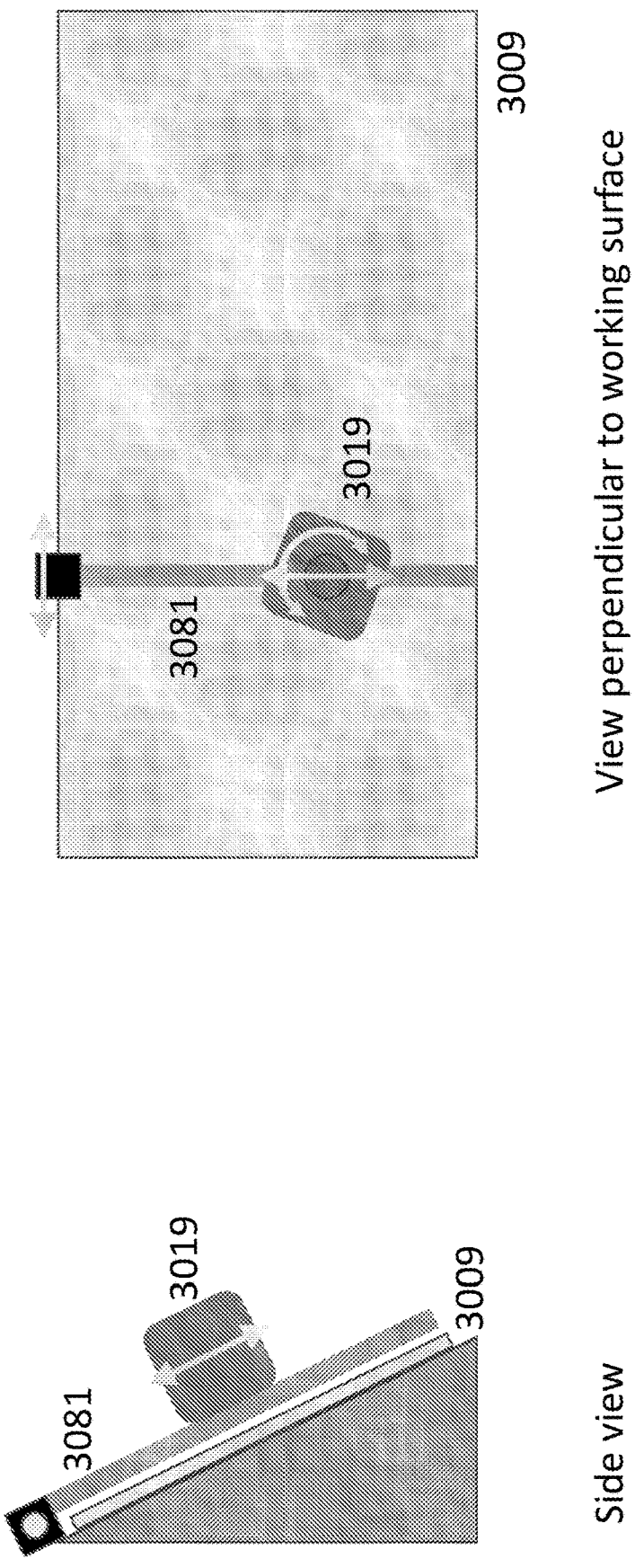

FIG. 30J provides a schematic illustration of a side view and a normal view of an AGS 3019 connected to an SPS with a cantilevered linear rail 3081 that translates horizontally over the working surface 3009. In an exemplary embodiment, an actuator translates the linear rail 3081 horizontally (normal view) along the working surface 3009. A second actuator allows the AGS 3019 to rotate in place. A third actuator allows the AGS 3019 to move along the linear rail. Based on this arrangement, the AGS 3019 may rotate in place or reach different positions on the working surface 3009 by controlling the position of the linear rail relative to the working surface 3009 or controlling its position on the linear rail. In some embodiments, a fourth actuator may be placed on the other end of the linear rail 3081 (fixing the free end of the cantilevered linear rail; matching the arrangement shown in FIG. 30G).

Figure 30K:
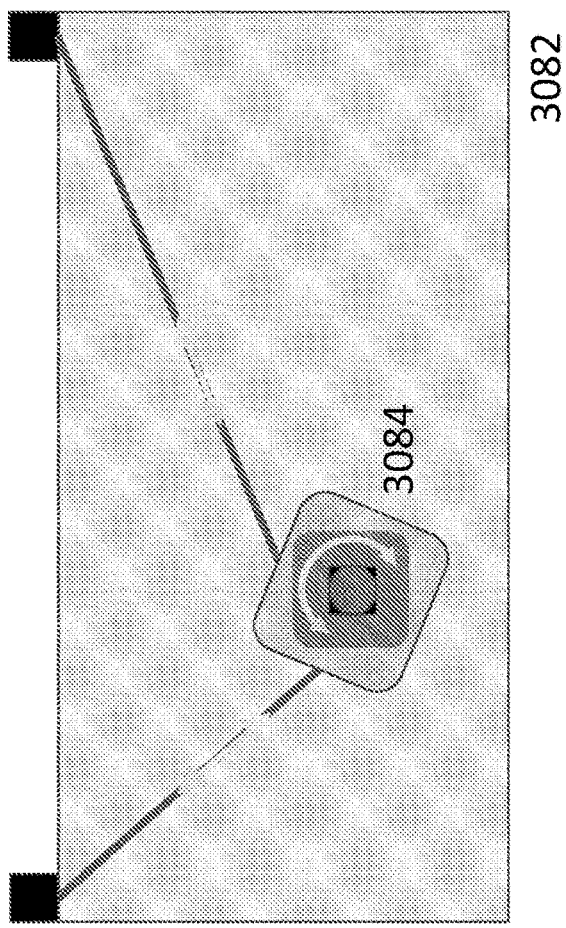
Figure 30K:
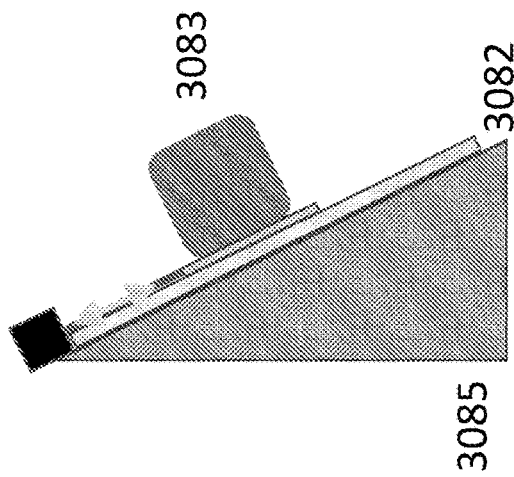
Figure 30L:
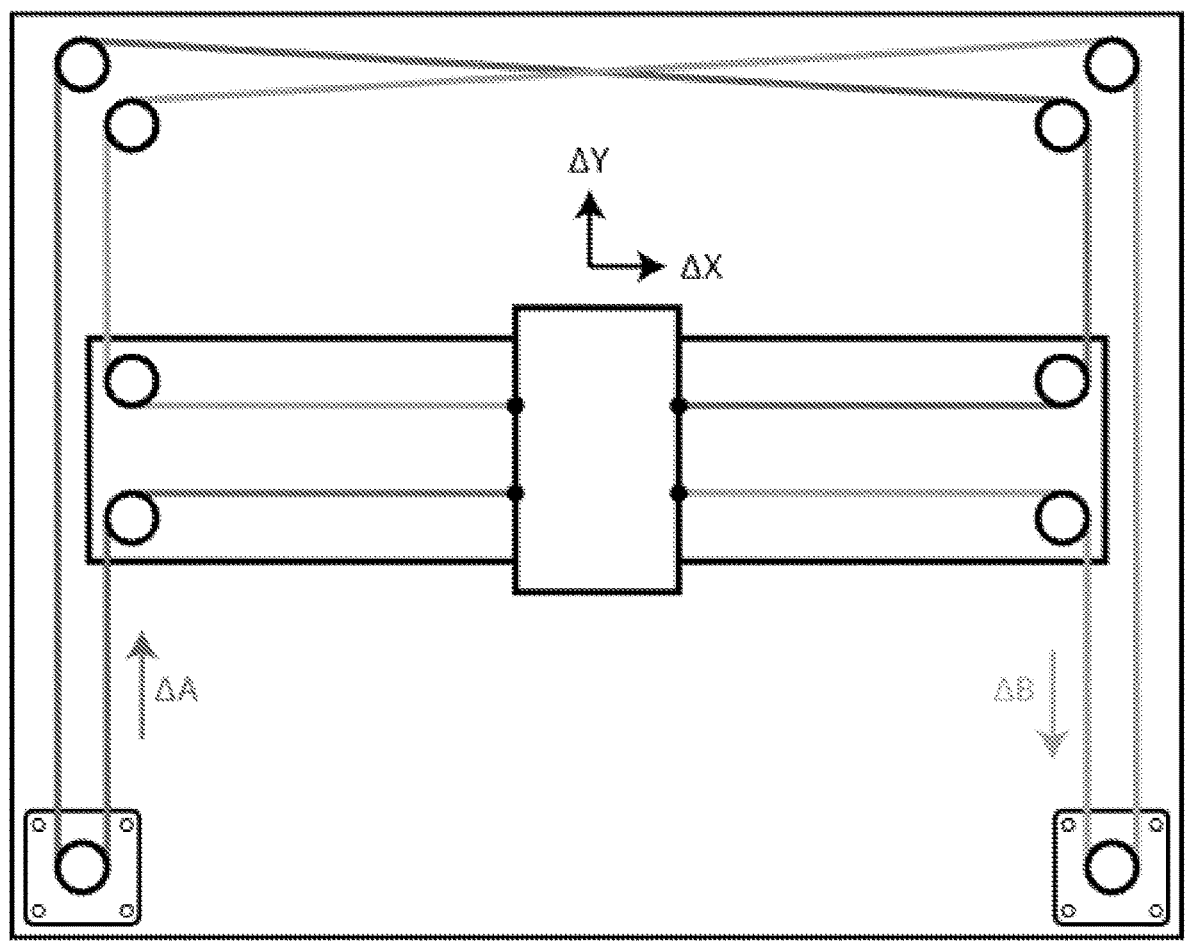
FIG. 30L illustrates an alternate mechanism related to the mechanism illustrated in FIG. 30F.

FIG. 30K provides a schematic illustration of a side view and a normal view of an AGS 3083 connected to an SPS with two actuators that control the length of cables attached to a base 3084, with the AGS 3083 attached to the base 3084. By adjusting the length of each cable, the AGS may be positioned on different locations on the working surface 3082. In some embodiments, the cables may be made of metal, natural fiber, synthetic fiber, or a combination of one or more of these materials. In some embodiments, a third actuator may be positioned at the bottom horizontal edge of the working surface stand 3085 (in the normal view) to add (in addition to gravity) to the downward force acting on the base 3084. In some embodiments, the third actuator may be fixed at a location (e.g., center) along the bottom horizontal edge of the working surface stand 3085. In some embodiments, the third actuator may be horizontally moveable along the bottom horizontal edge of the working surface stand 3085 (in the normal view). In some embodiments, the AGS 3083 may be rotatable with respect to the base 3084. In some embodiments, the AGS may adjust its orientation relative to the SPS base to improve visibility of the working surface or to improve visibility of markers.

In some embodiments, the AGS may be connected directly to the SPS (e.g., stage, arm, cable). In some embodiments, the AGS may be mounted to a rig adapter connected directly to the SPS. In some embodiments, the SPS may provide position data to the AGS, or vice versa. In some embodiments, the position data may be based on computer vision, GPS, signals from reference beacons, laser positioning systems, ultrasound positioning systems, or the like.

In some embodiments, an AGS connected to an SPS may be used to perform repetitive tasks, e.g., drilling 1000 holes on a working surface, cutting out quantity 100 of the same shape from a working surface, etc. In some embodiments, the AGS/SPS system may be used for operations requiring accurate feed rate, for example, plasma cutting. In some embodiments, the AGS connected to an SPS may be used to execute operations at different depths on the same path or different paths. In some embodiments, the operations at different depths may allow the AGS/SPS system to control cutting speed or the amount of material that is removed per pass (based on the bit type and the properties of the material being operated upon). The advantages of controlling "chip load" (e.g., the amount of material that is removed per pass for each cutting flute on the working member) include: controlling the force on the cutter, controlling the reaction force on the AGS, controlling the amount of power required by the spindle, controlling tool or positioning system deflections (which may show up as inaccuracies in the part), controlling vibrations, and not exceeding the rate at which chips and debris can be removed. In some embodiments, the operations at different depths may allow the AGS/SPS system to render a design including topographical design elements. In some embodiments, the AGS may record the parameters of a user operating the AGS to cut a path (e.g., cut rate as a function of position on the path, cut depth for each of multiple passes, the path itself if the user is cutting free-hand or following a marked line on the working surface) and reproduce the cut for the path using the recorded parameters (at a later time, on a different working surface) when connected to an SPS (without user guidance of the AGS along the cut path). In some embodiments, the AGS may use the recorded information to implement learned behavior (e.g., cutting speed for a given working member design (e.g., working member diameter), depth of cut for a given working member design (e.g., working member diameter), spindle speed, slowing down around corners, speeding up on straightaways) on the same or different paths. In some embodiments, the AGS may analyze the recorded information using machine learning or AI methods to develop a system of rules or logic to perform arbitrary operations. In some embodiments, two or more AGS/SPS systems may work in tandem on the same working surface (e.g., on the same design, on the same path) to improve processing speed.

In some embodiments, the AGS and SPS may be a single unit instead of a mountable/removable AGS and a separate SPS, or vice versa. In embodiments with the AGS and SPS configured as a single unit, any of the functionality described herein may be performed by the AGS/SPS single unit even if the functionality is described as being performed by the AGS or SPS. In some embodiments, the SPS may perform any of the functionality described here even if the functionality is described as being performed by the AGS. In some embodiments, the AGS may perform any of the functionality described here even if the functionality is described as being performed by the SPS. In some embodiments, the SPS may have one or more controls (e.g., spindle on/off, spindle speed control) that mirror or augment the controls available on the AGS, or vice versa. In some embodiments, the SPS may have one or more displays (e.g., for UI, work progress tracking (e.g., showing current location on path, adjustment region, current working member position, portion of the working surface)) that mirror or augment the displays available on the AGS, or vice versa. In some embodiments, a remote device (e.g., connected to the AGS over a wired network, connected to the AGS over a wireless (e.g., WiFi, Bluetooth) network) may have one or more controls (e.g., spindle on/off, spindle speed control) that mirror or augment the controls available on the AGS, or vice versa. In some embodiments, a remote device (e.g., connected to the AGS over a wired network, connected to the AGS over a wireless (e.g., WiFi, Bluetooth) network) may have one or more displays (e.g., for UI, work progress tracking (e.g., showing current location on path, adjustment region, current working member position, portion of the working surface)) that mirror or augment the displays available on the AGS, or vice versa. In some embodiments, the AGS, the SPS, or both may be connected to a remote device (using a wire or wirelessly) that performs any of the functionality described herein even if the functionality is described as being performed by the AGS or the SPS. In some embodiments, the AGS or the SPS may be operated under the command of the remote device. In some embodiments, the AGS or SPS may have functionality to follow the instructions from the remote device, wherein the remote device performs functions such as determining the position of the AGS (e.g., position of frame) relative to the workpiece, providing instructions to the SPS to position the AGS on the workpiece, or providing instructions to the AGS to position the working member on the workpiece.

In some embodiments, an AGS may not operate (e.g., not cut) or operate less (e.g., cut partially) on a portion of a path to keep the shape being cut still attached to the working surface. This may be important to keeping the shape from moving relative to the AGS or the working surface if the path defining the shape were to be cut completely. For example, if the AGS is cutting a circle out of a piece of plywood, the AGS may leave one, two, three or more breaks ("tabs") in the circular cut path (e.g., uncut, not cut all the way through the plywood) to keep the circular shape still attached to the plywood at least a portion of the thickness of the plywood. The user can physically break the circular shape out of the plywood by breaking the tabs. Alternatively, the user can secure the circular shape using her hands or a fixture and use the AGS to go back and cut through the tabs. The use of one or more breaks in the path to secure the piece being formed may be helpful in keeping material in place especially when the AGS is coupled with an SPS and left unattended to work on the piece.

In the exemplary embodiments of AGS and SPS systems shown in FIGS. 30A-30I, one or more degrees of freedom may be added or removed to add additional functionality or remove functionality from the combined positioning systems. For example, the in-place rotational capability of the AGS 3016 in FIG. 30G may be removed to fix the orientation of the AGS 3016 relative to the working surface 3006. In some embodiments, the AGS may be mounted on a rig adapter attached to the SPS. In some embodiments, the AGS may be mounted to a rig adapter on the SPS using a mechanical coupling that permits easy mounting and removal of the AGS. The ability to quickly attach and remove an AGS from the SPS may permit workflows where a combination of manual movement of the AGS and automated movement of the AGS (using the SPS) is required. In the exemplary embodiments of AGS and SPS systems shown in FIGS. 30A-30I, the working surface base (e.g., table or stand on which the working surface rests) may not be shown. In the exemplary embodiments of AGS and SPS systems shown in FIGS. 30A-30I, the SPS actuators or motor spindles permitting the translational motion of the AGS may be mounted to the working surface or a working surface base (e.g., table or stand on which the working surface rests).

Figure 31A:
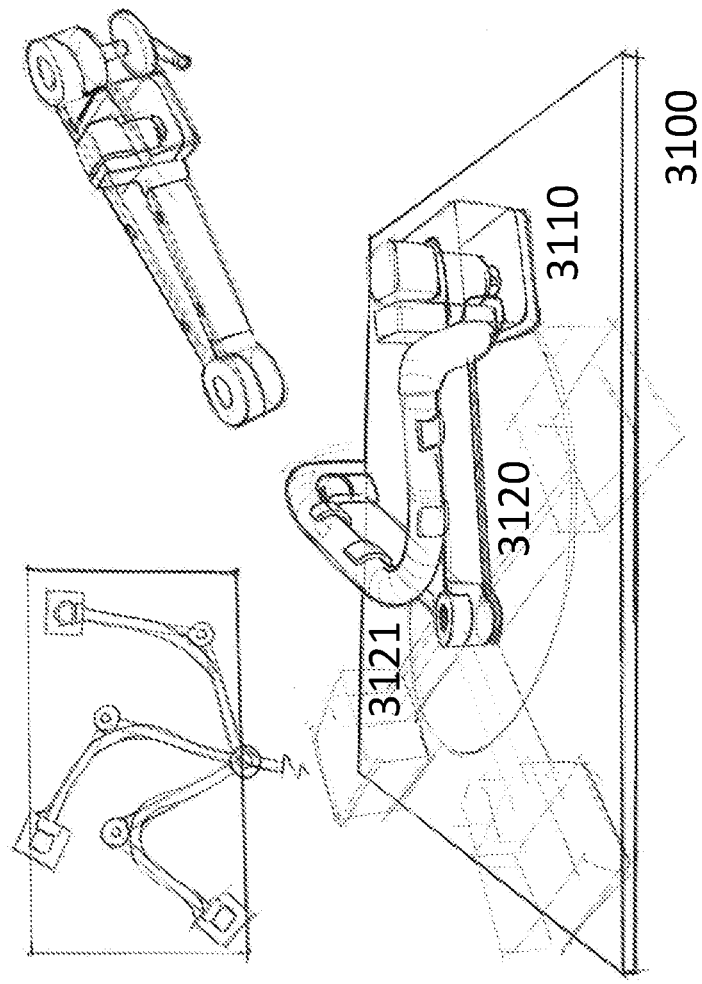
FIGS. 31A-31B are renderings of embodiments of schematic diagrams shown in FIG. 30A and FIG. 30I, respectively.

FIG. 31A shows 3 renderings of exemplary embodiments of the AGS and SPS combination shown in FIG. 30A. The bottom rendering shows AGS 3110 connected to articulated arm SPS with arms 3120 and 3121 on working surface 3100. One end of arm 3121 is attached to the edge of working surface 3100 (e.g., clamped to the edge). Each joint of the articulated arm SPS rotates to allow the AGS 3110 to move to any position on the working surface 3100. A vacuum connection for AGS 3110 is also shown mounted to the two arms (3120, 3121) of the articulated arm SPS. The top left rendering shows multiple arrangements of an AGS and articulated arm SPS. The top right rendering shows an AGS and articulated arm SPS folded for ease of transport.

Figure 31B:
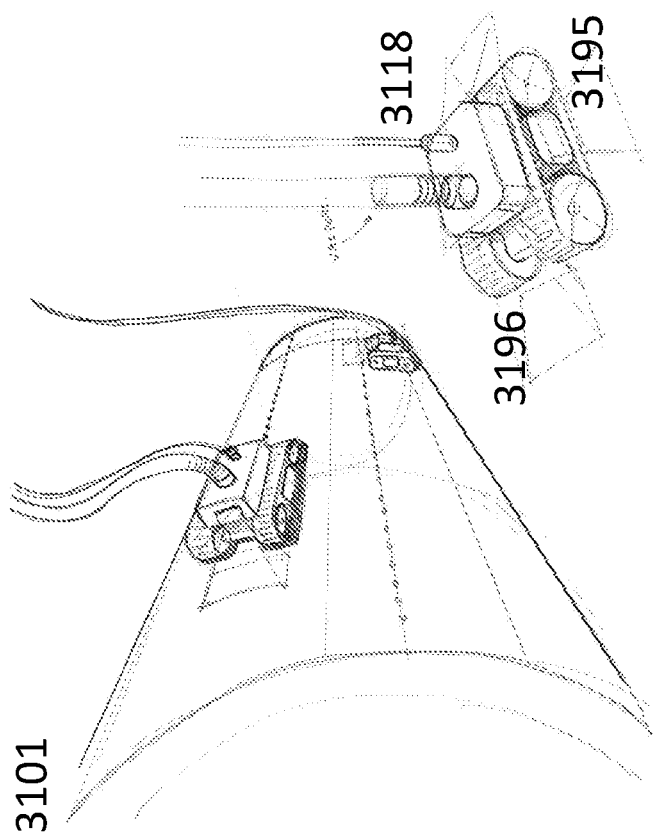

FIG. 31B shows two renderings of embodiments of the AGS and SPS combination shown in FIG. 30I. The right rendering shows an AGS 3118 connected to a SPS mobile platform with two treads (3195, 3196). The left rendering shows two AGS/SPS units working on a curved working surface 3101. In some embodiments, an AGS/SPS unit may be configured to work on curved or non-horizontal working surfaces using magnetic treads. In some embodiments, an AGS/SPS unit may be configured to work on curved or non-horizontal working surfaces by modulating the friction or adhesion forces between the unit and the working surface (e.g., using vacuum suction).

In some embodiments, an AGS and SPS combination may be used to generate a 3D topographical map of an area by using the SPS to position the AGS over multiple points of the area and using the AGS to probe (using the working member) the surface for height variations. The height data collected over the points in the mapped area may be used to create a topographical map of the surface. In some embodiments, an AGS and SPS combination may be used to create a workpiece with 3D features by using the AGS and SPS combination to position the working member in the XY plane (approximately parallel to a plane related to the working surface) and use Z height adjustment (e.g., in the AGS (e.g., z-stage in FIG. 28J) or in the SPS) to change the depth of the working member during operation (e.g., cutting).

Figure 34:
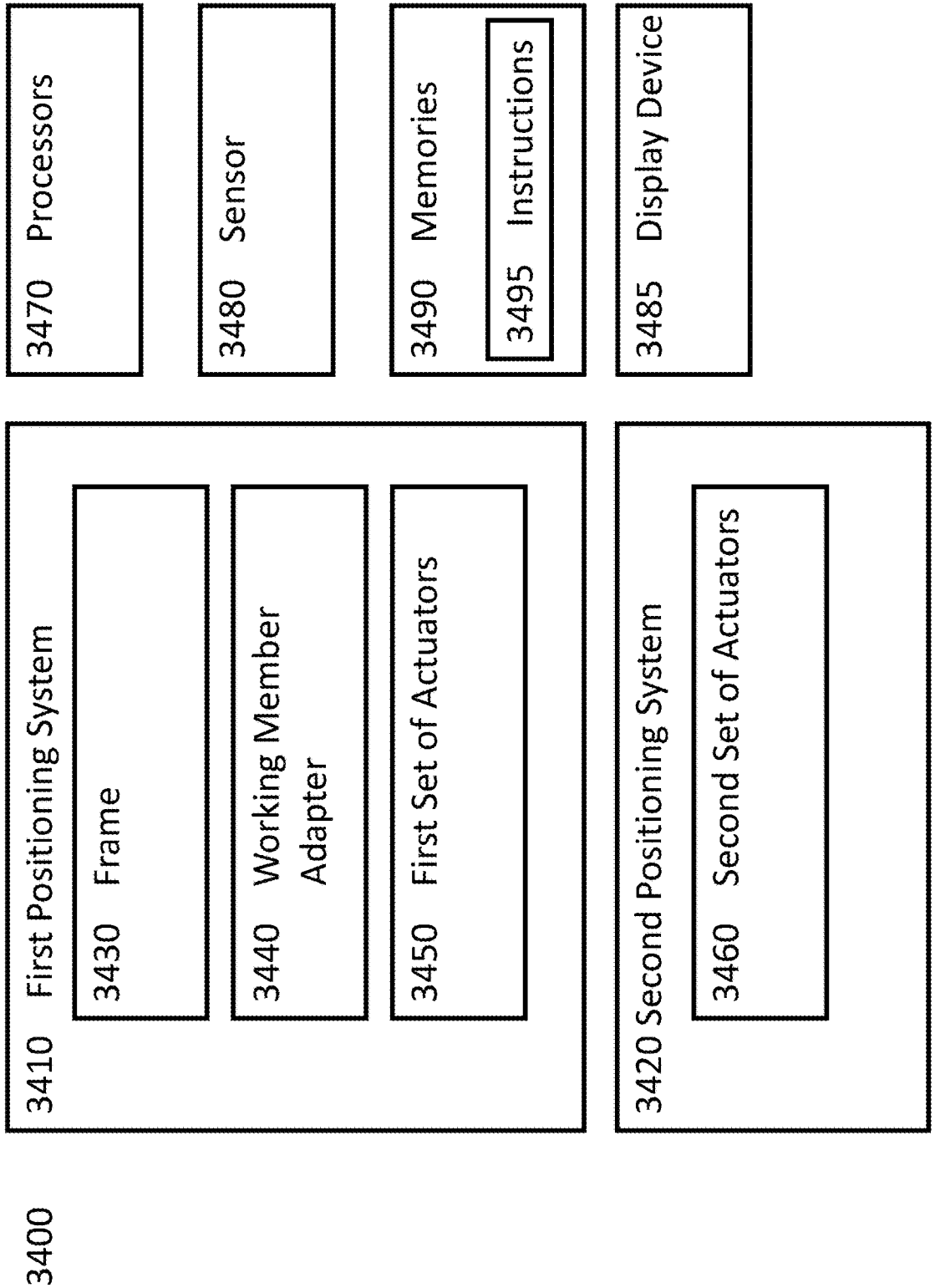
FIG. 34 depicts a system for advancing a working member along a desired path, in accordance with an embodiment.

In an embodiment, as shown in FIG. 34, a system 3400 comprises (1) a first positioning system 3410 comprising a frame 3430, a working member adapter 3440 (e.g., clamp, chuck) for holding a working member (which may be provided separately, e.g., purchased by a user of the system), and a first set of actuators 3450, (2) one or more processors 3470, (3) a sensor 3480 coupled to at least one of the one or more processors 3470, and (4) one or more memories 3490 coupled to at least one of the one or more processors 3470 with instructions 3495 that are executed by the one or more processors 3470. In some embodiments, system 3400 may include a second positioning system 3420 comprising a second set of actuators 3460 operable to move the frame 3430 relative to a workpiece. For example, user may add automated frame placement capability to a system 3400 by purchasing the second positioning system 3420 separately (e.g., at a later date). In some embodiments, system 3400 may include a display device 3485. In some embodiments, the first positioning system 3410 may include one or more processors (e.g., microcontrollers) that receive information from the one or more processors 3470 or provide commands to the first set of actuators 3450. In some embodiments, the second positioning system 3420 may include one or more processors (e.g., microcontrollers) that receive information from the one or more processors 3470 or provide commands to the second set of actuators. In some embodiments, the second positioning system 3420 may include mechanical components (e.g., linear stages, rotational stages) in design and structural geometries corresponding to some schematically represented components of SPS described any of FIGS. 30A-K, 31A-B, and 33A-B.

In some embodiments, the first set of actuators 3450 is operable to move the working member within at least a two-dimensional adjustment region relative to the frame 3430. In some embodiments, the adjustment region is defined by the largest region within which the first set of actuators 3450 is operable to mechanically position the working member relative to the frame 3430 given the mechanical and geometric relationships and constraints between the frame 3430 and the first set of actuators 3450. In some embodiments, the adjustment region may be defined by a region which is smaller than the largest region based on system design requirements—see, for example, in some embodiments, avoidance of extreme nonlinearity in the motion of cutting bit 512 (mounted on stage 150) relative to base 130 using motors 210, 220 in FIGS. 13-21. In some embodiments, the adjustment region is fixed in position and orientation relative to the frame 3430—see, for example, FIGS. 28-29. In some embodiments, the first set of actuators 3450, the working member adapter 3440, the working member and the adjustment region move with the frame 3430 as the frame is moved relative to the workpiece by the second set of actuators 3460.

In some embodiments, the first set of actuators may be operable to position the working member long axis, for working members with long axis symmetry (e.g., cutting bit, pencil, plotter pen), within a two-dimensional region relative to the frame (with the working member long axis perpendicular to the two-dimensional region). In some embodiments, this may be implemented using an X-Y stage to position the working member long axis within a two-dimensional region. In some embodiments, the first set of actuators may additionally be operable to position the working member tip at different heights above or below the two-dimensional region. In some embodiments, this may be implemented using an additional Z-axis stage to position the working member tip. For example, in addition to being operable to position the working member (e.g., cutting bit, with cutting bit long axis aligned perpendicularly to region 2820) at any point shown in adjustment region 2820, the first set of actuators may also be operable to position the working member tip above (with working member not contacting the workpiece), contacting (working member contacting the workpiece), or below (with working member penetrating (e.g., cutting) the workpiece) a plane including the adjustment region 2820.

In some embodiments, the first set of actuators 3450 is operable to position the working member within a first two-dimensional area relative to a surface of the workpiece with the frame 3430 fixed at a first frame location relative to the workpiece. The second set of actuators 3460 is operable to move the working member within the first two-dimensional area relative to the workpiece by moving the frame 3430 while keeping the working member fixed relative to the frame 3430—see FIGS. 28-29, below. In some embodiments, the requirement for both the first set of actuators and the second set of actuators to be operable to position the working member within the first two-dimensional area as described above applies only to the in-plane positioning of the working member relative to the first two-dimensional area. In some embodiments, the first set of actuators may additionally be operable to position the working member tip above or below the first two-dimensional area, and the second set of actuators may not be operable to move the working member in an out-of-plane dimension relative to the first two-dimensional area. In some embodiments, the second set of actuators may additionally be operable to position the working member tip above or below the first two-dimensional area, and the first set of actuators may not be operable to move the working member in an out-of-plane dimension relative to the two-dimensional area. In some embodiments, both the first set of actuators and the second set of actuators may not be operable to move the working member in an out-of-plane dimension relative to the two-dimensional area.

Figure 28:
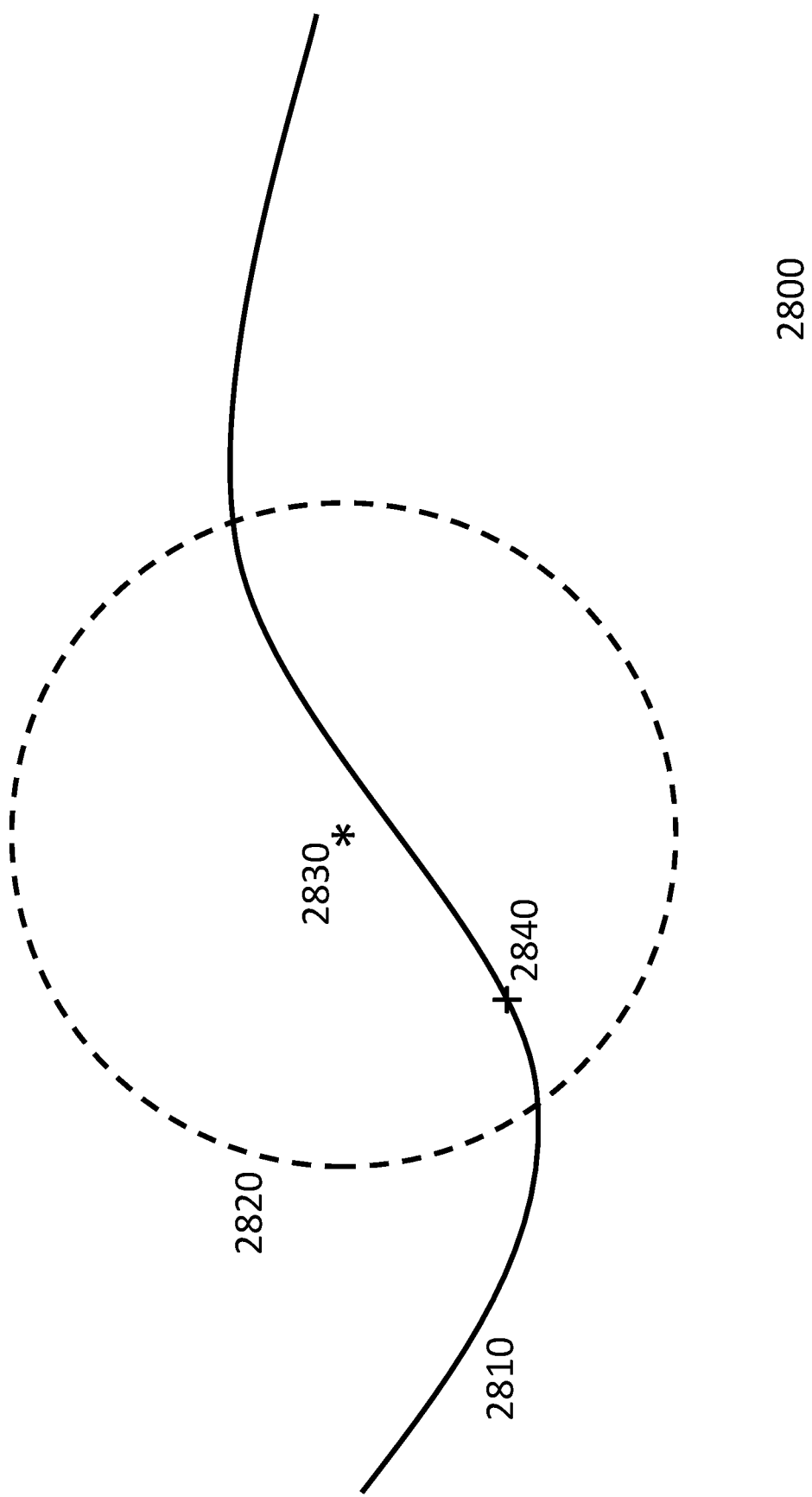
FIG. 28 is a diagram illustrating the relative positions of a working member, an adjustment region and a path on a surface for a given position of a frame.
Figure 29:
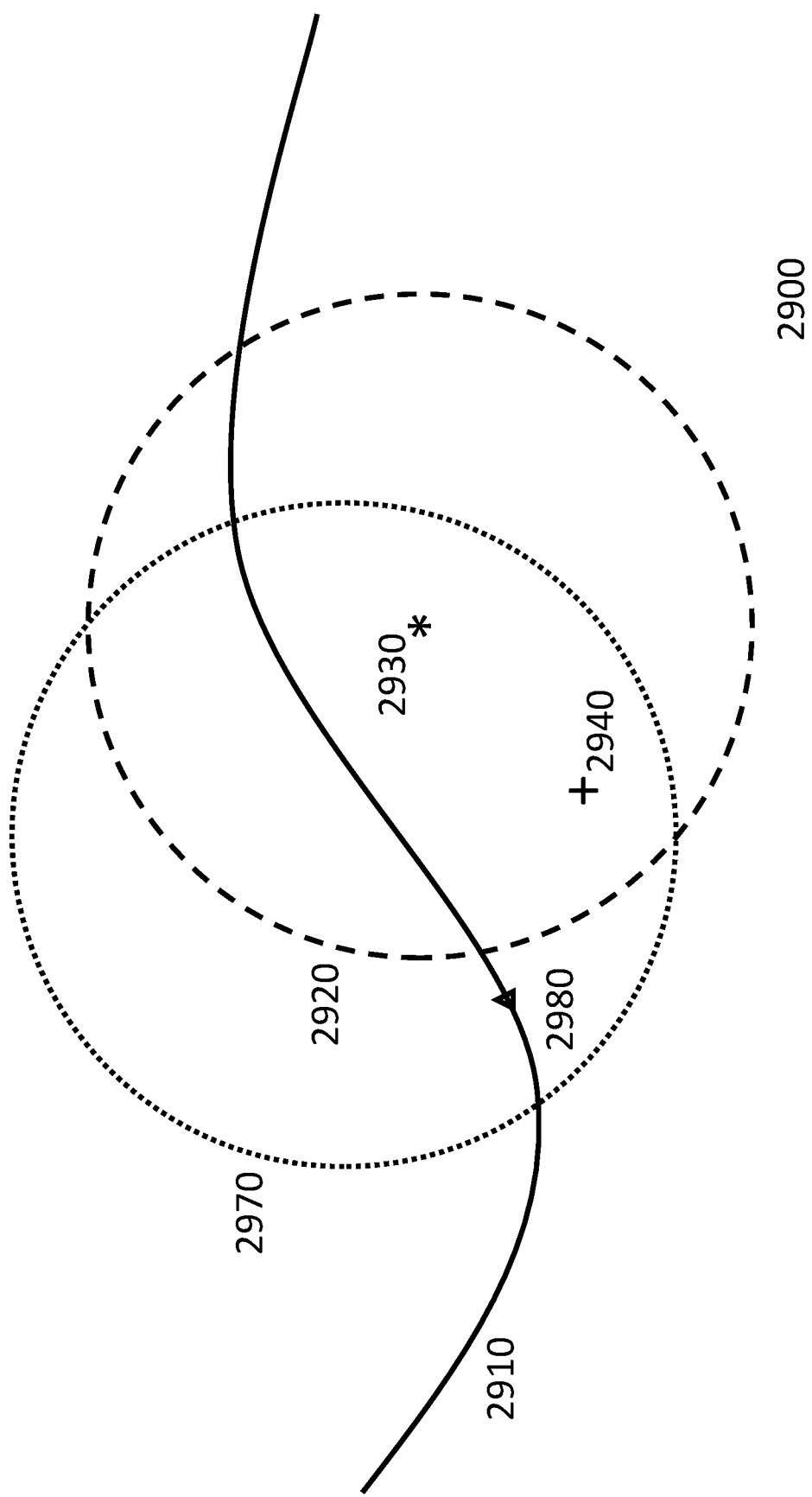
FIG. 29 is a diagram illustrating the relative positions of a working member, an adjustment region and a path on a surface for two different positions of a frame.

FIG. 28 illustrates a schematic representation of a surface 2800 of a workpiece with the working member 2840 (indicated by a plus, +) aligned above a desired path 2810 using an embodiment of system 3400. In the following description, the desired path 2810 is fixed relative to the surface 2800 of the workpiece. In FIGS. 28-29, the working member 2840 is not performing a task on the workpiece (e.g., a cutting bit is retracted above the workpiece, not in contact with the surface 2800). FIG. 28 shows the adjustment region 2820 (dashed circle, with center point 2830 (indicated by an asterisk, *)) within which the working member 2840 may be positioned by the first set of actuators 3450 (not shown) with the frame 3430 (not shown) fixed at a first frame location relative to the surface 2800. With the frame 3430 fixed at the first frame location, the adjustment region 2820 defines the region of surface 2800 within which the working member may be positioned. In the description below, the region of surface 2800 within which the working member may be positioned with the frame located at the first frame location will be referenced as "first surface region" (dotted circle 2970 in FIG. 29).

FIG. 29 illustrates the scene described in FIG. 28 with the frame 3430 moved to a second frame location by the second set of actuators 3460 while the working member 2940 (indicated by a plus, +) is fixed relative to frame 3430—i.e., the first set of actuators 3450 do not move the working member 2940 relative to the frame 3430 as the frame 3430 is moved from the first frame location (as shown in FIG. 28) to the second frame location (as shown in FIG. 29) by the second set of actuators 3460. FIG. 29 shows the new positions of the adjustment region 2920 (dashed circle), the center of the adjustment region 2930 (indicated by an asterisk, *), and the working member 2940 relative to the surface 2900 after the frame 3430 is moved from the first frame location to the second frame location—compare respective positions of adjustment region 2820, the center of the adjustment region 2830, and the working member 2840 relative to surface 2800 with frame 3430 located at the first frame location in FIG. 28. The first surface region 2970 (dotted circle) remains fixed with respect to the surface 2900.

For illustration purposes only, the position of the working member relative to the surface 2900 with the frame located at the first frame location is shown as triangle 2980 in FIG. 29 (indicated by plus 2840 in FIG. 28). As seen by comparing working member position relative to surface 2900 with frame 3430 located at first frame location (triangle 2980) to working member position relative to surface 2900 with frame 3430 located at second frame location (plus 2940), the second set of actuators is operable to move the working member 2940 to any point within the first surface region 2970 (dotted circle) by moving the frame 3430 while keeping the working member fixed relative to the frame 3430 (i.e., not moving the working member relative to the frame 3430 using the first set of actuators 3450).

In some embodiments, a first plane including the adjustment region for the working member (e.g., 2820 in FIG. 28) may be parallel to a second plane describing the region over which the frame may be moved by the second positioning system (e.g., plane of surface 2800 in FIG. 28). In some embodiments, the first set of actuators may be operable to move the working member in a third plane, the second set of actuators may be operable to move the frame in a fourth plane, the third plane has a first normal vector, the fourth plane has a second normal vector, and the first normal vector is substantially parallel to the second normal vector. The first normal vector is substantially parallel to the second normal vector if the angle between the first normal vector and the second normal vector is less than or equal to 5 degrees. In some embodiments, the first set of actuators may be operable to move the working member in two or more degrees of freedom (e.g., in a plane, in 3-d) and the second set of actuators may be operable to move the frame in at least two of the two or more degrees of freedom.

FIGS. 13-21 describe an embodiment having some components of system 3400 including processors 3470, memories 3490 with instructions 3495 (in smart device 570), a sensor 3480 (inside camera 300), and first positioning system 3410 comprising frame 3430 (e.g., base 130), working member adapter 3440 for holding a working member (bit 512), and a first set of actuators 3450 (motors 210, 220). The embodiment described in FIGS. 13-21 does not include a second positioning system operable to move the frame—in the embodiment described in FIGS. 13-21, a user manually moves the frame using the handles 106.

FIG. 31A describes an embodiment of system 3400 in which a first positioning system, processors, memories with instructions, and sensor are housed in single unit 3110 including a frame (e.g., AGS, similar to the embodiment described in FIGS. 13-21) which is attached to a second positioning system (including arms 3120 and 3121) operable to move the frame.

FIG. 33A describes another embodiment of system 3400 in which a first positioning system, processors, memories with instructions, and sensor are housed in single unit 3316 including a frame (e.g., similar to the embodiment described in FIGS. 13-21) which is attached to a second positioning system (including linear stages 3370 and 3380) operable to move the frame.

In some embodiments, an AGS comprises the first positioning system 3410, the one or more processors 3470, the sensor 3480, the one or more memories 3490, and instructions 3495. In performing a task (e.g., cutting along a desired path on the workpiece using a cutting bit), the AGS may provide instructions to the first set of actuators to move the cutting bit with respect to a first portion of the desired path that lies inside the adjustment region based on the current position of the frame. If a user of the AGS needs to cut a second portion of the desired path that lies outside the adjustment region based on the current position of the frame, the user needs to move the frame until the second portion of the desired path moves into the adjustment region based on the frame's new location. As the frame is moved by the user, the adjustment region translates relative to the surface of the workpiece—see, for example, FIGS. 28-29 for a related description in which the frame is moved by a second positioning system instead of a user. As the second portion of the desired path moves inside the adjustment region based on the frame's new location, the AGS may provide instructions to the first set of actuators to move the cutting bit with respect to the second portion of the desired path. This may happen continuously if the user moves the frame along the desired path at sufficient speed such that the AGS always has an available target point to move the working member to within its adjustment region. The user continues to manually move the frame as described above until all the desired portions of the desired path that need to be cut are cut.

In some embodiments, an SPS comprises the second positioning system. The AGS and the SPS may be each sold separately, sold together as two separate units, or sold together as a single unit. If a user first purchases the AGS without the SPS, purchasing the SPS and combining the SPS with the AGS would permit the user to complete tasks on the working surface without having to manually guide the frame as described above. In some embodiments, the SPS would move the frame based on commands from the AGS.

In some embodiments, the frame 3430 may include a first component for attaching to a second component in the second positioning system 3420. In some embodiments, the design of the first component and the second component may permit quick connect/disconnect such that the frame 3430 is removably attached to the second positioning system 3420. In some embodiments, this would permit a user to use an AGS in "manual" mode by quickly disconnecting it from an SPS for a task and then reattaching the AGS to the SPS for SPS-driven movement of the frame. In some embodiments, the frame may include other components that move with the frame as it is moved by the second set of actuators. In some embodiments, the frame may include a display device. In some embodiments, the frame may include a light to illuminate a portion of the workpiece.

In some embodiments, the SPS would permit "back driving," such that instead of operating to position the frame, the second positioning system would permit manual movement of the frame (e.g., by a user) relative to the workpiece while the frame is connected to the second positioning system. Operating the SPS in back driving mode would allow a user to, for example, manually scan the surface for marker data or to manually guide the AGS to perform a task while it is still connected to the second positioning system. In some embodiments, with the AGS and SPS combined, the second positioning system positions the frame at a frame location (using the second set of actuators) based on instructions from the AGS, and the AGS positions the working member at a target location (using the first set of actuators) in the adjustment region to perform a task on the working surface.

Figure 35:
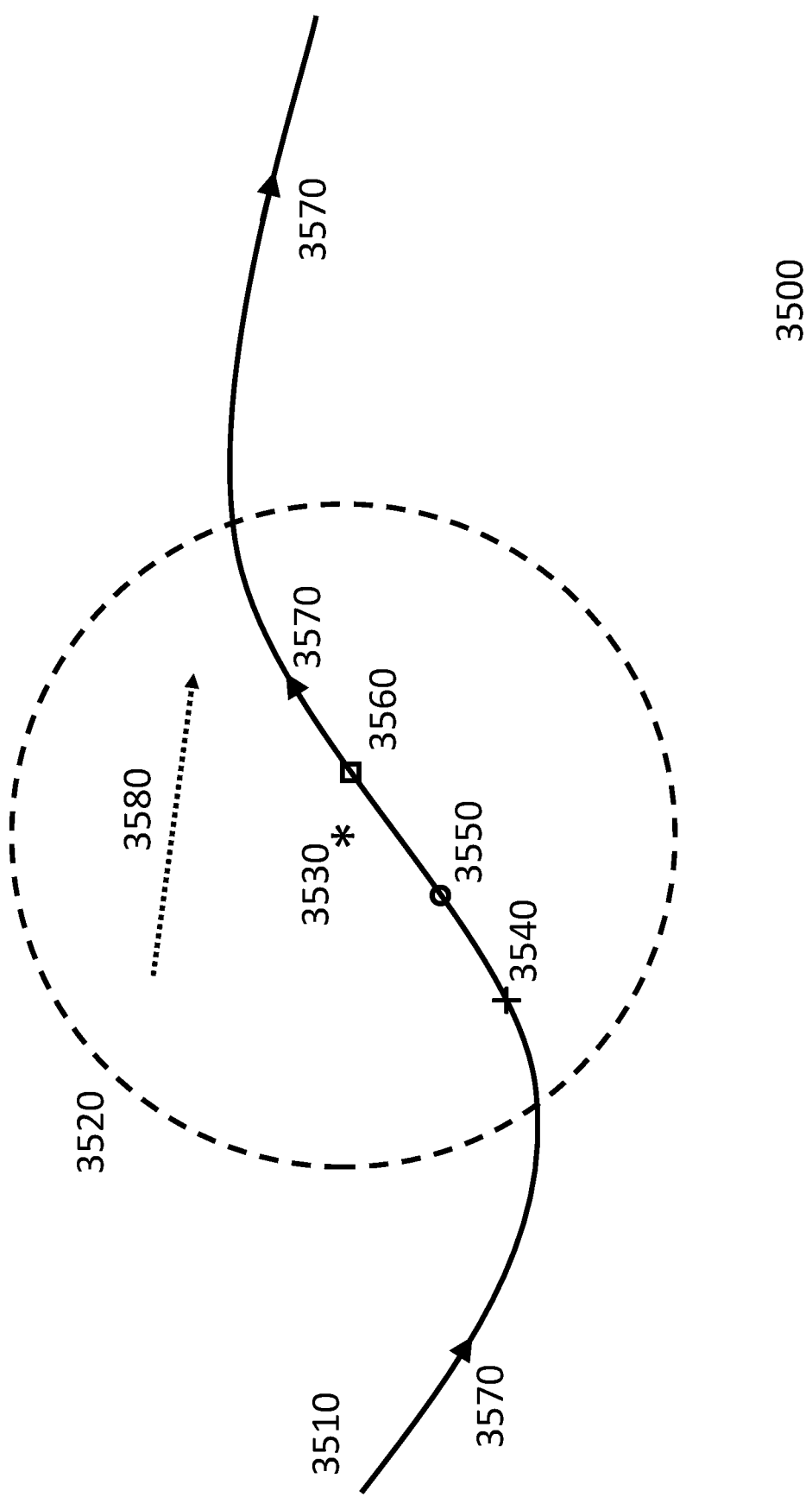
FIG. 35 is a diagram illustrating the relative positions of a working member, an adjustment region and a path on a surface for a given position of a frame.

FIG. 35 illustrates a schematic view of a desired path 3510 during the performance of a task on a workpiece (e.g., requiring the working member to follow a desired path) by an embodiment of system 3400. The desired path 3510 is fixed relative to a surface 3500 of the workpiece. In some embodiments, the desired path 3510 is calculated from a design (e.g., CAD drawing, SVG file) and data related to the desired path is registered to position data for the surface 3500. In some embodiments, the data related to the desired path may be transformed to a coordinate system for surface 3500. In some embodiments, the desired path 3510 is drawn on the surface 3500, and the desired path 3510 is detected by system 3400 (e.g., using the sensor 3480 or a different sensor). In some embodiments, the desired path 3510 may account for the physical geometry of the working member. For example, in making a cut, system 3400 may offset the desired path 3510 a distance equal to the radius of the working member relative to a design if the system 3400 positions the center of the working bit on the desired path. In some embodiments, instructions 3495, when executed by one or more processors 3470, cause system 3400 receive first information from a sensor 3480. In some embodiments, the first information is associated with a position of the frame relative to the surface 3500. In some embodiments, the first information is associated with a position of the frame relative to an object other than the workpiece, and the system 3400 has data that relates the position of the object to the position of the workpiece. Using a coordinate transformation, system 3400 may be able to calculate the position of the frame relative to the workpiece. In some embodiments, the desired path 3510 includes information with respect to advancement of the working member with respect to the desired path 3510—desired path 3510 is marked with arrows 3570 indicating the trajectory of the working member (left to right in FIG. 35). In some embodiments, system 3400 tracks the portion of the desired path that has been already been processed to track advancement of the working member with respect to the desired path 3510.

In some embodiments, the first information includes image data from an image sensor (sensor 3480) mounted on a frame 3430 of system 3400. In some embodiments, the image data is analyzed to determine the position of the image sensor relative to surface 3500—for example, by comparing marker information from the image data to marker position information collected previously by system 3400. In some embodiments, the first information is based on data collected by a sensor 3480 that is an RF receiver (e.g., Bluetooth receiver, GPS receiver) or a photo detector. In some embodiments, the first information includes data that permits system 3400 to triangulate the position of the frame relative to surface 3500. For example, a Bluetooth receiver (sensor 3480) mounted on the frame may receive data from beacons positioned around the workpiece. The system 3400 processes the data from the Bluetooth receiver (sensor 3480) to triangulate the position of the Bluetooth receiver (sensor 3480) relative to the workpiece based on the known positions of the beacons relative to the workpiece. In some embodiments, the sensor 3480 may be not be attached to the frame.

In some embodiments, the system 3400 may use the state of the actuators together with a known mechanical configuration of the first positioning system to determine the position of the working member relative to the frame. In some embodiments, the system may use a determined position of the frame relative to the workpiece together with a determined position of the working member relative to the frame to determine the position of the working member relative to the workpiece.

In FIG. 35, the position of the adjustment region 3520 is shown based on the position of the frame (e.g., using an offset between the point referenced for the position of the frame and a reference point associated with the adjustment region 3520). The position of the center of the adjustment region 3530 is indicated by an asterisk (*). The position of the working member 3540 is indicated by a plus (+). In some embodiments, the first information provides an indication of the position of the frame and the position of the working member at the time when the sensor 3480 captures the first information. In FIG. 35, the position of the working member 3540, the position of the adjustment region 3520, and the position of the center of the adjustment region 3530 relative to the surface 3500 (and also relative to the desired path 3510) may correspond to the respective positions at the time that first information was captured. In some embodiments, system 3400 uses these positions as the reference values for the control process described below.

In some embodiments, at the start of a task, system 3400 moves the working member to a point on the desired path. During subsequent control process, system 3400 moves the working member to a next target point on the desired path—by controlling the advancement of the working member with respect to the desired path, system 3400 controls the working member to track the desired path subject to the tolerances of the control cycle. In some embodiments, the working member may follow the desired path to within 0.25", to within 0.1", to within 0.05", or to within 0.01". In some embodiments, the tracking process continually repeats during the performance of a task (e.g., cutting along a desired path) as system 3400: receives updated information for the frame position, determines a next target point on the desired path, controls the first set of actuators to move the working member to the next target point, and provides information to move the frame in a first direction relative to the workpiece to keep the desired path in the adjustment region. In some embodiments, the received information may be related to the working member position. In some embodiments, system 3400 may not wait for the working member to finish moving to the given target point before controlling the first set of actuators to move the working member to the next target point in the next iteration of the control cycle. In some embodiments, the control cycle is repeated based on when new first information is received. In some embodiments, system 3400 controls the movement of the working member (via the first positioning system) and provides information to cause movement of the frame (via the second positioning system) such that as the working member advances with respect to a first portion of a desired path, new portions of the desired path (e.g., portions of the desired path that the working member has not yet been controlled to target) move into the adjustment region associated with the first positioning system.

In some embodiments, given that system 3400 is positioning a 3-dimensional object (e.g., working member, frame) in a 2-dimensional region (e.g., adjustment region, workpiece surface), the system 3400 may track the object by a reference point (e.g., tip of the working member, centerline of the cutting bit, sensor location on frame) with respect to a projection of the reference point on to the region. In some embodiments, "moving the object to a point in the region" may correspond to moving a reference point of the object to a point in the region.

In some embodiments, based on this control flow, system 3400 determines a first target point 3550 (indicated by a solid circle, ○) on desired path 3510. In some embodiments, the first target point 3550 is ahead of the working member position 3540. In some embodiments, the first target point is based at least in part upon the position of the adjustment region 3520 or the position of the center of the adjustment region 3530. In some embodiments, the first target point is based at least in part upon portion of the desired path that has been already been processed. In some embodiments, the first target point 3550 is based at least in part upon working member position 3540. In some embodiments, system 3400 controls at least one actuator in the first set of actuators 3450 to move the working member to the first target point 3550. In some embodiments, system 3400 provides second information to a second positioning system that is operable to cause at least one actuator in the second set of actuators 3460 to move the frame 3430 in a first direction 3580 (indicated by the dotted arrow) relative to the surface 3500. In some embodiments, the second information is based at least in part upon the first information. In some embodiments, second information is based at least in part upon the first target point 3550. In some embodiments, second information is based at least in part upon the position of the adjustment region 3520 or the position of the center of the adjustment region 3530. In some embodiments, second information is based at least in part upon the working member position 3540.

In some embodiments, the first direction 3580 is based at least in part upon a second target point 3560 that lies ahead of the first target point 3550. In some embodiments, the first direction 3580 is based at least in part upon a portion of the desired path that includes the second target point 3560. In some embodiments, the first direction may be based at least in part upon averaging the portion of the desired path that includes the second target point 3560. In some embodiments, the first direction may be based at least in part upon averaging a portion of the path that has not already been processed. In some embodiments, the second target point 3560 is a given distance along the desired path from the first target point 3550. In some embodiments, the first direction corresponds to a second direction defined by starting at the first target point 3550 and ending at the second target point 3560. In some embodiments, the first direction is parallel to the second direction. In some embodiments, the first direction deviates from the second direction by less than: 20 degrees, 10 degrees, or 5 degrees. In some embodiments, the first direction corresponds to a third direction defined by starting at the working member position 3540 and ending at the second target point 3560. In some embodiments, the first direction is parallel to the third direction. In some embodiments, the first direction deviates from the third direction by less than: 20 degrees, 10 degrees, or 5 degrees. In some embodiments, the first direction corresponds to a fourth direction defined by starting at a point in the adjustment region 3520 and ending at the second target point 3560. In some embodiments, the first direction is parallel to the fourth direction. In some embodiments, the first direction deviates from the fourth direction by less than: 20 degrees, 10 degrees, or 5 degrees. In some embodiment, the point in the adjustment region 3520 is the centroid of the adjustment region (center of adjustment region 3530).

In some embodiments, second information comprises information that causes the at least one actuator in the second set of actuators 3460 to move the frame 3430 at a first speed along the first direction 3580 relative to the surface 3500. In some embodiments, the first speed corresponds to the speed required to move the frame such that a point in the adjustment region 3520 moves to the second target point 3560 within a fixed time. In some embodiment, the point in the adjustment region 3520 is a centroid of the adjustment region 3520. In some embodiments, the point in the adjustment region 3520 is the position of the center of the adjustment region 3530. In some embodiments, the fixed time is less than: 5 sec, 2 sec, 1 sec, 0.5 sec, 0.2 sec, or 0.1 sec. In some embodiments, the working member moves along the desired path 3510 at a second speed (e.g., cutting speed, drawing speed) relative to the surface 3500, and the first speed is less than the second speed. In some embodiments, the first speed is less than: 95%, 90%, 75%, or 50% of the second speed. In some embodiments, second information comprises information that causes the at least one actuator in the second set of actuators 3460 to displace the frame 3430 along the first direction 3580 relative to the surface 3500.

In some embodiments, second information relates to a target coordinate position in a coordinate frame associated with the second positioning system. The target coordinate position for the second positioning system and a current coordinate position for the second positioning system may be converted from the coordinate frame associated with the second positioning system to a coordinate frame associated with the workpiece. In some embodiments, the first direction is related to the direction from the current coordinate position to the target coordinate position in the coordinate frame associated with the workpiece. In some embodiments, second information relates to speed and direction, distance and direction, or speed, distance and direction.

In some embodiments, instructions 3495 cause the system 3400 to perform (A) receive first information, (B) determine first target point 3550, (C) provide second information, and (D) control at least one actuator in the first set of actuators within: 5 seconds, 2 seconds, 1 second, 0.5 second, 0.2 second, 0.1 second, 0.05 second, 0.02 second, or 0.01 second. In some embodiments, after controlling the first set of actuators to move the working member to the first target point, system 3400 may control the first set of actuators to move the working member to a third target point on the desired path and ahead of the first target point 3550. In some embodiments, system 3400 repeats A-D to advance the working member with respect to the desired path. In some embodiments, system 3400 repeats A-D before the working member has finished moving to the first target point 3550.

In some embodiments, a display device may display information based on the illustrations in FIG. 28, or 29. In some embodiments, a display device may display information based on the illustration in FIG. 35. In some embodiments, one or more items indicated in FIG. 35 may be omitted from the displayed information. In some embodiments, desired path 3510 may be represented in different sections to inform a viewer of the display device which portion of the desired path has already been traversed by the working member. In some embodiments, the portion of desired path 3510 to the left of working member position 3540 may be a first color, and the portion of the desired path 3510 to the right of working member 3540 may be a second color. In some embodiments, the portion of desired path 3510 to the left of working member position 3540 may be a first width, and the portion of the desired path 3510 to the right of working member 3540 may be a second width.

In some embodiments, an AGS may be mounted on a stage near an axis of rotation of a lathe. In some embodiments, the AGS may be mounted on a 1-dimensional stage (SPS) running parallel or perpendicular to an axis of rotation of a lathe. In an exemplary embodiment, the distance between the axis of rotation of the lathe and the tip of the working member (e.g., bowl gouge, hollower, boring bar, etc.) may be adjusted (e.g., by the AGS (e.g., z-stage in FIG. 28J)) as the AGS is moved along the 1-dimensional stage to pattern a workpiece turning on the lathe. In some embodiments, the AGS may include a cutting bit (e.g., router bit) spinning on a spindle to shape and cut the working piece turning on the lathe.

Although various acts are described herein according to the exemplary method of this disclosure, it is to be understood that some of the acts described herein may be omitted, and others may be added without departing from the scope of this disclosure.

It will be recognized by those skilled in the art that changes or modifications may be made to the above described embodiments without departing from the broad concepts of the disclosure. Elements or features of one or more embodiments may be combined with elements or features of other embodiments without departing from the scope of this disclosure. It is understood therefore that the disclosure is not limited to the particular embodiments which are described, but is intended to cover all modifications and changes within the scope and spirit of the disclosure.

The systems described herein may provide multiple ones of any or each of those components and these components may be provided on either a standalone machine or, in some embodiments, on multiple machines in a distributed system. The systems and methods described herein may be implemented as a method, apparatus or article of manufacture using programming or engineering techniques to produce software, firmware, hardware, or any combination thereof. In addition, the systems and methods described herein may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs), hardware (e.g., integrated circuit chip, Field Programmable Gate Array (FPGA), Application Specific Integrated Circuit (ASIC)), electronic devices, a computer readable non-volatile storage unit (e.g., CD-ROM, floppy disk, hard disk drive). The article of manufacture may be accessible from a file server providing access to the computer-readable programs via a network transmission line, wireless transmission media, signals propagating through space, radio waves, or infrared signals. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments have been described and illustrated herein, those of ordinary skill in the art will readily envision a variety of other means or structures for performing the function or obtaining the results or one or more of the advantages described herein, and each of such variations or modifications is deemed to be within the scope of the embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the teachings are used. Those skilled in the art will recognize, or be able to ascertain using no more than routine experimentation, equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, or method described herein. In addition, any combination of two or more such features, systems, articles, materials, kits, or methods from different embodiments, if such features, systems, articles, materials, kits, or methods are not mutually inconsistent, is included within the scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

The concept described herein may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments described herein. The computer readable medium or media can be transportable, such that the program or programs stored thereon can be loaded onto one or more different computers or other processors to implement various aspects and embodiments described herein.

As used herein, "working member" may refer to a bit, a carving bit, a circular saw blade, a cutting bit, a cutting member, a cutting tip, a cutting tool tip, a drill bit, a saw blade (e.g., for a jigsaw, a saber saw, a scrolling saw), a probe, a router bit, a tool tip, a v-cutting bit, or another component similar to those used in a conventional hand-held tool. As used herein, "working member" may refer to a pipette tip, a vacuum nozzle for a pick and place tool, a vinyl cutting knife, a writing instrument (e.g., a pencil, a pen, a plotting pen), or a similar item.

As used herein, "working surface" refers to the surface on which the working member can perform an action (e.g., cut, draw, probe, contact). In some embodiments, the material on which the working member acts includes a working surface having a certain thickness (e.g., a piece of 4'×8' plywood with a ½" thickness). In some embodiments, the workpiece (e.g., a rectangular box of dimensions 1'×2'×3', a piece of 4'×8' plywood with a ½" thickness) includes more than one working surface on which the working member can act (e.g., the 6 different faces of the rectangular box). In some embodiments, the working surface may include one or more of: an exposed portion of the workpiece (e.g., exposed wood if the workpiece is made from wood), a mark made on the workpiece (e.g., pattern made with a writing instrument), a marker placed on the workpiece (e.g., sticker, film, tape), paper (e.g., laying or attached to the workpiece), a drawing stencil, or the like.

As used herein, "actuator" may refer a DC servomotor, an AC motor, a stepper motor, a solenoid, or any position or orientation adjustment mechanism using one or more of hydraulic, pneumatic, electric, magnetic, thermal, or mechanical drive.

As used herein, "camera" may refer to an image capture system including conventional digital cameras (using an image sensor and one or more lenses), light-field cameras, imaging arrays (e.g., planar Fourier capture array), or similar systems.

As used herein, "sensor" may refer to a camera, an image sensor (in a camera), an ultrasonic sensor, a photo sensor (e.g., a laser sensor, an infrared sensor), a time-of-flight sensor, an inertial sensor, a phase sensor, an optical sensor, a hybrid sensor (combining one or more sensors), an RF receiver (e.g., GPS receiver, Bluetooth receiver), or any similar sensor (e.g., a position sensor, a range-finding sensor).

Unless otherwise indicated herein, a "position of the frame" means the coordinate position of a point on the frame relative to a given coordinate system. In some embodiments, the position of the frame may be the coordinate position of a point on an image sensor in a camera mounted on the frame. In some embodiments, the position of the frame may be the position of a transmitter mounted on the frame wherein the position of the transmitter relative to the position of the receivers may be triangulated based on signals received by receivers positioned around the frame. In some embodiments, the position of the frame may be the position of a receiver mounted on the frame wherein transmitter beacons provide a signal that may be used to triangulate the position of the receiver relative to the beacons. In some embodiments, the position of the frame may be the coordinate position of a feature on the frame relative to a surface of the workpiece determined by imaging the frame and the surface using an off-frame camera. In some embodiments, the position of the frame may be a reference position associated with the frame such as the centroid of the adjustment region.

Unless otherwise indicated herein, a point or component "on the desired path," "above the desired path," or the like means that the point or component is on the desired path within (as applicable) mechanical tolerances (of positioning systems), measurement error (of position sensors), calculation error (of computing system), or control capabilities (of controlling system). Unless otherwise indicated herein, positional information for components (e.g., working member, frame) or calculations (e.g., target point on desired path, desired path trajectory relative to surface) are accurate subject to (as applicable) mechanical tolerances (of positioning systems), measurement error (of position sensors), calculation error (of computing system), or control capabilities (of controlling system).

The terms "program" or "software" are used herein in a generic sense to refer to any type of computer code or set of computer-executable instructions that can be employed to program a computer or other processor to implement various aspects of embodiments as discussed above. Additionally, according to one aspect, one or more computer programs that when executed perform methods or operations described herein need not reside on a single computer or processor, but may be distributed in a modular fashion amongst a number of different computers or processors to implement various aspects or embodiments described herein.

Computer-executable instructions may be in many forms, such as program modules, executed by one or more computers or other devices. Generally, program modules include routines, programs, objects, components, or data structures that perform particular tasks or implement particular abstract data types. Typically, the functionality of the program modules may be combined or distributed as desired in various embodiments.

The data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. Any suitable mechanism may be used to establish a relationship between information in fields of a data structure, including through the use of pointers, tags or other mechanisms that establish relationship between data elements.

The concepts described herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Unless otherwise indicated herein, the recitation of operations in a particular order in a claim does not require performance of the operations in that order. Unless otherwise indicated herein, the term "set" refers to a set having at least one or more members.

As used herein, the terms "light", "optical" and related terms should not but understood to refer solely to electromagnetic radiation in the visible spectrum, but instead generally refer to electromagnetic radiation in the ultraviolet (about 10 nm to 390 nm), visible (390 nm to 750 nm), near infrared (750 nm to 1400 nm), mid-infrared (1400 nm to 15,000 nm), and far infrared (15,000 nm to about 1 mm).

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms.

In the claims, as well as in the specification above, all transitional phrases such as "comprising," "including," "carrying," "having," "containing," "involving," "holding," "composed of," and the like are to be understood to be open-ended, i.e., to mean including but not limited to.

EMBODIMENTS

1. A system for advancing a working member with respect to a desired path relative to a workpiece, the system comprising:
a first positioning system comprising:
  a frame;
  a working member adapter for holding the working member; and
  a first set of actuators operable to move the working member within an adjustment region relative to the frame, wherein the adjustment region has at least two dimensions, and each actuator in the first set of actuators, the working member adapter, the working member, and the adjustment region move with the frame as the frame is moved relative to the workpiece;
one or more processors;
a sensor operatively coupled to at least one of the one or more processors; and
one or more memories operatively coupled to at least one of the one or more processors and having instructions stored thereon, wherein the instructions, when executed by at least one of the one or more processors, cause the system to:
A. receive first information from the sensor, wherein the first information is associated with a position of the frame relative to a portion of the workpiece, and a reference position of the working member is associated with the position of the frame;
B. determine a first target point on the desired path, wherein the first target point lies ahead of the reference position with respect to advancement of the working member with respect to the desired path, and the desired path is fixed relative to the portion of the workpiece;
C. provide second information to a second positioning system, wherein the second positioning system is operable to cause at least one actuator in a second set of actuators to move the frame in a first direction relative to the workpiece based at least in part upon the second information, and the second positioning system comprises the second set of actuators operable to move the frame relative to the workpiece; and
D. control at least one actuator in the first set of actuators to move the working member toward the first target point based at least in part upon the first information.

2. The system of embodiment 1, wherein the first set of actuators is operable to move the working member in a first plane, the second set of actuators is operable to move the frame in a second plane, the first plane has a first normal vector, the second plane has a second normal vector, and the first normal vector is substantially parallel to the second normal vector.

3. The system of embodiment 1, wherein the first set of actuators is operable to move the working member in two or more degrees of freedom, and the second set of actuators is operable to move the frame in at least two of the two or more degrees of freedom.

4. The system of embodiment 1, wherein the first set of actuators is operable to position the working member within a first two-dimensional area relative to a surface of the workpiece with the frame fixed at a first frame location relative to the workpiece, and the second set of actuators is operable to position the working member within the first two-dimensional area relative to the workpiece by moving the frame with the working member fixed relative to the frame.

5. The system as in one of embodiments 1-4, wherein the sensor is an image sensor, and the first information comprises image data.

6. The system as in one of embodiments 1-4, wherein the first information is based at least in part upon data from: GPS, a beacon-based positioning system, a laser-based positioning system, an ultrasound-based positioning system, or an infrared-based positioning system.

7. The system as in one of embodiments 1-6, wherein the first direction is based at least in part upon a second target point on the desired path, the second target point lies ahead of the first target point with respect to advancement of the working member with respect to the desired path.

8. The system of embodiment 7, wherein the first direction is based at least in part upon a portion of the desired path, and the portion of the desired path includes the second target point.

9. The system as in one of embodiments 7-8, wherein the second target point is a given distance along the desired path from the first target point or the reference position.

10. The system as in embodiment 7 or 9, wherein the first direction corresponds to a second direction described by starting at the first target point relative to the workpiece and ending at the second target point relative to the workpiece.

11. The system as in embodiment 7 or 9, wherein the first direction corresponds to a third direction described by starting at a centroid of the adjustment region relative to the workpiece and ending at the second target point relative to the workpiece.

12. The system as in one of embodiments 1-11, wherein the second information comprises information that causes the at least one actuator in the second set of actuators to move the frame at a first speed along the first direction relative to the workpiece.

13. The system as in embodiment 12, wherein the first speed corresponds to the speed required to move the frame such that a centroid of the adjustment region moves to the second target point within a fixed time.

14. The system as in one of embodiments 12-13, wherein the working member moves along the desired path at a second speed relative to the workpiece, and the first speed is lower than the second speed.

15. The system of embodiment 14, wherein the first speed is less than: 95%, 90%, 75%, or 50% of the second speed.

16. The system as in one of embodiments 1-11, wherein the second information comprises information that causes the at least one actuator in the second set of actuators to move the frame a first distance along the first direction relative to the workpiece.

17. The system as in one of embodiments 1-16, wherein the instructions, when executed by at least one of the one or more processors, cause the system to perform A-D within: 5 seconds, 2 seconds, 1 second, 0.5 seconds, 0.2 seconds, 0.1 seconds, 0.05 seconds, 0.02 seconds, or 0.01 seconds.

18. The system as in one of embodiments 1-17, wherein the instructions, when executed by at least one of the one or more processors, cause the system to:

E. control at least one actuator in the first set of actuators to move the working member to a third target point on the desired path, wherein the third target point lies ahead of the first target point with respect to guidance of the working member along the desired path, and E is performed after C.

19. The system as in one of embodiments 1-17, wherein the instructions, when executed, cause the system to repeat A-D to advance the working member with respect to the desired path.

20. The system as in one of embodiments 1-19, the second positioning system further comprising:

a first stage comprising a first stage platform moveable relative to a first stage base;

a first actuator in the second set of actuators operable to move the first stage platform;

a second stage comprising a second stage platform moveable relative to a second stage base;

a second actuator in the second set of actuators operable to move the second stage platform, wherein the first stage base is attachable to a first side of a rectangular table, a first end of the second stage base is attachable to the first stage platform, and the first positioning system is attachable to the second stage platform.

21. The system of embodiment 20, the second positioning system further comprising:

a third stage comprising a third stage platform moveable relative to a third stage base, wherein the third stage base is attachable to a second side of the rectangular table, the second side is opposite the first side, and a second end of the second stage base is attachable to the third stage platform.

22. The system of embodiment 21, the second positioning system further comprising:

a third actuator in the second set of actuators operable to move the third stage platform, wherein the first actuator and third actuator are driven synchronously.

23. The system as in one of embodiments 1-22, wherein the first target point is in the adjustment region with the frame located at the position relative to the portion of the workpiece.

24. The system as in one of embodiments 1-23, wherein the adjustment region corresponds to a two-dimensional region describing a portion of a surface of the workpiece with a portion of the frame contacting the surface of the workpiece.

25. The system as in one of embodiments 1-24, wherein the sensor moves with the frame as the frame is moved relative to the workpiece.

26. The system as in one of embodiments 1-25, wherein the one or more processors and the one or more memories move with the frame as the frame is moved relative to the workpiece.

27. A computer implemented method for advancing a working member with respect to a desired path relative to a workpiece, wherein a frame in a first positioning system is movable by a second positioning system, the first positioning system comprises:

the frame, a working member adapter for holding the working member, and a first set of actuators for moving the working member within an adjustment region relative to the frame, wherein the adjustment region has at least two dimensions, and each actuator in the first set of actuators, the working member adapter, the working member, and the adjustment region move with the frame as the frame is moved relative to the workpiece, and the second positioning system comprises:

a second set of actuators for moving the frame relative to the workpiece, the method comprising:

A. receiving, via a sensor operatively coupled to a processor, first information, wherein the first information is associated with a position of the frame relative to a portion of the workpiece, and a reference position of the working member is associated with the position of the frame;

B. determining, by a processor, a first target point on a desired path, wherein the first target point lies ahead of the reference position with respect to advancement of the working member with respect to the desired path, and the desired path is fixed relative to the workpiece;

C. providing, by a processor, second information to the second positioning system, wherein the second positioning system causes at least one actuator in the second set of actuators to move the frame in a first direction relative to the workpiece based at least in part upon the second information; and D. controlling, by a processor, at least one actuator in the first set of actuators to move the working member toward the first target point based at least in part upon the first information.

28. One or more non-transitory computer readable media storing instructions for advancing a working member with respect to a desired path relative to a workpiece, wherein a second positioning system is operable to move a frame in a first positioning system, the first positioning system comprises:

the frame, a working member adapter for holding the working member, and a first set of actuators operable to move the working member within an adjustment region relative to the frame, wherein the adjustment region has at least two dimensions, and each actuator in the first set of actuators, the working member adapter, the working member, and the adjustment region move with the frame as the frame is moved relative to the workpiece, and the second positioning system comprises:

a second set of actuators operable to move the frame relative to the workpiece, wherein the instructions, when executed by a computer system, cause the computer system to:

A. receive first information from a sensor, wherein the first information is associated with a position of the frame relative to a portion of the workpiece, and a reference position of the working member is associated with the position of the frame;

B. determine a first target point on a desired path, wherein the first target point lies ahead of the reference position with respect to advancement of the working member with respect to the desired path, and the desired path is fixed relative to the workpiece;

C. provide second information to the second positioning system, wherein the second positioning system is operable to cause at least one actuator in the second set of actuators to move the frame in a first direction relative to the workpiece based at least in part upon the second information; and D. control at least one actuator in the first set of actuators to move the working member toward the first target point.

What is claimed is:

1. A system for advancing a working member with respect to a desired path relative to a workpiece, the system comprising:

a first positioning system comprising:
- a frame, wherein the frame is operable to removably attach to a second positioning system comprising a second set of actuators operable to move the frame relative to the workpiece, and, when not attached to the second positioning system, the frame is operable to be positioned on a surface of the workpiece and manually moved by a user relative to the workpiece;
- a working member adapter for holding the working member; and
- a first set of actuators operable to move the working member within an adjustment region relative to the frame, wherein the adjustment region has at least two dimensions, and each actuator in the first set of actuators, the working member adapter, and the working member move with the frame as the frame is moved relative to the workpiece;

one or more processors;

a sensor operatively coupled to at least one of the one or more processors; and one or more memories operatively coupled to at least one of the one or more processors and having instructions stored thereon, wherein the instructions, when executed by at least one of the one or more processors, cause the system to:

A. receive first information from the sensor, wherein the first information is associated with a position of the frame relative to a portion of the workpiece, and a reference position of the working member is associated with the position of the frame;

B. determine a first target point on the desired path, wherein the first target point lies ahead of the reference position with respect to advancement of the working member with respect to the desired path, and the desired path is fixed relative to the portion of the workpiece;

C. provide second information to the second positioning system to cause at least one actuator in the second set of actuators to move the frame in a first direction relative to the workpiece such that as the working member advances with respect to a first portion of the desired path, new portions of the desired path move into the adjustment region associated with the first positioning system, wherein the first direction is based at least in part upon a second target point on the desired path, and the second target point lies ahead of the first target point with respect to advancement of the working member with respect to the desired path; and D. control at least one actuator in the first set of actuators to move the working member toward the first target point based at least in part upon the first information.

2. The system of claim 1, wherein the first set of actuators is operable to move the working member in two or more degrees of freedom, and the second set of actuators is operable to move the frame in at least two of the two or more degrees of freedom.

3. The system of claim 1, wherein the first set of actuators is operable to position the working member within a first two-dimensional area relative to the surface of the workpiece with the frame fixed at a first frame location relative to the workpiece, and the second set of actuators is operable to position the working member within the first two-dimensional area relative to the workpiece by moving the frame with the working member fixed relative to the frame.

4. The system of claim 1, wherein the sensor is an image sensor, and the first information comprises image data.

5. The system of claim 1, wherein the first direction is based at least in part upon a second portion of the desired path, and the second portion of the desired path includes the second target point.

6. The system of claim 1, wherein the second target point is a given distance along the desired path from the first target point or the reference position.

7. The system of claim 1, wherein the first direction corresponds to a second direction described by starting at the first target point relative to the workpiece and ending at the second target point relative to the workpiece.

8. The system of claim 1, wherein the first direction corresponds to a third direction described by starting at a centroid of the adjustment region relative to the workpiece and ending at the second target point relative to the workpiece.

9. The system of claim 1, wherein the second information comprises information that causes the at least one actuator in the second set of actuators to move the frame at a first speed along the first direction relative to the workpiece.

10. The system as in claim 9, wherein the working member moves along the desired path at a second speed relative to the workpiece, and the first speed is lower than the second speed.

11. The system of claim 10, wherein the first speed is less than: 95%, 90%, 75%, or 50% of the second speed.

12. The system as in claim 1, wherein the instructions, when executed by at least one of the one or more processors, cause the system to perform A-D within: 5 seconds, 2 seconds, 1 second, 0.5 seconds, 0.2 seconds, 0.1 seconds, 0.05 seconds, 0.02 seconds, or 0.01 seconds.

13. The system as in claim 1, wherein the instructions, when executed by at least one of the one or more processors, cause the system to:

E. control at least one actuator in the first set of actuators to move the working member to a third target point on the desired path, wherein the third target point lies ahead of the first target point with respect to guidance of the working member along the desired path, and E is performed after C.

14. The system as in claim 1, wherein the instructions, when executed, cause the system to repeat A-D to advance the working member with respect to the desired path.

15. The system as in claim 1, the second positioning system further comprising:
- a first stage comprising a first stage platform moveable relative to a first stage base;
- a first actuator in the second set of actuators operable to move the first stage platform;
- a second stage comprising a second stage platform moveable relative to a second stage base;
- a second actuator in the second set of actuators operable to move the second stage platform, wherein the first stage base is attachable to a first side of a rectangular table, a first end of the second stage base is attachable to the first stage platform, and the first positioning system is attachable to the second stage platform.

16. The system of claim 15, the second positioning system further comprising:
- a third stage comprising a third stage platform moveable relative to a third stage base, wherein the third stage base is attachable to a second side of the rectangular table, the second side is opposite the first side, and a second end of the second stage base is attachable to the third stage platform.

17. The system of claim 16, the second positioning system further comprising:

a third actuator in the second set of actuators operable to move the third stage platform, wherein the first actuator and third actuator are driven synchronously.

18. A computer implemented method for advancing a working member with respect to a desired path relative to a workpiece, wherein a frame in a first positioning system is movable by a second positioning system, the first positioning system comprises:

the frame, a working member adapter for holding the working member, and a first set of actuators for moving the working member within an adjustment region relative to the frame, wherein the frame is operable to removably attach to the second positioning system comprising a second set of actuators operable to move the frame relative to the workpiece, when not attached to the second positioning system, the frame is operable to be positioned on a surface of the workpiece and manually moved by a user relative to the workpiece, the adjustment region has at least two dimensions, and each actuator in the first set of actuators, the working member adapter, and the working member move with the frame as the frame is moved relative to the workpiece, the method comprising:

A. receiving, via a sensor operatively coupled to a processor, first information, wherein the first information is associated with a position of the frame relative to a portion of the workpiece, and a reference position of the working member is associated with the position of the frame;

B. determining, by a processor, a first target point on a desired path, wherein the first target point lies ahead of the reference position with respect to advancement of the working member with respect to the desired path, and the desired path is fixed relative to the workpiece;

C. providing, by a processor, second information to the second positioning system to cause at least one actuator in the second set of actuators to move the frame in a first direction relative to the workpiece such that as the working member advances with respect to a first portion of the desired path, new portions of the desired path move into the adjustment region associated with the first positioning system, wherein the first direction is based at least in part upon a second target point on the desired path, and the second target point lies ahead of the first target point with respect to advancement of the working member with respect to the desired path; and D. controlling, by a processor, at least one actuator in the first set of actuators to move the working member toward the first target point based at least in part upon the first information.

19. One or more non-transitory computer readable media storing instructions for advancing a working member with respect to a desired path relative to a workpiece, wherein a second positioning system is operable to move a frame in a first positioning system, the first positioning system comprises:

the frame, a working member adapter for holding the working member, and a first set of actuators operable to move the working member within an adjustment region relative to the frame, wherein the frame is operable to removably attach to the second positioning system comprising a second set of actuators operable to move the frame relative to the workpiece, when not attached to the second positioning system, the frame is operable to be positioned on a surface of the workpiece and manually moved by a user relative to the workpiece, the adjustment region has at least two dimensions, and each actuator in the first set of actuators, the working member adapter, and the working member move with the frame as the frame is moved relative to the workpiece, and wherein the instructions, when executed by a computer system, cause the computer system to:

A. receive first information from a sensor, wherein the first information is associated with a position of the frame relative to a portion of the workpiece, and a reference position of the working member is associated with the position of the frame;

B. determine a first target point on a desired path, wherein the first target point lies ahead of the reference position with respect to advancement of the working member with respect to the desired path, and the desired path is fixed relative to the workpiece;

C. provide second information to the second positioning system to cause at least one actuator in the second set of actuators to move the frame in a first direction relative to the workpiece such that as the working member advances with respect to a first portion of the desired path, new portions of the desired path move into the adjustment region associated with the first positioning system, wherein the first direction is based at least in part upon a second target point on the desired path, and the second target point lies ahead of the first target point with respect to advancement of the working member with respect to the desired path; and D. control at least one actuator in the first set of actuators to move the working member toward the first target point.

* * * * *